United States Patent
Kim

(10) Patent No.: US 11,432,007 B2
(45) Date of Patent: Aug. 30, 2022

(54) INTRA-FRAME PREDICTION METHOD AND DEVICE

(71) Applicant: GUANGDONG OPPO MOBILE TELECOMMUNICATIONS CORP., LTD., Guangdong (CN)

(72) Inventor: Ki Baek Kim, Daejeon (KR)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/130,601

(22) Filed: Dec. 22, 2020

(65) Prior Publication Data
US 2021/0176492 A1    Jun. 10, 2021

Related U.S. Application Data
(63) Continuation of application No. PCT/KR2019/007651, filed on Jun. 25, 2019.

(30) Foreign Application Priority Data

| Jun. 25, 2018 | (KR) | .................. | 10-2018-0072558 |
| Jul. 2, 2018 | (KR) | .................. | 10-2018-0076783 |

(51) Int. Cl.
*H04N 19/593* (2014.01)
*H04N 19/59* (2014.01)
(Continued)

(52) U.S. Cl.
CPC ......... *H04N 19/593* (2014.11); *H04N 19/117* (2014.11); *H04N 19/176* (2014.11); *H04N 19/182* (2014.11)

(58) Field of Classification Search
CPC .. H04N 19/159; H04N 19/176; H04N 19/186; H04N 19/105; H04N 19/59; H04N 19/11; H04N 19/593
See application file for complete search history.

(56) References Cited

U.S. PATENT DOCUMENTS
| 9,179,148 B2 | 11/2015 | Li |
| 9,299,133 B2 | 3/2016 | Minezawa |
(Continued)

FOREIGN PATENT DOCUMENTS
| CL | 2016002047 A1 | 3/2017 |
| EP | 3477950 A1 | 5/2019 |
(Continued)

OTHER PUBLICATIONS
_ Intra mode coding in HEVC; Zhang—Oct. 2017. (Year: 2017).*
(Continued)

*Primary Examiner* — Luis Perez-Fuentes
(74) *Attorney, Agent, or Firm* — Perkins Coie LLP

(57) ABSTRACT

An intra-frame prediction method and device, according to the present invention, enables deriving an intra-frame prediction mode of a current block, determining a pixel line, among a plurality of pixel lines, for the intra-frame prediction of the current block, and carrying out the intra-frame prediction of the current block on the basis of the intra-frame prediction mode and the pixel line. In addition, a first reference pixel of the determined pixel line may be selectively filtered, and a prediction pixel of the current block may be selectively corrected, and thus the accuracy of the intra-frame prediction may be improved.

6 Claims, 27 Drawing Sheets

(51) Int. Cl.
*H04N 19/117* (2014.01)
*H04N 19/176* (2014.01)
*H04N 19/182* (2014.01)

(56) References Cited

U.S. PATENT DOCUMENTS

| | | | |
|---|---|---|---|
| 9,414,073 | B2 | 8/2016 | Minezawa et al. |
| 9,544,584 | B2* | 1/2017 | Lim .................... H04N 19/176 |
| 9,609,326 | B2 | 3/2017 | Minezawa et al. |
| 9,628,797 | B2 | 4/2017 | Minezawa et al. |
| 9,706,226 | B2* | 7/2017 | Yamaguchi ............ H04N 19/44 |
| 9,736,478 | B2 | 8/2017 | Minezawa et al. |
| 9,900,618 | B2* | 2/2018 | Lee .................... H04N 19/82 |
| 10,205,944 | B2 | 2/2019 | Minezawa et al. |
| 10,230,961 | B2* | 3/2019 | Liu .................... H04N 19/11 |
| 10,397,569 | B2* | 8/2019 | Liu .................... H04N 19/593 |
| 10,893,267 | B2* | 1/2021 | Jang .................... H04N 19/593 |
| 10,951,918 | B2* | 3/2021 | Kim .................... H04N 19/159 |
| 11,012,689 | B2* | 5/2021 | Kim .................... H04N 19/124 |
| 11,039,148 | B2* | 6/2021 | Moon .................... H04N 19/80 |
| 2013/0003832 | A1 | 1/2013 | Li |
| 2013/0287312 | A1 | 10/2013 | Minezawa |
| 2016/0112706 | A1 | 4/2016 | Minezawa et al. |
| 2016/0156929 | A1 | 6/2016 | Minezawa et al. |
| 2016/0156930 | A1 | 6/2016 | Minezawa et al. |
| 2016/0156931 | A1 | 6/2016 | Minezawa et al. |
| 2016/0309147 | A1 | 10/2016 | Minezawa et al. |
| 2019/0124328 | A1 | 4/2019 | Minezawa et al. |
| 2019/0141318 | A1 | 5/2019 | Li et al. |
| 2019/0208199 | A1 | 7/2019 | Cho et al. |
| 2019/0222837 | A1 | 7/2019 | Lee et al. |
| 2020/0359016 | A1 | 11/2020 | Li et al. |
| 2020/0359017 | A1 | 11/2020 | Li et al. |
| 2020/0359018 | A1 | 11/2020 | Li et al. |

FOREIGN PATENT DOCUMENTS

| | | |
|---|---|---|
| EP | 3528497 A1 | 8/2019 |
| KR | 20180001478 A | 1/2018 |
| KR | 20180029905 A | 3/2018 |
| KR | 20180041575 A | 4/2018 |
| WO | 2017190288 A1 | 11/2017 |
| WO | 2018016823 A1 | 1/2018 |

OTHER PUBLICATIONS

_ Efficient multiple line-based intra prediction; Li—2016. (Year: 2016).*
_ Arbitrary reference tier for intra prediction; Chang—2016. (Year: 2016).*
_ Multiple Line-based Intra Prediction for High Efficiency Video Coding; Li—2016. (Year: 2016).*
_ Direction based Angular Intra Prediction; Guo—2011. (Year: 2011).*
_ Intra mode coding with fixed length binarization; Zhang—2011. (Year: 2011).*
_Report of Bidirectional UDI mode for Intra prediction; Lin—2011. (Year: 2011).*
_ New intra prediction using correlation between pixels and lines; Lai—2010. (Year: 2010).*
NPL Google Search; 2022 (Year: 2022).*
Library USPTO query for NPL; 2022 (Year: 2022).*
International Search Report in the international application No. PCT/KR2019/007651, dated Oct. 2, 2019.
Bordes P et al: "Description of SDR, HDR and 360° video coding technology proposal by Qualcomm and Technicolor—medium complexity version", 10. JVET Meeting; San Diego; (The Joint Video Exploration Team of ISO/IEC JTC1/SC29/WG11 and ITU-T SG.16), No. JVET-J0022 Apr. 12, 2018, XP030248148. 84 pages.
Lin (Hisilicon) yet al: "Simplified Planar Intra Prediction", 5. JCT-VC Meeting; Geneva; (Joint Collaborative Team on Video Coding of ISO/IEC JTC1/SC29/WG11 and ITU-T SG.16), No. JCTVC-E289 Mar. 19, 2011, XP030227630. 10 pages.
Y-W Chen et al: "Description of SDR, HDR and 360° video coding technology proposal by Qualcomm and Technicolor—low and high complexity versions", 10. JVET Meeting; San Diego; (The Joint Video Exploration Team of ISO/IEC JTC1/ SC29/WG11 and ITU-T SG.16), No. JVET-J0021 Apr. 14, 2018, XP030248216. 44 pages.
Supplementary European Search Report in the European application No. 19827016.7, dated Jun. 9, 2021. 14 pages.
Office Action of the Indian application No. 202117000263, dated Aug. 21, 2021. 9 pages.
First Office Action of the Canadian application No. 3105023, dated Dec. 22, 2021. 6 pages.
First Office Action of the Chilean application No. 2020-03298, dated Dec. 17, 2021. 20 pages with English translation.
First Office Action of the European application No. 19827016.7, dated Feb. 11, 2022. 5 pages.
Written Opinion of the International Search Authority in the international application No. PCT/KR2019/007651, dated Oct. 2, 2019. 11 pages with English translation.
Second Office Action of the Chilean application No. 2020-03298, dated Apr. 18, 2022. 16 pages with English translation.

* cited by examiner

Integer
Decimal
Number of digital filtering (b)

(c)

(d)

(a)

(b)

(c)

(d)

INTRA-FRAME PREDICTION METHOD AND DEVICE

CROSS-REFERENCE TO RELATED APPLICATIONS

This is a continuation application of International Patent Application No. PCT/KR2019/007651, filed on Jun. 25, 2019, which claims priorities to Korean Patent Application No. 10-2018-0072558, filed on Jun. 25, 2018, and Korean Patent Application No. 10-2018-0076783, filed Jul. 2, 2018, the entire contents of which are incorporated herein by reference in their entirety.

TECHNICAL FIELD

The disclosure relates to an image encoding and decoding technology, and more particularly, to a method and device for intra prediction encoding/decoding.

BACKGROUND

Recently, demand for high-resolution and high-quality images, such as High Definition (HD) images and Ultra High Definition (UHD) images, has been increasing in various application fields, and high-efficiency image compression techniques are being thus developed.

As an image compression technology, there may be various technologies such as an inter prediction technology that predicts a pixel value included in a current picture from a picture before or after the current picture, an intra prediction technology that predicts a pixel value included in a current picture using pixel information in the current picture, and an entropy coding technology that allocates a short code to information having a high frequency of occurrence and allocates a long code to information having a low frequency of occurrence. These image compression technologies may be used to efficiently compress and transmit or store image data.

SUMMARY

Technical Problem

The disclosure relates to an image encoding and decoding technology, and more particularly, to a method and device for intra prediction encoding/decoding.

Technical Solution

According to an intra prediction method and apparatus of the disclosure, an intra prediction mode of a current block may be derived, a pixel line for intra prediction of the current block among multiple pixel lines may be determined, and the intra prediction of the current block may be performed based on the intra prediction mode and the determined pixel line.

According to the intra prediction method and apparatus of the disclosure, filtering on a first reference pixel of the determined pixel line may be performed.

According to the intra prediction method and apparatus of the disclosure, the filtering may be selectively performed based on a first flag indicating whether the first reference pixel for intra prediction is filtered.

According to the intra prediction method and apparatus of the disclosure, the first flag may be derived from a decoding apparatus based on a coding parameter of the current block, and the coding parameter may include at least one of a block size, a component type, an intra prediction mode, or whether intra prediction in units of sub-blocks is applied.

According to the intra prediction method and apparatus of the disclosure, correction on a prediction pixel of the current block according to the intra prediction may be performed.

According to the intra prediction method and apparatus of the disclosure, the operation of performing correction may further include: determining at least one of a second reference pixel or a weighted value for the correction based on a position of the prediction pixel of the current block.

According to the intra prediction method and apparatus of the disclosure, the correction may be selectively performed in consideration of at least one of a position of the pixel line of the current block, the intra prediction mode of the current block, or whether intra prediction in units of sub-blocks of the current block is performed.

According to the intra prediction method and apparatus of the disclosure, the intra prediction may be performed in units of sub-blocks of the current block, and the sub-blocks may be determined based on at least one of a second flag indicating whether to perform partitioning, partition direction information, or partition number information.

According to the intra prediction method and apparatus of the disclosure, the intra prediction mode may be derived based on a predetermined default mode or multiple Most Probable Mode (MPM) candidates.

Technical Effect

According to the disclosure, the encoding/decoding efficiency can be improved by prediction in units of sub-blocks.

According to the disclosure, the encoding/decoding efficiency of intra prediction can be improved by intra prediction based on multiple pixel lines.

According to the disclosure, the encoding/decoding efficiency of intra prediction can be improved by performing filtering on a reference pixel.

According to the disclosure, the encoding/decoding efficiency of intra prediction can be improved by correcting an intra prediction pixel.

According to the disclosure, the encoding/decoding efficiency of an intra prediction mode can be improved by deriving the intra prediction mode based on a default mode or an MPM candidate.

BRIEF DESCRIPTION OF THE DRAWINGS

FIGS. 14 and 15 are partial examples for confirming partition information of each block.

DETAILED DESCRIPTION

Figure 1:
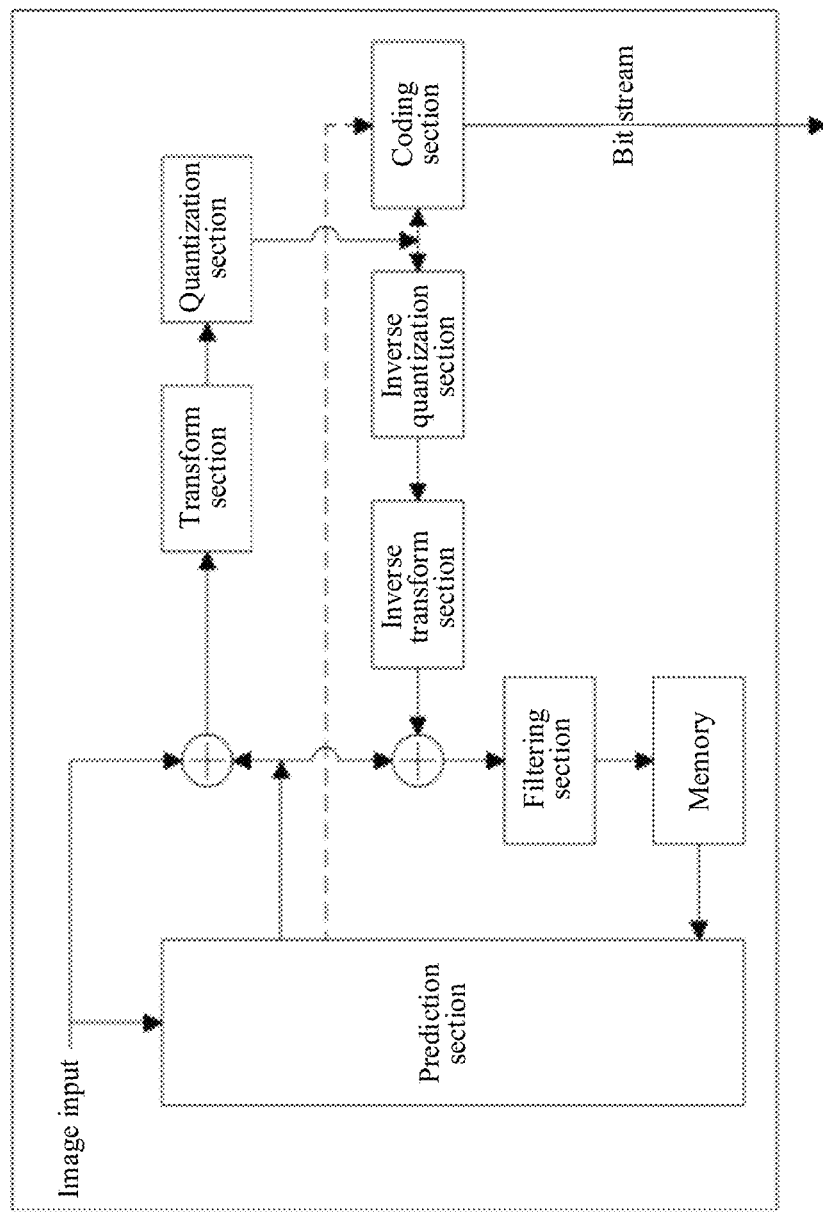
FIG. 1 is a block diagram of an image encoding device according to an embodiment of the disclosure.

An intra prediction method and apparatus of the disclosure may derive an intra prediction mode of a current block, determine a pixel line for intra prediction of the current block among multiple pixel lines, and perform the intra prediction of the current block based on the intra prediction mode and the determined pixel line.

According to the intra prediction method and apparatus of the disclosure, a first reference pixel of the determined pixel line may be filtered.

According to the intra prediction method and apparatus of the disclosure, filtering may be selectively performed based on a first flag indicating whether the first reference pixel for intra prediction is filtered.

According to the intra prediction method and apparatus of the disclosure, the first flag may be derived from a decoding apparatus based on a coding parameter of the current block, and the coding parameter may include at least one of a block size, a component type, an intra prediction mode, or whether intra prediction in units of sub-blocks is applied.

According to the intra prediction method and apparatus of the disclosure, a prediction pixel of the current block according to the intra prediction may be corrected.

According to the intra prediction method and apparatus of the disclosure, the correction operation may further include: determining at least one of a second reference pixel or a weighted value for the correction based on a position of the prediction pixel of the current block.

According to the intra prediction method and apparatus of the disclosure, the correction operation may be selectively performed in consideration of at least one of a position of the pixel line of the current block, the intra prediction mode of the current block, or whether intra prediction in units of sub-blocks of the current block is performed.

According to the intra prediction method and apparatus of the disclosure, the intra prediction may be performed in units of sub-blocks of the current block, and the sub-blocks may be determined based on at least one of a second flag indicating whether to perform partitioning, partition direction information, or partition number information.

According to the intra prediction method and apparatus of the disclosure, the intra prediction mode may be derived based on a predetermined default mode or multiple MPM candidates.

In the present invention, various modifications may be made and various embodiments may be provided, and specific embodiments will be described in detail with reference to the accompanying drawings. However, it should be understood that the present invention is not intended to these specific embodiments, but shall include all changes, equivalents, and substitutes that fall within the spirit and scope of the present invention.

The terms such as first, second, A, and B may be used to describe various elements, but these elements should not be limited by these terms. These terms are only intended to distinguish one element from another. For example, a first element may be referred to as a second element, and similarly, a second element may be referred to as a first element, without departing from the scope of the disclosure. The term "and/or" may include a combination of multiple related items or any of multiple related items.

It is to be understood that when an element is referred to as being "connected" or "linked" to another element, the element may be directly connected or linked to another element. However, it should be understood that still another element may be present in the middle. On the other hand, when an element is referred to as being "directly connected" or "directly linked" to another element, it should be understood that there is no other component in the middle.

The terms used in the present application are only used to describe specific embodiments, and are not intended to limit the present invention. Singular expressions include plural expressions unless the context clearly indicates otherwise. In the present application, the term such as "include" or "have" is intended to designate the presence of features, numbers, steps, actions, components, parts, or combinations thereof described in the specification, and it should be understood that the term does not preclude the possibility of the presence or addition of one or more other features or numbers, steps, actions, components, parts, or combinations thereof.

Unless defined otherwise, all terms used herein, including technical or scientific terms, mean the same as commonly understood by one of ordinary skill in the art to which the present invention belongs. Terms such as those defined in a commonly used dictionary should be interpreted as being consistent with the meanings of the related technology, and are not interpreted as ideal or excessively formal meanings unless explicitly defined in the present application.

Video encoding and decoding apparatuses may be user terminals such as a personal computer (PC), a notebook computer, a personal digital assistant (PDA), a portable multimedia player (PMP), a PlayStation Portable (PSP), a wireless communication terminal, a smartphone, a TV, a virtual reality (VR) device, an augmented reality (AR) device, a mixed reality (MR) device, a head mounted display (HMD), and smart glasses, or server terminals such as an application server and a service server, and may include various devices such as a communication device including a communication modem for performing communication with various devices or wired/wireless communication networks, a memory for storing various programs and data for encoding or decoding an image or for performing intra or inter-prediction for encoding or decoding, a processor for executing a program to perform computation and control operations, etc. In addition, an image encoded as a bitstream by an image encoding apparatus can be transmitted to an image decoding apparatus in real time or non-real time through a wired or wireless network such as the Internet, a local area network, a wireless LAN network, a WiBro network, or a mobile communication network, or through various communication interfaces such as a cable and a universal serial bus (USB), decoded by the image decoding apparatus, and reconstructed and reproduced as an image.

In addition, the image encoded as a bitstream by the image encoding apparatus may be transmitted from the encoding apparatus to the decoding apparatus through a computer-readable storage medium.

The above-described image encoding apparatus and image decoding apparatus may be separate apparatuses, respectively. However, the apparatuses may be configured as one image encoding/decoding apparatus according to implementation. In this case, some components of the image encoding apparatus are substantially the same technical elements as some components of the image decoding apparatus and may be implemented to include at least the same structure or perform at least the same function as that of some components of the image decoding apparatus.

Therefore, redundant descriptions of corresponding technical elements will be omitted in the detailed description of the following technical elements and operating principles thereof.

In addition, since the image decoding apparatus corresponds to a computing device that applies an image encoding method performed by the image encoding apparatus to decoding, the following description will focus on the image encoding apparatus.

The computing device may include a memory storing a program or a software module implementing an image encoding method and/or an image decoding method, and a processor linked to the memory to perform a program. In addition, the image encoding apparatus may be referred to as an encoder and the image decoding apparatus may be referred to as a decoder.

In general, an image may be configured as a series of still images, these still images may be classified in units of Group of Pictures (GOP), and each still image may be referred to as a picture. In this instance, the picture may represent one of a frame or a field in a progressive signal or an interlaced signal, and the image may be expressed as a 'frame' when encoding/decoding is performed in units of frames and expressed as a 'field' when encoding/decoding is performed in units of fields. In the present invention, a progressive signal is assumed and described. However, the present invention is applicable to an interlaced signal. As a higher concept, units such as GOP and sequence may exist, and each picture may be partitioned into predetermined regions such as slices, tiles, and blocks. In addition, one GOP may include units such as a picture I, a picture P, and a picture B. The picture I may refer to a picture that is self-encoded/decoded without using a reference picture, and the picture P and the picture B may refer to pictures that are encoded/decoded by performing a process such as motion estimation and motion compensation using a reference picture. In general, the picture I and the picture P can be used as reference pictures in the case of the picture P, and the picture I and the picture P can be used as reference pictures in the case of the picture B. However, the above definition may be changed by the setting of coding/decoding.

Here, a picture for encoding/decoding is referred to as a reference picture, and a block or pixel referred to is referred to as a reference block or a reference pixel. In addition, reference data may be not only a pixel value in the spatial domain, but also a coefficient value in the frequency domain and various types of encoding/decoding information generated and determined during an encoding/decoding process. Examples thereof may be information related to intra-prediction or information related to motion in a prediction section, information related to transformation in a transform section/inverse transform section, information related to quantization in a quantization section/inverse quantization section, information related to encoding/decoding (context information) in an encoding section/decoding section, information related to a filter in an in-loop filter section, etc.

The smallest unit constituting an image may be a pixel, and the number of bits used to represent one pixel is referred to as a bit depth. In general, the bit depth may be 8 bits, and a bit depth greater than 8 bits may be supported according to encoding settings. As the bit depth, at least one bit depth may be supported according to a color space. In addition, at least one color space may be configured according to a color format of an image. One or more pictures having a certain size or one or more pictures having different sizes may be included according to a color format. For example, in the case of YCbCr 4:2:0, one luminance component (Y in this example) and two color difference components (Cb/Cr in this example) may be included. In this instance, a component ratio of the color difference components and the luminance component may be a ratio of 1:2 in width and height. As another example, in the case of 4:4:4, the width and the height may be the same in the component ratio. In the case of including one or more color spaces as in the above example, a picture may be partitioned into the respective color spaces.

In the disclosure, description will be made based on some color spaces (Y in this example) of some color formats (YCbCr in this example), and the same or similar application (setting dependent on a specific color space) can be applied to other color spaces (Cb and Cr in this example) according to the color format. However, partial differences (independent setting for a specific color space) can be made in each color space. In other words, setting dependent on each color space may mean having setting prosectional to or dependent on a component ratio of each component (for example, 4:2:0, 4:2:2, 4:4:4, etc.), and independent setting for each color space may mean having setting of only the corresponding color space regardless of or independent of the component ratio of each component. In the present invention, depending on the encoder/decoder, some configurations may have independent or dependent settings.

Setting information or a syntax element required in an image encoding process may be determined at a unit level such as video, sequence, picture, slice, tile, block, etc., included in a bitstream in units such as video parameter set (VPS), sequence parameter set (SPS), picture parameter set (PPS), slice header, tile header, block header, etc., and transmitted to the encoder, and the decoder may perform parsing in units of the same level to reconstruct the setting information transmitted from the encoder and use the reconstructed setting information in an image decoding process. In addition, related information may be transmitted as a bitstream in the form of supplement enhancement information (SEI) or metadata, and may be parsed and used. Each parameter set has a unique ID value, and a lower parameter set may have an ID value of an upper parameter set to be referred to. For example, a lower parameter set may refer to information of an upper parameter set having a same ID value among one or more upper parameter sets. Among the examples of various units mentioned above, when one unit includes one or more other units, the corresponding unit may be referred to as an upper unit, and the included unit may be referred to as a lower unit.

Setting information generated in the unit may contain content on an independent setting for each unit or contain content on a setting dependent on a previous, subsequent, or upper unit. Here, the dependent setting may be understood as indicating the setting information of the corresponding unit as flag information indicating that the setting of the previous, subsequent, or upper unit is followed (for example, a 1-bit flag, the setting is followed in the case of 1 and not followed in the case of 0). Description of the setting information in the present invention will focus on an example of an independent setting. However, an example of adding or replacing content dependent on setting information of a previous or subsequent unit of a current unit, or an upper unit may be included.

Figure 2:
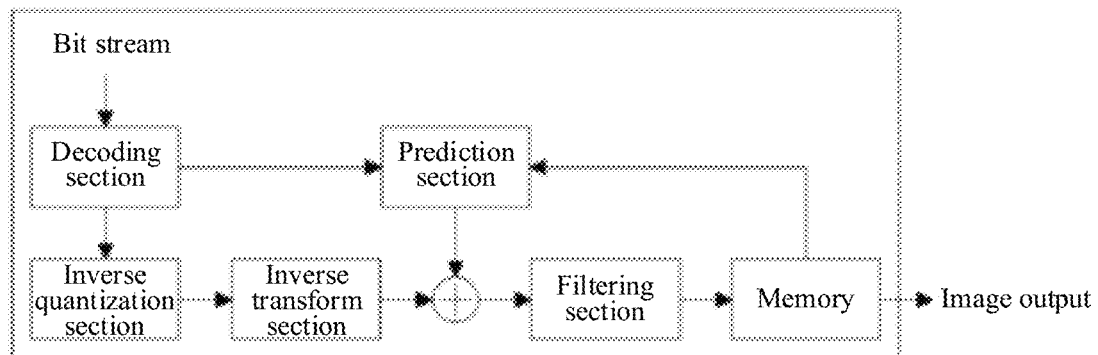
FIG. 2 is a block diagram of an image decoding device according to an embodiment of the disclosure.

FIG. 1 is a block diagram of an image encoding device according to an embodiment of the disclosure. FIG. 2 is a block diagram of an image decoding device according to an embodiment of the disclosure.

Referring to FIG. 1, the image encoding apparatus may include a prediction section, a subtraction section, a transform section, a quantization section, an inverse quantization section, an inverse transform section, an addition section, an in-loop filter section, a memory, and/or an encoding section. Some of the above components may not necessarily be included, some or all of the components may be selectively included as necessary, and some other configurations not illustrated may be included.

Referring to FIG. 2, the image decoding apparatus may include a decoding section, a prediction section, an inverse quantization section, an inverse transform section, an addition section, an in-loop filter section, and/or a memory. Some of the above components may not necessarily be included, some or all of the components may be selectively included as necessary, and some other configurations not illustrated may be included.

The image encoding apparatus and the image decoding apparatus may be separate apparatuses, but may be composed as an image encoding/decoding device according to implementation. In this case, some configurations of the image encoding apparatus are substantially the same technical elements as some components of the image decoding apparatus and may be implemented to include at least the same structure or perform at least the same function as that of some components of the image decoding apparatus. Therefore, redundant descriptions of corresponding technical elements will be omitted in the detailed description of the following technical elements and operating principles thereof. Since the image decoding apparatus corresponds to a computing device that applies an image encoding method performed by the image encoding apparatus to decoding, the following description will focus on the image encoding apparatus. The image encoding apparatus may be referred to as an encoder and the video decoding apparatus may be referred to as a decoder.

The prediction section may include an intra-prediction section that performs intra-prediction and an inter-prediction section that performs inter-prediction. In intra-prediction, an intra-prediction mode may be determined by configuring a pixel of a block adjacent to a current block as a reference pixel, and a prediction block may be generated using the intra-prediction mode. In inter-prediction, a prediction block may be generated by determining motion information of a current block using one or more reference images and performing motion compensation using the motion information. One of intra-prediction and inter-prediction to be used for a current block (coding unit or prediction unit) may be determined, and specific information (for example, intra-prediction mode, motion vector, reference video, etc.) according to each prediction method may be determined. In this instance, a processing unit in which prediction is performed and a processing unit in which a prediction method and specific content are determined may be determined according to an encoding/decoding setting. For example, a prediction method, a prediction mode, etc. are determined in a prediction unit (or coding unit), and prediction is performed in a prediction block unit (or coding unit or transform unit).

The subtraction section generates a residual block by subtracting the prediction block from the current block. That is, the subtraction section calculates a difference between a pixel value of each pixel in the current block to be encoded and a predicted pixel value of each pixel in the prediction block generated through the prediction section to generate a residual block, which is a residual signal in an image.

The transform section may transform a signal belonging to the spatial domain into a signal belonging to the frequency domain, and a signal obtained through the transformation process is referred to as a transformed coefficient. For example, a transform block having a transformed coefficient may be obtained by transforming a residual block having a residual signal received from the subtraction section, and the input signal is determined according to an encoding setting and is not limited to the residual signal.

The transform section may transform the residual block using a transformation scheme such as Hadamard transform, discrete sine transform (DST based-transform), or discrete cosine transform (DCT based-transform). However, the transformation scheme is not limited thereto, and it is possible to use various transformation schemes obtained by improving and modifying this transformation scheme.

For example, at least one transformation scheme in the transform may be supported, and at least one detailed transformation scheme may be supported in each transformation scheme. In this instance, the at least one detailed transformation scheme may be a transformation scheme in which a part of a basis vector is configured differently in each transformation method. For example, DST-based and DCT-based transforms may be supported as transform technologies. For DST, detailed transform schemes such as DST-I, DST-II, DST-III, DST-V, DST-VI, DST-VII, and DST-VIII may be supported. For DCT, detailed transform schemes such as DCT-I, DCT-II, DCT-III, DCT-V, DCT-VI, DCT-VII, and DCT-VIII may be supported.

One of the transforms (for example, a transformation scheme and a detailed transformation scheme) may be set as a basic transformation scheme. Therefore, additional transformation schemes (for example, multiple transformation schemes and multiple detailed transformation schemes) may be supported. It may be determined whether to support an additional transformation scheme in units of sequence, picture, slice, tile, etc., so that related information may be generated in this unit, and when the additional transformation scheme is supported, transformation scheme selection information may be determined in units such as blocks to generate related information.

The transform may be performed in a horizontal/vertical direction. For example, using a basis vector in the transformation, a total two-dimensional transformation may be performed by performing a one-dimensional transformation in the horizontal direction and performing a one-dimensional transformation in the vertical direction, thereby transforming a pixel value in the spatial domain into a pixel value in the frequency domain.

In addition, the transformation in the horizontal/vertical direction may be adaptively performed. In detail, it may be determined whether to perform adaptive transformation according to at least one coding setting. For example, in the case of intra prediction, when the prediction mode is a horizontal mode, DCT-I may be applied in the horizontal direction, and DST-I may be applied in the vertical direction. When the prediction mode is a vertical mode, DST-VI may be applied in the horizontal direction, and DCT-VI may be applied in the vertical direction. In the case of diagonal down left, DCT-II may be applied in the horizontal direction, and DCT-V may be applied in the vertical direction. In the case of diagonal down right, DST-I may be applied in the horizontal direction, and DST-VI may be applied in the vertical direction.

The size and shape of each transform block may be determined according to a coding cost of each candidate of the size and shape of the transform block, and information such as the determined image data of each transform block and the determined size and shape of each transform block may be coded.

The square transform in the transform form may be set as a basic transform form, and additional transform forms (for example, rectangular shapes) may be supported. It may be determined whether to support additional transform forms in units of sequence, picture, slice, tile, etc., related information may be generated in this unit, and transform form selection information may be determined in units such as blocks to generate related information.

In addition, the support of a transform block format may be determined according to coding information. In this instance, the coding information may correspond to a slice type, a coding mode, a block size and shape, a block partition mode, etc. That is, one transform form may be supported according to at least one kind of coding information, and multiple transform forms may be supported according to at least one kind of coding information. The former may be an implicit case, and the latter may be an explicit case. In the explicit case, adaptive selection information indicating the best candidate group among multiple candidate groups may be generated and included in a bit stream. It can be understood that in the disclosure including the present example, when coding information is explicitly generated, corresponding information is included in a bit stream in various units, and the decoder parses related information in various units to restore decoded information. In addition, it can be understood that when coding/decoding information is implicitly processed, the encoder and the decoder perform processing through the same process and rule.

As an example, the support for transformation of rectangular shapes may be determined according to the slice type. In the case of an I slice, the supported transformation may be square transformation, and in the case of PB slices, the transformation may be square or rectangular shape transformation.

As an example, the support for transformation of rectangular shapes may be determined according to the coding mode. In the case of Intra, the supported transformation form may be square shape transformation, and in the case of Inter, the supported transformation may be square or rectangular shape transformation.

As an example, the support for transformation of rectangular shapes may be determined according to the block size and type. The transformation form supported in a block of a predetermined size or larger may be square shape transformation, and the transformation form supported in a block of a predetermined size or less may be square or rectangular shape transformation.

As an example, the support for transformation of rectangular shapes may be determined according to the block partition mode. When a block to be transformed is a block obtained by a quad tree partition mode, the supported transformation form may be square shape transformation, and when the block is a block obtained by a binary tree partition mode, the supported transformation form may be square or rectangular shape transformation.

The above example is an example of supporting a transformation form according to one piece of coding information, and multiple pieces of information may be combined to participate in the setting of supported additional transformation forms. The above example is not limited to the above examples, but is directed to examples in which additional transformation forms are supported according to various coding settings, and various modification examples may be implemented.

According to the coding settings or the characteristics of an image, the transform process may be omitted. For example, according to the coding settings (in this example, a lossless compression environment is assumed), the transform process (including an inverse process) may be omitted. As another example, when the compression performance by conversion is not exerted according to the characteristics of the image, the conversion process may be omitted. In this instance, the omitted transform may be the entire unit, or one of horizontal and vertical units may be omitted, and it may be determined whether such omission is supported according to the block size and shape.

For example, in a setting where the omission of horizontal and vertical conversion is bundled, when a transform omission flag is 1, the transform is not performed in the horizontal and vertical directions, and when the flag is 0, the transform is performed in the horizontal and vertical directions. In a setting where horizontal and vertical transforms are independently operated, when a first transform omission flag is 1, the transform is not performed in the horizontal direction, and if the flag is 0, the transform is performed in the horizontal direction. When a second transform omission flag is 1, the transform is not performed in the vertical direction, and if the flag is 0, the transform is performed in the vertical direction.

In the case where the block size corresponds to range A, the transform omission may be supported, and in the case of range B, the transform omission cannot be supported. For example, if the horizontal length of a block is greater than M or the vertical length of a block is greater than N, the transform omission flag cannot be supported, and if the horizontal length of the block is less than m or the vertical length of the block is less than n, the transform omission flag may be supported. M(m) and N(n) may be the same or different. The transform-related settings may be determined in units of sequence, picture, slice, etc.

If additional transformation schemes are supported, transformation scheme settings may be determined according to at least one piece of coding information. In this case, the coding information may correspond to a slice type, a coding mode, a block size and shape, a prediction mode, etc.

As an example, the support for a transformation scheme may be determined according to the coding mode. For Intra, the supported transformation schemes may be DCT-I, DCT-III, DCT-VI, DST-II, and DST-III, and for Inter, the supported transformation schemes may be DCT-II, DCT-III, and DST-III.

As an example, the support for a transformation scheme may be determined according to the slice type. In the case of an I slice, the supported transformation schemes may be DCT-I, DCT-II, and DCT-III, in the case of a P slice, the supported transformation schemes may be DCT-V, DST-V, and DST-VI, and in the case of a B slice, the supported transformation schemes may be DCT-I, DCT-II, and DST-III.

As an example, the support for a transformation scheme may be determined according to the prediction mode. The transformation schemes supported in a prediction mode A may be DCT-1 and DCT-II, the transformation schemes supported in a prediction mode B may be DCT-1 and DST-1, and the transformation scheme supported in prediction mode C may be DCT-I. In this case, the prediction modes A and B may be directional modes, and the prediction mode C may be a non-directional mode.

As an example, the support for a transformation scheme may be determined according to the block size and type. The transformation scheme supported on blocks of sizes greater than a certain size may be DCT-II, the transformation schemes supported on blocks of sizes smaller than a certain size may be DCT-II and DST-V, and the transformation schemes supported on blocks of sizes greater than and smaller than a certain size may be DCT-I, DCT-II, and DST-I. In addition, the transformation schemes supported in a square shape may be DCT-1 and DCT-II, and the transformation schemes supported in a rectangular shape may be DCT-1 and DST-1.

The above examples are examples of supporting a transformation scheme according to one piece of coding information, and multiple pieces of information may be combined to participate in the setting of supported additional transform technologies. The examples are not limited to the above examples, but may also be transformed into other examples. In addition, the transform section may send information required to generate a transform block to the encoding section to code the information, include the information in a bit stream and send to the decoder, and the decoding section of the decoder parses the information and uses the information for an inverse transform process.

The quantization section may quantize an input signal, and a signal obtained through a quantization process is referred to as a quantized coefficient. For example, a quantization block with a quantized coefficient may be obtained by quantizing a residual block having a residual transform coefficient received from the transform section. In this instance, an input signal is determined according to the encoding setting, which is not limited to the residual transform coefficient.

The quantization section may quantize the transformed residual block by using a quantization technology such as dead zone uniform threshold quantization and quantization weighted matrix. However, the quantization technology is not limited thereto, and it is possible to use various quantization technologies obtained by improving and modifying this quantization technology.

In addition, the quantization section may send information required to generate a quantization block to the encoding section so that the information is encoded, include the \ information in the bitstream and send to the decoder, and the decoding section of the decoder may parse the information and use the information for an inverse quantization process.

In the above example, the description has been made on the assumption that the residual block is transformed and quantized through the transform section and the quantization section. However, the residual signal of the residual block may be transformed to generate a residual block having a transformed coefficient, and the quantization process may not be performed. Alternatively, the residual signal of the residual block may not be transformed into the transformed coefficient, and only the quantization process may be performed. Alternatively, neither the transformation nor quantization process may be performed. This may be determined based on the coder settings.

The encoding section scans the quantized coefficient, transformed coefficient, or residual signal of the generated residual block according to at least one scanning order (for example, zigzag scanning, vertical scanning, horizontal scanning, etc.), generates a quantized coefficient sequence, a transformed coefficient sequence or a signal sequence, and may perform encoding by using at least one entropy coding technology. In this instance, information about the scanning order may be determined according to an encoding setting (for example, an encoding mode, a prediction mode, etc.), and related information may be generated implicitly or explicitly. For example, one of multiple scanning orders may be selected according to the intra prediction mode. In this instance, a scanning pattern may be set to one of various patterns such as zig-zag, diagonal lines, and raster.

Also, encoding data including encoding information transmitted from each component may be generated and output as a bitstream, which may be implemented by a multiplexer (MUX). In this instance, encoding may be performed using, as an encoding scheme, a method such as exponential Golomb, context adaptive variable length coding (CAVLC), or context adaptive binary arithmetic coding (CABAC). However, the encoding scheme is not limited thereto, and it is possible to use various encoding schemes obtained by improving and modifying this encoding scheme.

When performing entropy encoding (assuming CABAC in this example) on the residual block data and a syntax element such as information generated in the encoding/decoding process, an entropy encoding device may include a binarizer, a context modeler, and a binary arithmetic coder. In this instance, the binary arithmetic coder may include a regular coding engine and a bypass coding engine. In this instance, the regular coding engine may be a section performed in relation to the context modeler, and the bypass coding engine may be a section performed regardless of the context modeler.

Since the syntax element input to the entropy encoding apparatus may not be a binary value, when syntax elements are not binary values, the binarizer may binarize the syntax elements and output a bin string including 0 or 1. In this instance, the bin represents a bit including 0 or 1, and may be encoded through the binary arithmetic coder. In this instance, one of the regular coding engine and the bypass coding engine may be selected based on a probability of occurrence of 0 and 1, which may be determined according to a coding/decoding setting. The bypass coding engine may be used when the syntax element is data whose frequencies of 0 and 1 are the same, and the regular coding engine may be used otherwise, which can be referred to when a subsequent regular coding engine is performed through context modeling (or context information update).

In this instance, the context is information about a probability of occurrence of a bin, and context modeling is a process of estimating a probability of a bin required for binary arithmetic coding using a bin, which is a result of binarization, as an input. For probability estimation, syntax element of a bin, an index that is a position of a bin in a bin string, a probability of a bin included in a neighboring block, etc. may be used, and at least one context table therefor may be used. For example, as information for some flags, a plurality of context tables may be used according to a combination of whether flags of neighboring blocks are used.

Various methods may be used when performing binarization on the syntax element. For example, the methods can be divided into fixed length binarization and variable length binarization. In the case of variable length binarization, it is possible to use unary binarization (truncated unary binarization), runcated rice binarization, k-th exp-Golomb binarization, truncated binary binarization, etc. In addition, signed binarization or unsigned binarization may be performed according to a range of values of a syntax element. A binarization process for the syntax element occurring in the present invention may be performed including not only the binarization mentioned in the above example, but also other additional binarization methods.

The inverse quantization section and the inverse transform section may be implemented by inversely performing the processes of the transform section and the quantization section. For example, the inverse quantization section may inversely quantize a quantized transformed coefficient generated by the quantization section, and the inverse transform section may inversely transform the inverse quantized transformed coefficient to generate a reconstructed residual block.

An addition section reconstructs a current block by adding a prediction block and a reconstructed residual block. The reconstructed block may be stored in the memory and used as reference data (the prediction section, the filter unit, etc.).

An in-loop filter section may include at least one post-processing filter component such as a deblocking filter, a sample adaptive offset (SAO), and an adaptive loop filter (ALF). The deblocking filter may remove block distortion occurring at a boundary between blocks in a reconstructed image. The ALF may perform filtering based on a value obtained by comparing a reconstructed image and an input image. In detail, filtering may be performed based on a value obtained by comparing an image reconstructed after a block is filtered through the deblocking filter and an input image. Alternatively, filtering may be performed based on a value obtained by comparing an image reconstructed after a block is filtered through the SAO and an input video.

The memory may store the reconstructed block or picture. The reconstructed block or picture stored in the memory may be provided to the prediction section that performs intra-prediction or inter-prediction. In detail, a storage space in the form of a queue of the bitstream compressed by the encoder may be processed as a coded picture buffer (CPB), and a space for storing a decoded image in units of pictures may be processed as a decoded picture buffer (DPB). In the case of CPB, decoding units are stored according to a decoding order, a decoding operation is emulated within the encoder, a bitstream compressed during the emulation process can be stored, the bitstream output from the CPB is reconstructed through a decoding process, the reconstructed image is stored in the DPB, and pictures stored in the DPB may be referred to in a subsequent image encoding and decoding process.

The decoding section may be implemented by performing a process in the encoding section in reverse. For example, a quantized coefficient sequence, a transformed coefficient sequence, or a signal sequence may be received from a bitstream and decoded, and decoding data including decoding information may be parsed and transmitted to each component.

On the other hand, a block partition section may also be included in the image encoding apparatus and the image decoding apparatus of FIGS. 1 and 2 although it is not illustrated. Information about the basic coding unit may be obtained from a picture partition section, and the basic coding unit may represent a basic (or starting) unit used for prediction, transform, quantization, etc., in an image encoding/decoding process. In this instance, coding units may be composed into one luminance coding block and two color difference coding blocks according to a color format (YCbCr in this example), and the size of each block may be determined according to the color format. In the following examples, description will be made based on blocks (luminance components in this example). In this instance, it is presumed that a block is a unit that may be obtained after each unit is determined, and a description will be given on the assumption that similar settings can be applied to other types of blocks.

The block partition section may be set in relation to each component of the image encoding apparatus and decoding apparatus, and the size and shape of the block may be determined through this process. In this instance, the set block may be defined differently depending on the configuration, and may correspond to a prediction block in the case of the prediction section, a transform block in the case of the transform section, and a quantization block in the case of the quantization section. The present invention is not limited thereto, and block units according to other components may be additionally defined. The size and shape of the block may be defined by the horizontal and vertical lengths of the block.

In the block partition section, a block may be expressed as M×N, and maximum and minimum values of each block can be obtained within a range. For example, when the shape of the block supports a square, and the maximum value of the block is set to 256×256 and the minimum value of the block is set to 8×8, it is possible to obtain a block having a size of $2^m \times 2^m$ (in this example, m is an integer from 3 to 8, for example, 8×8, 16×16, 32×32, 64×64, 128×128, or 256×256), a block having a size of $2^m \times 2^m$ (in this example, m is an integer from 4 to 128), or a block having a size of m×m (in this example, m is an integer from 8 to 256). Alternatively, in the case where the shape of the block supports a square and a rectangle and having the same range as that of the above example, it is possible to obtain a block having a size of $2^m \times 2^n$ (in this example, m and n are integers from 3 to 8, for example, 8×8, 8×16, 16×8, 16×16, 16×32, 32×16, 32×32, 32×64, 64×32, 64×64, 64×128, 128×64, 128×128, 128×256, 256×128, or 256×256 on the assumption that a ratio of width to height is a maximum of 2:1, and there may be no limit on the ratio of width to height, or there may be a maximum value of the ratio depending on the encoding/decoding setting). Alternatively, it is possible to obtain a block having a size of $2^m \times 2^n$ (in this example, m and n are integers from 4 to 128). Alternatively, it is possible to obtain a block having a size of m×n (in this example, m and n are integers from 8 to 256).

Obtainable blocks may be determined according to the encoding/decoding settings (for example, a block type, partitioning scheme, partition setting, etc.). For example, a block having a size of $2^m \times 2^n$ may be obtained as an encoding block, a block having a size of $2^m \times 2^n$ or m×n may be obtained as a prediction block, and a block having a size of $2^m \times 2^n$ may be obtained as a transform block. Information about a block size, a range, etc. (for example, information related to index and multiple, etc.) may be generated based on the settings.

The range (determined as a maximum value and a minimum value in this example) may be determined according to the type of block. In addition, for some blocks, block range information may be explicitly generated, and for some blocks, block range information may be implicitly determined. For example, related information may be explicitly generated in the encoding and transform block, and related information may be implicitly processed in the prediction block.

In the explicit case, at least one piece of range information may be generated. For example, in the case of the coding block, information about the range may generate information about the maximum value and the minimum value. Alternatively, the information may be generated based on a difference between a maximum value and a preset minimum value (for example, 8) (for example, generated based on the setting, information about a difference value between indices of a maximum value and a minimum value, etc.). In addition, information about a plurality of ranges for the horizontal and vertical lengths of a rectangular block may be generated.

In the implicit case, range information may be determined based on the encoding/decoding settings (for example, a block type, partitioning scheme, partition setting, etc.). For example, in the case of the prediction block, information about a maximum value and a minimum value may be obtained through a candidate group (in this example, M×N and m/2×n/2) that may be obtained by partition setting of the prediction block (for example, quad tree partitioning+partition depth 0) in the encoding block (for example, the maximum size of the encoding block is M×N, and the minimum size of the encoding block is m×n) which is an upper unit.

The size and shape of an initial (or starting) block of the block partition section may be determined by the upper unit. In the case of the coding block, a basic coding block obtained from the picture partition section may be an initial block, in the case of the prediction block, the coding block may be an initial block, and in the case of the transform block, the coding block or prediction block may be an initial block, which may be determined according to the coding/decoding settings. For example, when the coding mode is Intra, the prediction block may be the upper unit of the transform block, and when the coding mode is Inter, the prediction block may be a unit independent of the transform block. The initial block may be partitioned into blocks of small sizes as starting units of partitioning. When an optimal size and shape according to partitioning of each block are determined, the block may be determined as an initial block of a lower unit. For example, the block may be the encoding block in the former case, and may be the prediction block or the transform block in the latter case (lower unit). When the initial block of the lower unit is determined as in the above example, a partition process may be performed to find a block having an optimal size and shape as the upper unit.

In summary, the block partition section may partition the basic coding unit (or the largest coding unit) into at least one coding unit (or lower coding unit). In addition, the coding unit may be partitioned into at least one prediction unit, and may be partitioned into at least one transform unit. The coding unit may be partitioned into at least one encoding block, the encoding block may be partitioned into at least one prediction block, and may be partitioned into at least one transform block. The prediction unit may be partitioned into at least one prediction block, and the transform unit may be partitioned into at least one transform block.

As in the above example, when a block having an optimal size and shape is found through a mode determination process, mode information (for example, partition information, etc.) for this block may be generated. The mode information may be included in a bitstream along with information generated from a component to which the block belongs (for example, prediction-related information, transformation-related information, etc.) and transmitted to the decoder, and may be parsed in the same level unit in the decoder and used in an image decoding process.

In the example described later, a partitioning scheme will be described, and a description will be given on the assumption that an initial block has a square shape. However, in the case of a rectangular shape, the same or similar example is allowed.

The block partition section may support various partition modes. For example, tree-based partitioning or type-based partitioning may be supported, and other methods may be applied. In the case of tree-based partitioning, a partition flag may be used to generate partition information, and in the case of type-based partitioning, index information for block shapes included in a preset candidate group may be used to generate partition information.

Figure 3:
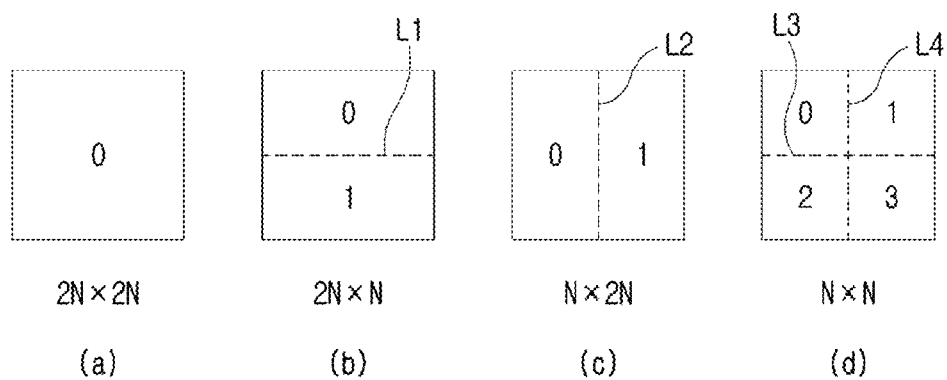
FIG. 3 is a schematic diagram illustrating a tree-based block shape.

FIG. 3 is a schematic diagram illustrating a tree-based block shape.

Referring to FIG. 3, "a" illustrates one 2N×2N block which is not partitioned, "b" illustrates 2N×N blocks obtained through a partial partition flag (horizontal partition of a binary tree in this example), "c" illustrates two N×2N blocks obtained through a partial partition flag (vertical partition of a binary tree in this example), and "d" illustrates four N×N blocks obtained through a partial partition flag (four partitions of a quad tree in this example or horizontal and vertical partitions of a binary tree). The shape of the obtained block may be determined according to the type of the tree used for partitioning. For example, when quad tree partitioning is performed, obtainable candidate blocks may be blocks "a" and "d". When binary tree partitioning is performed, obtainable candidate blocks may be blocks "a", "b", and "c". In the case of a quad tree, one partition flag is supported. The block "a" may be obtained when the partition flag is '0', and the block "b" may be obtained when the partition flag is '1'. In the case of a binary tree, a plurality of partition flags is supported, one of which may be a flag indicating whether partitioning is performed, one of which may be a flag indicating whether partitioning is performed horizontally/vertically, and one of which may be a flag indicating whether to allow overlap of horizontal/vertical partitioning. The obtainable candidate blocks when overlap is allowed may be "a", "b", "c", and "d", and the obtainable candidate blocks when overlap is not allowed may be "a", "b" and "c". A quad tree may be a basic tree-based partitioning scheme. In addition, a tree partitioning scheme (a binary tree in this example) may be included in the tree-based partitioning scheme. When a flag allowing additional tree partitioning is implicitly or explicitly activated, a plurality of tree partitioning can be performed. The tree-based partitioning may be a method that allows recursive partitioning. That is, a partitioned block may be set as an initial block again to perform tree-based partitioning, which may be determined according to partition settings such as a partition range and a partition allowable depth. This scheme may be an example of a hierarchical partitioning scheme.

Figure 4:
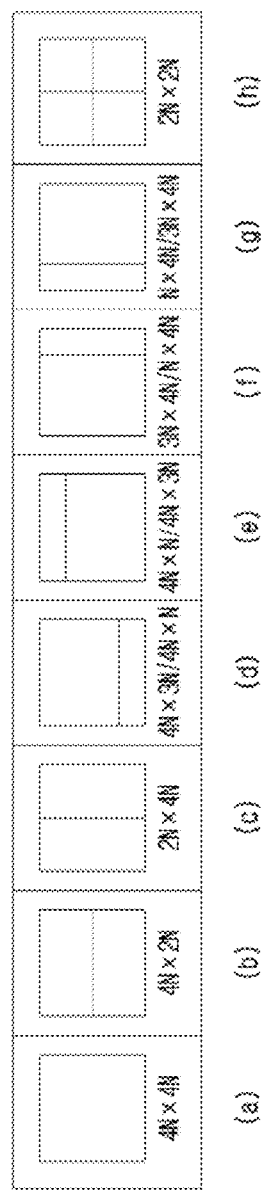
FIG. 4 is a schematic diagram illustrating a type-based block shape.

FIG. 4 is a schematic diagram illustrating a type-based block shape.

As illustrated in FIG. 4, according to the type, the partitioned block may have 1 partition shape ("a" in this example) and 2 partition shapes ("b", "c", "d" "e", "f", and "g" in this example) and 4 partition shapes ("h" in this example). A candidate group may be configured through various configurations. For example, the candidate group may be configured by a, b, c, n or a, b to g, n or a, n, q, etc. in FIG. 5. But the example is not limited thereto, and includes the following examples, so that various transformed examples may be executed. When a flag that allows symmetric partition is activated, the supported blocks may be "a", "b", "c" and "h" in FIG. 4, and when a flag that allows asymmetric partition is activated, the supported blocks may be all of "a" to "h" in FIG. 4. In the former case, related information (in this example, the flag that allows symmetric partition) may be implicitly activated, and in the latter case, related information (in this example, the flag that allows asymmetric partition) may be explicitly generated. Type-based partitioning may be a way to support one-time partition. Compared with the tree-based partitioning, blocks obtained through the type-based partitioning may not be able to perform further partitioning. This may be an example in which the partition allowable depth is zero (for example, single-layer partition).

Figure 5:
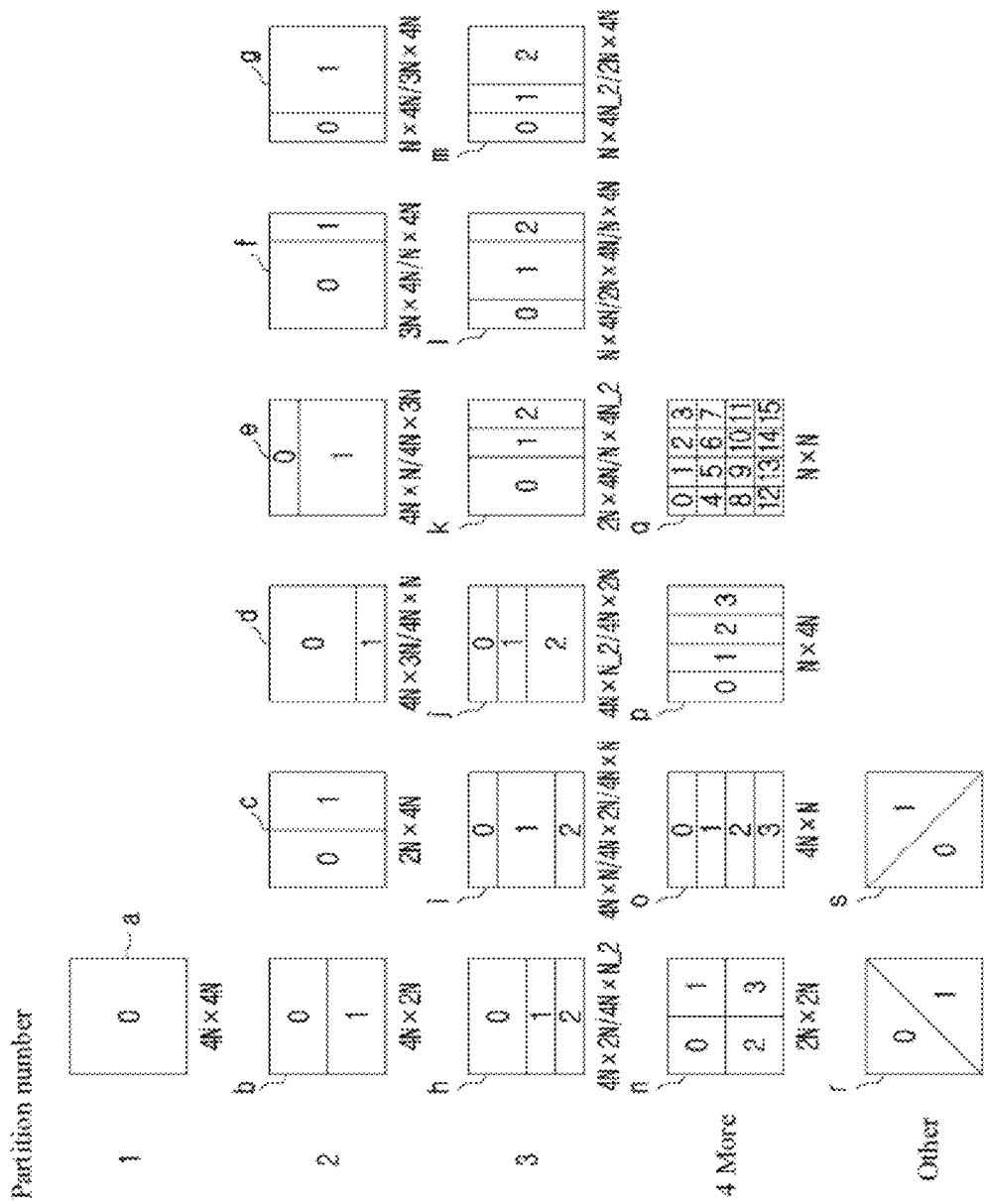
FIG. 5 is a schematic diagram illustrating various block shapes that may be obtained by a block partition section of the disclosure.

FIG. 5 is a schematic diagram illustrating various block shapes that may be obtained by a block partition section of the disclosure.

Referring to FIG. 5, blocks a to s may be obtained according to the partition setting and the partition mode, and can also have additional block shapes not illustrated.

As an example, for tree-based partitioning, asymmetric partition may be allowed. For example, in the case of a binary tree, blocks b and c in FIG. 5 (in this example, the case of partitioning into multiple blocks) may allow asymmetric partition, or blocks b to g in FIG. 5 (in this example, the case of partitioning into multiple blocks) may allow asymmetric partition. If the flag that allows asymmetric partition is explicitly or implicitly deactivated according to the encoding/decoding settings, an obtainable candidate block may be b or c (this example assumes that overlap of horizontal and vertical partitions is not allowed), and when the flag that allows asymmetric partition is activated, obtainable candidate blocks may be b, d, e (horizontal partition in this example) or c, f, g (vertical partition in this example). This example may correspond to a case where a partition direction is determined by a horizontal or vertical partition flag, and a block shape is determined according to the flag that allows asymmetry. However, the disclosure is not limited thereto, and the examples may be transformed into other examples.

As an example, additional tree partition may be used for tree-based partitioning. For example, partitioning of a ternary tree, a quad tree, an octa tree, etc., may be performed to obtain n partition blocks (3, 4, and 8 in this example, n is an integer). In the case of the ternary tree, supported blocks (partitioned into a plurality of blocks in this example) may be blocks h to m. In the case of the quad tree, supported blocks may be blocks n to p. In the case of the octa tree, a supported block may be a block q. Whether to support the tree-based partitioning may be implicitly determined according to the encoding/decoding setting, or related information may be explicitly generated. In addition, depending on the encoding/decoding setting, the partitioning may be used alone or may be used in combination with binary tree or quad tree partitioning. For example, in the case of the binary tree, blocks such as blocks b and c may be obtained. When a binary tree and a ternary tree are used in combination (in this example, it is presumed that a use range of the binary tree and a use range of the ternary tree are partially overlapped), blocks such as blocks b, c, i, and l may be obtained. When the flag allowing additional partitioning other than the existing tree is explicitly or implicitly deactivated according to the encoding/decoding setting, an obtainable candidate block may be the block b or c. When the flag is activated, the obtainable candidate block may be the blocks b and i or the blocks b, h, i, and j (horizontal partitioning in this example), or may be the blocks c and l or the blocks c, k, l, and m (vertical partitioning in this example). This example may correspond to a case where a partition direction is determined by a horizontal or vertical partition flag, and a block shape is determined according to a flag that allows additional partition. However, the disclosure is not limited thereto, and the examples are transformed into other examples.

As an example, type-based blocks may allow a non-rectangular partition. For example, it is possible to partition in the shape of r and s. When combined with the above type-based block candidate group, blocks a, b, c, h, r, s or a to h, r, s are supportable blocks. In addition, blocks supporting n partitions such as blocks h to m may be included in the candidate group (for example, n is an integer 3 other than 1, 2, and 4 in this example).

The partition mode may be determined according to the encoding/decoding settings.

As an example, the partition mode may be determined according to the block type. For example, the coding block and the transform block may use tree-based partitioning, and the prediction block may use type-based partitioning. Also, a combination of two types of partition modes may be used. For example, the prediction block may use a partition mode that combines the tree-based partitioning with the type-based partitioning, and the partition mode differs according to at least one range applied to the block.

For example, the partition mode may be determined according to the size of a block. For example, tree-based partitioning may be performed for a partial range (for example, a×b to c×d, when the latter is of larger size) between the maximum value and the minimum value of the block, and type-based partitioning may be performed for a partial range (for example, e×f to g×h). In this instance, range information according to the partition mode may be explicitly generated or may be implicitly determined.

As an example, the partition mode may be determined according to the shape of a block (or a block before partitioning). For example, if the block is in a square shape, tree-based partitioning and type-based partitioning may be performed. Alternatively, when the block is rectangular, tree-based partitioning may be performed.

The partition setting may be determined according to the encoding/decoding settings.

As an example, partition setting may be determined according to the block type. For example, in tree-based partitioning, quad tree partitioning may be used for the coding block and the prediction block, and binary tree partitioning may be used for the transform block. Alternatively, an allowable partitioning depth may be set to m in the case of the coding block, the allowable partitioning depth may be set to n in the case of the prediction block, and the allowable partitioning depth may be set to o in the case of the transform block, where m, n, and o may be the same or different.

For example, partition setting may be determined according to the size of the block. For example, quad tree partitioning may be performed for a partial range of the block (for example, a×b to c×d), and binary tree partitioning may be performed for a partial range (for example, e×f to g×h, in this example, it is presumed that c×d is larger than g×h). In this instance, the range may include all ranges between the maximum value and the minimum value of the block, and the ranges may be set not to overlap each other or to overlap each other. For example, the minimum value of the partial range may be the same as the maximum value of the partial range, or the minimum value of the partial range may be less than the maximum value of the partial range. In the case of overlapping ranges, a partition scheme having a higher maximum value may have priority. That is, in the partitioning scheme having the priority, whether to perform a partitioning scheme having a lower priority may be determined according to a result of partitioning. In this case, range information according to a tree type may be explicitly generated or may be implicitly determined.

As another example, type-based partitioning with some candidate groups may be performed in certain ranges of a block (the same as the example), and type-based partitioning with some candidate groups (in the present example, at least one configuration is different from the previous candidate group) may be performed in certain ranges (the same as the example). In this instance, the range may include all ranges between the maximum value and the minimum value of the block, and the range may have settings that do not overlap with each other.

As an example, partition setting may be determined according to the shape of a block. For example, when the block has a square shape, quad tree partitioning may be performed. Also, when the block is rectangular, binary tree partitioning may be performed.

For example, partition setting may be determined according to encoding/decoding information (for example, a slice type, a color component, a coding mode, etc.). For example, quad tree (or binary tree) partitioning may be performed in a partial range (for example, a×b to c×d) when the slice type is I, may be performed in a partial range (for example, e×f to g×h) when the slice type is P, and may be performed in a partial range (for example, i×j to k×l) when the slice type is B. In addition, an allowable partitioning depth of quad tree (or binary tree) partitioning may be set to m when the slice type is I, may be set to n when the slice type is P, and may be set to o when the slice type is B. Here, m, n, and o may be or may not be the same. Some slice types may have the same configuration as that of other slices (for example, P and B slices).

As another example, the allowable partitioning depth of quad tree (or binary tree) partitioning may be set to m when the color component is a luminance component, and may be set to n when the color component is a color difference component, and m and n may be or may not be the same. In addition, a range of quad tree (or binary tree) partitioning in the case where the color component is the luminance component (for example, a×b to c×d) may be or may not be the same as a range of quad tree (or binary tree) partitioning in the case where the color component is the color difference component (for example, e×f to g×h).

As another example, the allowable partitioning depth of quad tree (or binary tree) partitioning may be m when the encoding mode is Intra, and may be n (in this example, n is presumed to be larger than m) when the encoding mode is Inter, where m and n may be or may not be the same. In addition, the range of quad tree (or binary tree) partitioning in the case where the encoding mode is Intra may be or may not be the same as the range of quad tree (or binary tree) partitioning in the case where the encoding mode is Inter.

In the above example, information about whether to support adaptive partitioning candidate group configuration according to encoding/decoding information may be explicitly generated or implicitly determined.

Through the above example, the case where the partition mode and the partition setting are determined according to the encoding/decoding setting has been described. The above example shows some cases according to each element, and modification into other cases may be possible. In addition, the partition mode and the partition setting may be determined according to a combination of a plurality of elements. For example, the partition mode and the partition setting may be determined according to the type, size, shape, encoding/decoding information, etc. of the block.

In addition, in the above example, elements related to the partition mode, setting, etc. may be implicitly determined or information may be explicitly generated to determine whether to allow the adaptive case as in the above example.

In the partition setting, a partition depth refers to the number of times of spatial partitioning with respect to the initial block (in this example, the partition depth of the initial block is 0), and partitioning into smaller blocks may be performed as the partition depth increases. A depth-related setting may vary according to the partitioning scheme. For example, in the tree-based partitioning mode, one common depth may be used for the partition depth of the binary tree and the partition depth of the ternary tree, and individual depths can be used depending on the tree type.

In the above example, when an individual partition depth is used according to the tree type, the partition depth may be set to 0 at a partition start position (a block before partitioning in this example) of the tree. The partition depth may be calculated by taking a position where partitioning starts as the center, not based on a partition range of each tree (the maximum value in this example).

Figure 6:
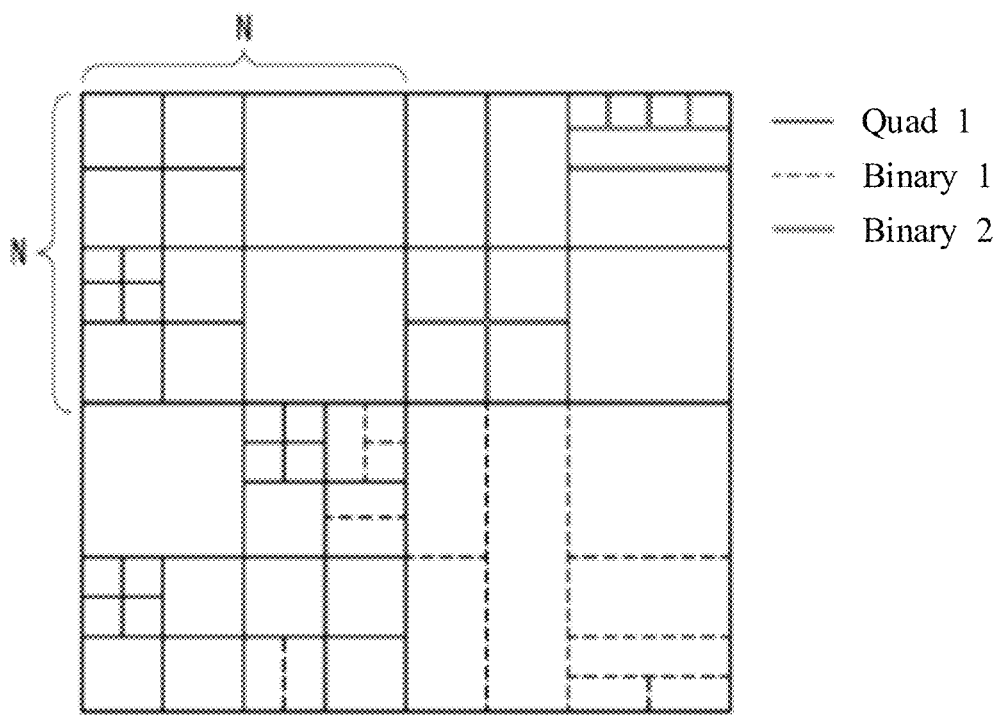
FIG. 6 is a schematic diagram for explaining tree-based partitioning according to an embodiment of the disclosure.

FIG. 6 is a schematic diagram for explaining tree-based partitioning according to an embodiment of the disclosure.

"a" represents an example of quad tree and binary tree partitioning. Specifically, a top left block of "a" illustrates the quad tree partitioning, a top right block and a bottom left block illustrate the quad tree and binary tree partitioning, and a bottom right block illustrates the binary tree partitioning. In the figure, the solid line (Quad1 in this example) represents a boundary line that is partitioned into a quad tree, the dashed line (Binary1 in this example) represents a boundary line that is partitioned into a binary tree, and the thick solid line (Binin2 in this example) represents a boundary line that is partitioned into a binary tree. The difference between the dashed line and the thick solid line is the difference in the partitioning schemes.

As an example, (the quad tree partitioning allowable depth of the top left block is 3, if the current block is N×N, partitioning is performed until one of the horizontal or vertical reaches (N>>3), and partition information is generated until (N>>2). This is also applied to the following example. It is assumed that the maximum and minimum values of a quad tree are N×N, (N>>3)×(N>>3)) when performing tree partitioning, it may be partitioned into four blocks with ½ of the horizontal and vertical lengths. When partitioning is activated, the value of a partition flag may be '1', and when partitioning is deactivated, the value of the partition flag may be '0'. According to the setting, the partition flag of the top left block may be generated together with the top left block of b.

As an example, (for the top right block, it is assumed that the quad tree partitioning allowable depth is 0, the binary tree partitioning allowable depth is 4, the maximum and minimum values of quad tree partitioning are N×N, (N>>2)×(N>>2), the maximum and minimum values of the binary tree are (N>>1)×(N>>1), (N>>3)×(N>>3)) in the case of performing quad tree partitioning on the initial block, the top right block may be partitioned into four blocks with a length of ½ of the horizontal and vertical lengths. The size of the partitioned block is (N>>1)×(N>>), which means that binary tree partitioning may be performed (in this example, it is greater than the minimum value of quad tree partitioning, but the partitioning depth is limited). That is, this example may be an example in which quad tree partitioning and binary tree partitioning cannot overlap. The partition information of the binary tree in this example may be configured by multiple partition flags. Some flags may be horizontal partitioning flags (corresponding to x in x/y in this example), and some flags may be vertical partitioning flags (corresponding to y in x/y in this example). The configuration of the partition flags may have settings similar to quad tree partitioning (for example, whether to perform activation). In this example, the two flags may be repeatedly activated. When '-' is used to generate flag information in the figure, '-' may correspond to the implicit processing of the flag. When additional partitioning cannot be performed according to conditions such as the maximum value, the minimum value, and the partitioning depth of the tree partitioning, the implicit processing of the flag may be generated. According to the setting, the partition flag of the top right block may be generated together with the top left block of b.

As an example, (for the bottom left block, it is assumed that the quad tree partitioning allowable depth is 3, the binary tree partitioning allowable depth is 2, the maximum and minimum values of quad tree partitioning are N×N, (N>>3)×(N>>3), the maximum and minimum values of binary tree partitioning are (N>>2)×(N>>2), (N>>4)×(N>>4), and in an overlapping range, the partition priority is endowed to the quad tree partitioning) when performing quad tree partitioning on the initial block, the lower left block may be partitioned into four blocks with a length of ½ of the horizontal and vertical lengths. The size of the partitioned block is (N>>1)×(N>>), which means that binary tree partitioning and quad tree partitioning may be performed according to the settings of this example. That is, this example may be an example in which quad tree partitioning and binary tree partitioning may overlap. In this case, it may be determined whether to perform binary tree partitioning according to a result of quad tree partitioning having a given priority. When performing quad tree partitioning, binary tree partitioning will not be performed. If quad tree partitioning is not performed, binary tree partitioning may be performed. If quad tree partitioning is not performed, even if the conditions for partition are met according to the above settings, quad tree partitioning may not be performed. The partition information of the binary tree in this example may be configured by multiple partition flags. Some flags may be partition flags (corresponding to x in x/y in this example), and some flags may be partition direction flags (corresponding to y in x/y in this example, and it may be determined whether to generate y information according to x). The partition flags may have settings similar to quad tree partitioning. In this example, the horizontal and vertical partitions cannot be activated by overlapping each other. When the flag information is generated as '-' in the figure, '-' may have settings similar to the above example. According to the setting, the partition flag of the bottom left block may be generated together with the bottom left block of b.

As an example, (for the bottom right block, it is assumed that the binary tree partitioning allowable depth is 5, the maximum and minimum values of binary tree partitioning are N×N, (N>>2)×(N>>3)) in the case of performing binary tree partitioning on the initial block, the bottom right block may be partitioned into two blocks with a length of ½ of the horizontal and vertical lengths. The setting of the partition flag in this example may be the same as the bottom left block. When the flag information is generated as '-' in the figure, '-' may have settings similar to the above example. This example illustrates the case where the horizontal and vertical minimum values of the binary tree are set differently. According to the setting, the partition flag of the bottom right block may be generated together with the bottom right block of b.

As illustrated in the above example, after determining block information (for example, type, size, shape, position, slice type, color component, etc.), the partition mode and the partition setting according to the block information may be determined, and the partition process may be performed accordingly.

Figure 7:
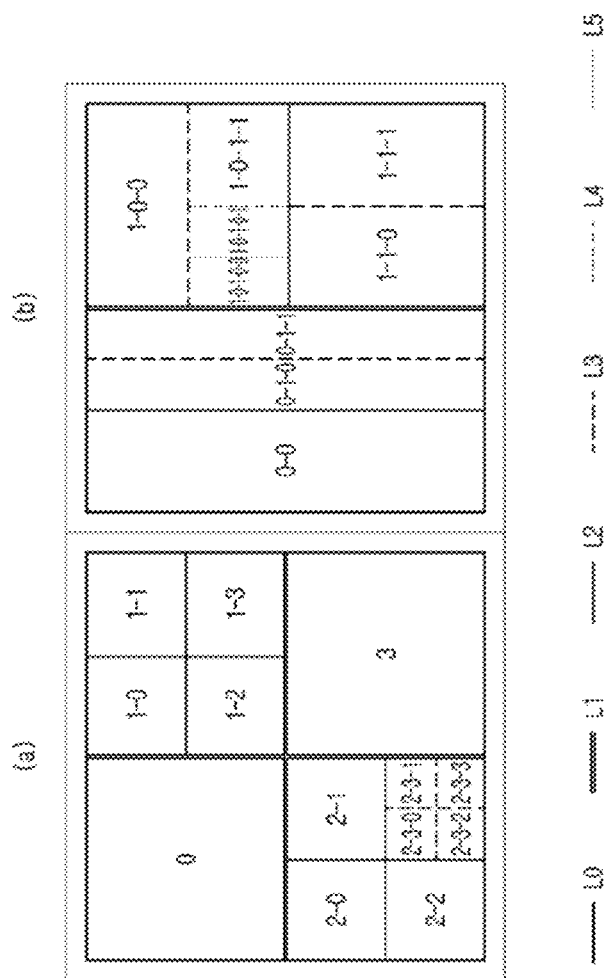
FIG. 7 is a schematic diagram for explaining tree-based partitioning according to an embodiment of the disclosure.

FIG. 7 is a schematic diagram for explaining tree-based partitioning according to an embodiment of the disclosure.

Referring to block a and block b, the thick solid line L0 represents a maximum coding block, a block partitioned by a thick solid line and other lines L1 to L5 represents a partitioned coding block, the number within a block represents the position of a partitioned sub-block (in this example, in the order of raster scan), the number of '-' represents the partitioning depth of the corresponding block, and the number of a boundary line between blocks represents the number of partitions. For example, if a block is partitioned into four blocks (a quad tree in this example), it has an order of UL(0)-UR(1)-DL(2)-DR(3), and if a block is partitioned into two blocks (a binary tree in this example), it has an order of L or U(0)-R or D(1), which may be defined at each partitioning depth. The following example illustrates a case where obtainable coding blocks are limited.

As an example, it is assumed that the maximum coding block of a is 64×64, the minimum coding block is 16×16, and quad tree partitioning is used. In this case, because the size of blocks 2-0, 2-1, and 2-2 (having a size of 16×16 in this example) is equal to the size of the minimum coding block, they may not be partitioned into smaller blocks, such as blocks 2-3-0, 2-3-1, 2-3-2, and 2-3-3 (having a size of 8×8 in this example). In this case, because there are 16×16 blocks obtainable in blocks 2-0, 2-1, 2-2, and 2-3, that is, one candidate group, no block partition information is generated.

As an example, it is assumed that the maximum coding block of b is 64×64, the length of the minimum coding block in the horizontal or vertical direction is 8, and the allowable partitioning depth is 3. In this case, since block 1-0-1-1 (having a size of 16×16 and a partitioning depth of 3 in this example) meets the minimum coding block condition, the block may be partitioned into smaller blocks. However, since it is equal to the allowable partitioning depth, the block may not be partitioned into blocks having a larger partitioning depth (blocks 1-0-1-0-0 and 1-0-1-0-1 in this example). In this case, since there are 16×8 blocks obtainable in blocks 1-0-1-0 and 1-0-1-1, that is, one candidate group, no block partition information is generated.

As illustrated in the above example, quad tree partitioning or binary tree partitioning may be supported according to encoding/decoding. Alternatively, quad tree partitioning and binary tree partitioning may be supported together. For example, one or two of the above modes may be supported according to the block size, the partitioning depth, etc. If the block belongs to a first block range, a quad tree partitioning may be supported, and if the block belongs to a second block range, binary tree partitioning may be supported. When multiple partition modes are supported, there may be at least one setting of the maximum coding block size, the minimum coding block size, the allowable partitioning depth, etc. according to each mode. The ranges may be set to overlap each other, or may not overlap. Alternatively, it is also possible that a certain range includes another range. The above settings may be determined according to single or mixed factors such as a slice type, a coding mode and a color component.

As an example, the partition setting may be determined according to the slice type. In the case of I slice, the supportable partition setting is that, in the case of a quad tree, the supportable partition range is 128×128 to 32×32, and in the case of a binary tree, the supportable partition range is 32×32 to 8×8. In the case of PB slice, the supportable partition setting is that, in the case of a quad tree, the supportable partition range is 128×128 to 32×32, and in the case of a binary tree, the supportable partition range is 64×64 to 8×8.

As an example, the partition setting may be determined according to the coding mode. When the coding mode is Intra, the supported partition setting is, the partition range of 64×64 to 8×8 and the allowable partitioning depth of 2 may be supported for the binary tree. When the coding mode is Inter, the supported partition setting is, the partition range of 32×32 to 8×8 and the allowable partitioning depth of 3 may be supported for the binary tree.

As an example, the partition setting may be determined according to the color component. For a luminance component, the supportable partition range is 256×256 to 64×64 in the case of a quad tree, and the supportable partition range is 64×64 to 16×16 in the case of a binary tree. For a color difference component, the same settings as the luminance component are supported in the case of a quad tree (in this example, the length ratio of each block is set according to a color difference format), and the supported partition range is 64×64 to 4×4 in the case of a binary tree (in this example, it is assumed that the range in the same luminance component is 128×128 to 8×8, 4:2:0).

The examples describe the case where the partition settings are different according to the block type. In addition, some blocks may be combined with other blocks to perform a partition process. For example, when the coding block and the transform block are combined into one unit, the partition process is performed to obtain the optimal block size and shape, which may be not only the optimal size and shape of the coding block, but also the optimal size and shape of the transform block. Alternatively, the coding block and the transform block may be combined into one unit, the prediction block and the transform block may be combined into one unit, the coding block, the prediction block, and the transform block may be combined into one unit, and other blocks may be combined.

In the disclosure, a case where a separate partition setting is provided in each block is described, but it is also possible to combine multiple units into one unit to have one partition setting.

In the above process, the generated information will be included into a bit stream in at least one unit of sequence, picture, slice, tile, etc. in the coder, and the decoder will parse related information from the bit stream.

In the image encoding/decoding process, an input pixel value may be different from an output pixel value, and an adjustment process of the pixel value may be performed to prevent distortion due to operation errors. A pixel value adjustment scheme is a process of adjusting a pixel value exceeding the range of the pixel value to be within the range of the pixel value, and may be referred to as clipping.

TABLE 1 pixel_val'=Clip_x (pixel_val, minI, maxI)
Clip_x (A, B, C)
{
If (A<B)output=B;
else if(A>C)output=C;
else output=A;
}

Table 1 is an example code for a clipping function (Clip_x) used to perform pixel value adjustment. Referring to Table 1, an input pixel value (pixel_val) and a minimum value (minI) and a maximum value (maxI) of an allowable pixel value range may be input as parameters of the clipping function (Clip_x). In this instance, if the description is made based on a bit depth (bit_depth), the minimum value (minI) may be 0, and the maximum value (maxI) may be (2 bit_depth−1). When the clipping function (Clip_x) is executed, the input pixel value (pixel_val, parameter A) less than the minimum value (minI) is changed to the minimum value (minI), and the input pixel value greater than the maximum value mail (parameter C) may be changed to the maximum value (maxI). Therefore, an output value (output) may be returned as an output pixel value (pixel_val') after the pixel value adjustment is completed.

The range of pixel values is determined according to the bit depth, but the pixel values (for example, pictures, slices, tiles, blocks, etc.) constituting the image are different according to the type and characteristics of an image, so they may not be generated in the range of all pixel values. According to an embodiment of the disclosure, the range of pixel values constituting an actual image may be referred, so that the range of pixel values may be used in the image encoding/decoding process.

For example, in the pixel value adjustment method according to Table 1, the minimum value (minI) of the clipping function may be used as the minimum value of the pixel values constituting the actual image, and the maximum value (maxI) of the clipping function may be used as the maximum value of the pixel values constituting the actual image.

In summary, the image encoding/decoding apparatus may include a pixel value adjustment method based on a bit depth and/or a pixel value adjustment method based on a pixel value range constituting an image. In the encoder/decoder, flag information used to determine whether to support an adaptive pixel value adjustment method may be supported. When the flag information is '1', pixel value adjustment method selection information may be generated, and when the flag information is '0', a preset pixel value adjustment method (in this example, a bit depth-based method) may be used as a basic pixel value adjustment method. When the pixel value adjustment method selection information indicates the pixel value adjustment method based on a pixel value range constituting an image, pixel value related information of the image may be included. For example, information about minimum and maximum values of each image and a median value described later according to color components may be included. The information generated during adjustment may be recorded in units of video, sequence, picture, slice, tile, block, etc. of the encoder and then transmitted, and the information recorded in the decoder may be parsed to reconstruct related information in the same unit.

On the other hand, through the process, and through pixel value adjustment based on a bit depth or pixel value adjustment based on a range of pixel values constituting an image, the range of pixel values including minimum and maximum values of the pixel values may be changed (determined or defined), or additional pixel value range information may also be changed (determined or defined). For example, the maximum and minimum values of the pixel values used to constitute an actual image may be changed, and the median value used to configure the pixel values may also be changed.

That is, in the pixel value adjustment process based on the bit depth, minI may represent a minimum pixel value of an image, maiI may represent a maximum pixel value of the image, I may represent a color component, and medianI may represent a central pixel value of the image. minI may be 0, maiI may be (1<<bit_depth−1)−1, midI may be 1<<(bit_depth−1), and medianI may be obtained in other forms including the above examples according to the encoding/decoding settings. The median value is only a term used for description in the disclosure, and may refer to pixel value range information that may be changed (determined or defined) according to the pixel value adjustment process in the image encoding/decoding process.

For example, in the pixel value adjustment process according to the range of pixel values constituting an image, minI may be a minimum pixel value of the image, maiI may be a maximum pixel value of the image, and medianI may be a central pixel value of the image. medianI may be an average value of the pixel values in the image, may be a value at the center when pixels of the image are aligned, or may be a value obtained according to the pixel value range information of the image. In at least one of minI or maiI, medianI may be derived. That is, medianI may be a pixel value within the pixel value range of the image.

Specifically, medianI may be a value obtained according to the pixel value range information of the image (minI or maxI in this example), such as (minI+maxI)/2 or (minF-maxI)>>1, (minI+maxI+1)/2, (minI+maxI+1)>>1, and medianI may be obtained in other forms including the above examples according to the encoding/decoding settings.

Next, an embodiment according to pixel value adjustment processing will be described (in this example, it is a median value).

As an example, a basic bit depth is 8 bits (0 to 255), a pixel value adjustment process based on the range of pixel values constituting the image is selected (in this example, the minimum value is 10, the maximum value is 190, and a median value derived (averaged) from the minimum and maximum values is 100), and if the current block is a first block in an image (picture in this example), adjacent blocks used for encoding/decoding (left, bottom left, top left, top, and top right in this example) do not exist, so a reference pixel may be filled with the median value of 100. The reference pixel may be used to perform an intra prediction process according to a prediction mode.

As an example, a basic bit depth is 10 bits (0 to 1023), a pixel value adjustment process based on the range of pixel values constituting the image is selected (in this example, the median value is 600, and there are related syntax elements), and if the current block is a first block in an image (slice or tile in this example), adjacent blocks used for encoding/decoding (left, bottom left, top left, top, and top right in this example) do not exist, so a reference pixel may be filled with the median value of 600. The reference pixel may be used to perform an intra prediction process according to a prediction mode.

As an example, a basic bit depth is 10 bits, a pixel value adjustment process based on the range of pixel values constituting the image is selected (in this example, the intermediate value is 112, and there are related syntax elements), the setting of determining whether pixels of corresponding blocks may be used in the prediction of the current block is activated according to the coding mode of adjacent blocks (intra prediction/inter prediction) (in this example, when the coding mode of corresponding blocks is intra prediction, it may be used for a reference pixel of the current block, and when the coding mode is inter prediction, it cannot be used for the reference pixel of the current block; when the setting is deactivated, it may be used as a pixel of the current block, independent of the coding mode of the corresponding blocks; the related syntax element is constrained_intra_pred_flag, which may appear in a P or B image type). If the current block is located on the left side of the image, adjacent blocks used for encoding/decoding (left, bottom left, and top left in this example) do not exist, and if there are adjacent blocks used for encoding/decoding (right and top right in this example), but because the coding mode of the block is inter prediction and is disabled by the above setting, there is no available reference pixel, and then the reference pixel may be filled with the median value (112 in this example). That is, since there is no available reference pixel, it may be filled with the median value of the pixel value range of the image. The reference pixel may be used to perform an intra prediction process according to a prediction mode.

In the above embodiment, the prediction section has illustrated various cases related to the median value, but this may be included in another configuration of video encoding/decoding. In addition, the disclosure is not limited to the above embodiment, and modifications and extensions may be performed in various cases.

In the disclosure, the pixel value adjustment process may be applied to the encoding/decoding process of a prediction section, a transform section, a quantization section, an inverse quantization section, an inverse transform section, a filter section, a memory, etc. For example, an input pixel in the pixel value adjustment method may be a reference sample or a prediction sample in the prediction process, and may be a reconstructed sample in the process of transform, quantization, inverse transform, and inverse quantization. Moreover, the pixel may be a reconstructed sample in an in-loop filtering process, or may be a stored pixel in the memory. In this case, in the process of transform, quantization, inverse transform, and inverse quantization, the reconstructed sample may refer to a reconstructed sample before an in-loop filter is applied. The reconstructed sample in the in-loop filter may refer to a reconstructed sample after the in-loop filter is applied. The reconstructed sample in a deblocking filter process may refer to a reconstructed sample after a decoding filter is applied. The reconstructed sample in an SAO process may refer to a reconstructed sample after SAO is applied. The reconstructed sample in an ALF process may refer to a reconstructed sample after ALF is applied. Examples of various cases as described above have been described, but the disclosure is not limited thereto, and may be applied to the input, intermediate, and output steps of all encoding/decoding processes that call the pixel value adjustment process.

In the following example, it is described under the assumption that a clipping function Clip_Y of a luminance component Y and clipping functions Clip_Cb and Clip_Cr of color difference components Cb and Cr are supported.

In the disclosure, the prediction section may be classified into intra prediction and inter prediction, and the intra prediction and the inter prediction may be defined as follows.

The intra prediction may be a technology for generating a prediction value from a region where encoding/decoding of a current image (for example, picture, slice, tile, etc.) is completed, and the inter prediction may be a technology for generating a prediction value from an image (for example, picture, slice, tile, etc.) that completes one encoding/decoding before a current image.

Moreover, the intra prediction may be a technology for generating a prediction value from a region where the encoding/decoding of a current image is completed, but some prediction methods may exclude, for example, a method of generating a prediction value from a reference image, block matching, template matching, and other predictions. The inter prediction may be a technology for generating a prediction value from an image that completes at least one encoding/decoding. The image that completes encoding/decoding may be configured to include the current image.

One of the above definitions may be followed according to the encoding/decoding settings, and the following example will be described by assuming that the first definition is followed. In addition, although the description is performed under the assumption that the prediction value is a value obtained by prediction in a spatial domain, the disclosure is not limited thereto.

Figure 8:
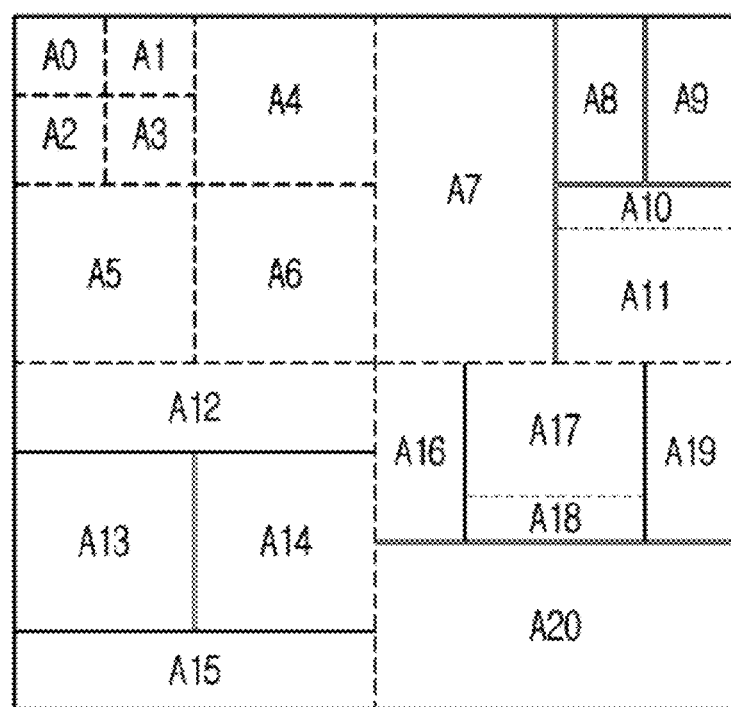
FIG. 8 illustrates a block partition process according to an embodiment of the disclosure.

FIG. 8 illustrates a block partition process according to an embodiment of the disclosure. In detail, the figure illustrates an example of a size and shape of a block obtainable according to one or more partitioning methods starting with a basic coding block.

In the figure, a thick solid line represents a basic encoding block, a bold dotted line represents a quad tree partitioning boundary, a double solid line represents a symmetric binary tree partition boundary, a solid line represents a ternary tree partition boundary, and a thin dotted line represents an asymmetric binary tree partition boundary. Except for the thick solid line, each line represents a boundary divided according to each partitioning method. Partition settings (for example, a partition type, partition information, a partition information configuration order, etc.) described below are not limited to the case of the corresponding example, and various modifications may be made.

For ease of description, a description will be given on the assumption that individual block partition settings are set for upper left, upper right, lower left, and lower right blocks (N×N, 64×64) based on the basic encoding block (2N×2N, 128×128). First, four sub-blocks are obtained due to one partitioning operation (partitioning depth 0→1, that is, partitioning depth increases by 1) in the initial block, and the maximum encoding block is 128×128, the minimum encoding block is 8×8, and the maximum partitioning depth is 4 due to a partition setting for the quad tree, which is a setting commonly applied to each block.

(1 Time, Top Left Block, A1-A6)

In this example, when single-tree partition (quad tree in this example) is supported, the size and shape of obtainable blocks may be determined by one block partition setting (for example, a maximum coding block, minimum coding block, partitioning depth block, etc.). In this example, when a block may be obtained according to partitioning (partitioning the width and the height into two parts, respectively), partition information required for one partitioning operation (based on a block 4M×4N before partitioning, partitioning depth is increased by 1) is a flag indicating whether to perform partitioning (in this example, x is partitioned when the flag is 0 and o is partitioned when the flag is 1). The obtainable candidates may be 4M×4N and 2M×2N.

(2 Times, Top Right Block, A7 to A11)

In this example, when multi-tree partitioning (in this example, a quad tree and a binary tree) is supported, the size and shape of obtainable blocks may be determined through multiple block partition settings. In this example, it is assumed that in the case of the binary tree, the maximum coding block is 64×64, the minimum coding block has a length of 4 and the maximum partitioning depth is 4.

In this example, when more than two blocks (2 or 4 in this example) are obtainable according to partitioning, partition information required for one partition operation (the partitioning depth of the quad tree is increased by 1) is a flag indicating whether to perform partitioning, a flag indicating a partition type, a flag indicating a partition shape, and a flag indicating a partition direction. The obtainable candidates are 4M×4N, 4M×2N, 2M×4N, 4M×N/4M×3N, 4M×3N/4M×N, M×4N/3M×4N, and 3M×4N/M×4N.

If quad tree and binary tree partition ranges overlap (that is, in a range where both quad tree partitioning and binary tree partitioning may be performed in a current stage), and a current block (in a state before partitioning) is a block obtained by quad tree partitioning (a parent block <when the partition depth is 1 less than the current one> a block obtained by the quad tree partitioning), partition information may be divided into the following cases. That is, when a block supported according to each partition setting may be obtained by a plurality of partitioning methods, partition information may be generated by classification as follows.

(1) When Quad Tree Partitioning and Binary Tree Partitioning Overlap Each Other

|            | a | b | c | d | e |
|------------|---|---|---|---|---|
| QT         | 1 |   |   |   |   |
| No Split   | 0 | 0 |   |   |   |
| SBT hor    | 0 | 1 | 0 | 0 |   |
| ABT hor 1/4| 0 | 1 | 0 | 1 | 0 |
| ABT hor 3/4| 0 | 1 | 0 | 1 | 1 |
| SBT ver    | 0 | 1 | 1 | 0 |   |
| ABT ver 1/4| 0 | 1 | 1 | 1 | 0 |
| ABT ver 3/4| 0 | 1 | 1 | 1 | 1 |

In the above table, "a" is a flag indicating whether to perform quad tree partitioning. If the flag is 1, quad tree partitioning (QT) is performed. If the flag is 0, "b" is confirmed, which is a flag indicating whether to perform binary tree partitioning. If b is 0, partitioning is not performed in the block (no partition), and if b is 1, binary tree partitioning is performed.

"c" is a flag indicating a partition direction, c=0 means horizontal partitioning (hor), and c=1 means vertical partitioning (ver). "d" denotes a flag indicating a partition shape. d=0 means symmetric partitioning (SBT, symmetric binary tree), and d=1 means asymmetric partitioning (ABT, asymmetric binary tree). Only when d is 1, information about a detailed partitioning ratio (1/4 or 3/4) in asymmetric partitioning is checked. When d is 0, in left/right or upper/lower blocks, a ratio of the left block to the upper block is 1/4, and a ratio of the upper block to the lower block is 3/4. When d is 1, a ratio is the opposite thereof (2) When Only Binary Tree Partitioning can be Performed In the above table, partition information is expressed using the flags "b" to "e" except for the flag "a".

In FIG. 8, the case of block A7 is a case where quad tree partitioning can be performed in pre-partition blocks (A7 to A11) (that is, even though quad tree partitioning can be performed, binary tree partitioning is performed instead of quad tree partitioning), and thus corresponds to the case where partition information in item (1) is generated.

On the other hand, in the case of blocks A8 to A11, if binary tree partitioning is performed without previously performing quad tree partitioning in the pre-partition blocks (A8 to A11) (that is, quad tree partitioning is no longer possible in the corresponding blocks <A8 to A11>), and thus the case corresponds to a case where partition information in item (2) is generated.

(3 Times, Bottom Left Block, A12 to A15)

In this example, partitioning of the multi-tree scheme (quad tree, binary tree, and ternary tree in this example) is supported, and a size and shape of a block that can be obtained may be determined through a plurality of block partition settings. In this example, it is presumed that in the case of the binary tree/ternary tree, the maximum encoding block is 64×64, the minimum encoding block has a length of 4, and the maximum partitioning depth is 4.

In this example, when more than two blocks (2, 3, and 4 in this example) are obtainable according to partitioning, partition information required for one partitioning operation is a flag indicating whether to perform partitioning, a flag indicating a partition type, a flag indicating a partition shape, and a flag indicating a partition direction. The obtainable candidates are 4M×4N, 4M×2N, 2M×4N, 4M×N/4M×2N/4M×N, and M 4N/2M×4N/M×4N.

When quad tree and binary tree/ternary tree partitioning ranges overlap each other, and a current block is a block obtained by quad tree partitioning, partition information may be divided into the following cases.

(1) When Quad Tree Partitioning and Binary Tree/Ternary Tree Partitioning Overlap Each Other

|  | a | b | c | d |
|---|---|---|---|---|
| QT | 1 |  |  |  |
| No Split | 0 | 0 |  |  |
| BT hor | 0 | 1 | 0 | 0 |
| TT hor | 0 | 1 | 0 | 1 |
| Bt ver | 0 | 1 | 1 | 0 |
| TT ver | 0 | 1 | 1 | 1 |

In the above table, "a" is a flag indicating whether to perform quad tree partitioning. If the flag is 1, quad tree partitioning is performed. If the flag is 0, a flag "b", which indicates whether to perform binary tree partitioning or ternary tree partitioning, is determined. If b is 0, no further partitioning is performed in the block. If b is 1, binary tree partitioning or ternary tree partitioning is performed.

"c" is a flag indicating a partition direction, c=0 means horizontal partitioning, and c=1 means vertical partitioning. "d" is a flag indicating a partition type. d=0 means binary tree partitioning (BT), and d=1 means ternary tree partitioning (TT).

(2) When Only Binary Tree/Ternary Tree Partitioning can be Performed

In the above table, partition information is expressed using the flags "b" to "d" except for the flag "a".

In FIG. 8, the case of blocks A12 and A15 correspond to the case where quad tree partitioning can be performed in pre-partition blocks A12 to A15, and thus correspond to the case where partition information in item (1) is generated.

On the other hand, the case of A13 and A14 correspond to the case where ternary tree partitioning instead of quad tree partitioning is performed in pre-partition blocks A13 and A14, and thus correspond to the case where partition information in item (2) is generated.

(4 Times, Bottom Left Block, A16-A20)

In this example, partitioning of the multi-tree scheme (quad tree, binary tree, and ternary tree in this example) is supported, and a size and a shape of a block that can be obtained may be determined through a plurality of block partition settings. In this example, it is presumed that in the case of the binary tree/ternary tree, the maximum encoding block is 64×64, the minimum encoding block has a length of 4, and the maximum partitioning depth is 4.

In this example, when more than two blocks (2, 3 and 4 in this example) are obtainable according to partitioning, partition information required for one partition operation is a flag indicating whether to perform partitioning, a flag indicating a partition type, a flag indicating a partition form, and a flag indicating a partition direction. The possibly obtainable candidates are 4M×4N, 4M×2N, 2M×4N, 4M×N/4M×3N, 4M×3N/4M×N, M×4N/3M×4N, 3M×4N/M×4N, 4M× N/4M×2N/4M× N, and M×4N/2M×4N/M×4N.

When quad tree and binary tree/ternary tree partitioning ranges overlap each other, and a current block is a block obtained by quad tree partitioning, partition information may be divided into the following cases.

(1) When Quad Tree Partitioning and Binary Tree/Ternary Tree Partitioning Overlap Each Other

|  | a | b | c | d | e | f |
|---|---|---|---|---|---|---|
| QT | 1 |  |  |  |  |  |
| No Split | 0 | 0 |  |  |  |  |
| TT hor | 0 | 1 | 0 | 0 |  |  |
| SBT hor | 0 | 1 | 0 | 1 | 0 |  |
| ABT hor ¼ | 0 | 1 | 0 | 1 | 1 | 0 |
| ABT hor ¾ | 0 | 1 | 0 | 1 | 1 | 1 |
| TT ver | 0 | 1 | 1 | 0 |  |  |
| SBT ver | 0 | 1 | 1 | 1 | 0 |  |
| ABT ver ¼ | 0 | 1 | 1 | 1 | 1 | 0 |
| ABT ver ¾ | 0 | 1 | 1 | 1 | 1 | 1 |

In the above table, "a" is a flag indicating whether to perform quad tree partitioning. If the flag is 1, quad tree partitioning is performed. If the flag is 0, a flag "b", which indicates whether to perform binary tree partitioning, is determined. If b is 0, no further partitioning is performed in the block. If b is 1, binary tree partitioning or ternary tree partitioning is performed.

"c" is a flag indicating a partition direction, c=0 means horizontal partitioning, and c=1 means vertical partitioning.

"d" is a flag indicating a partition type. d=0 means binary tree partitioning, and d=1 means ternary tree partitioning. When d is 1, a flag "e" corresponding to a partition form is determined, when e is 0, symmetric partitioning is performed, and when e is 1, asymmetric partitioning is performed. When e is 1, information about a detailed partitioning ratio in asymmetric partitioning is determined, which is the same as in the previous example.

(2) When Only Binary Tree/Ternary Tree Partitioning can be Performed

In the above table, partition information is expressed using the flags "b" to "f" except for the flag "a".

In FIG. 8, the case of block A20 corresponds to the case where quad tree partitioning may be performed in pre-partition blocks A16 to A19, and thus corresponds to the case where partition information in item (1) is generated.

On the other hand, in the case of A16 to A19, since binary tree partitioning instead of quad tree partitioning is performed in pre-partition blocks A16 to A19, and thus the case corresponds to the case where partition information in item (2) is generated.

Next, the intra prediction of the prediction section in the disclosure will be described.

Figure 9:
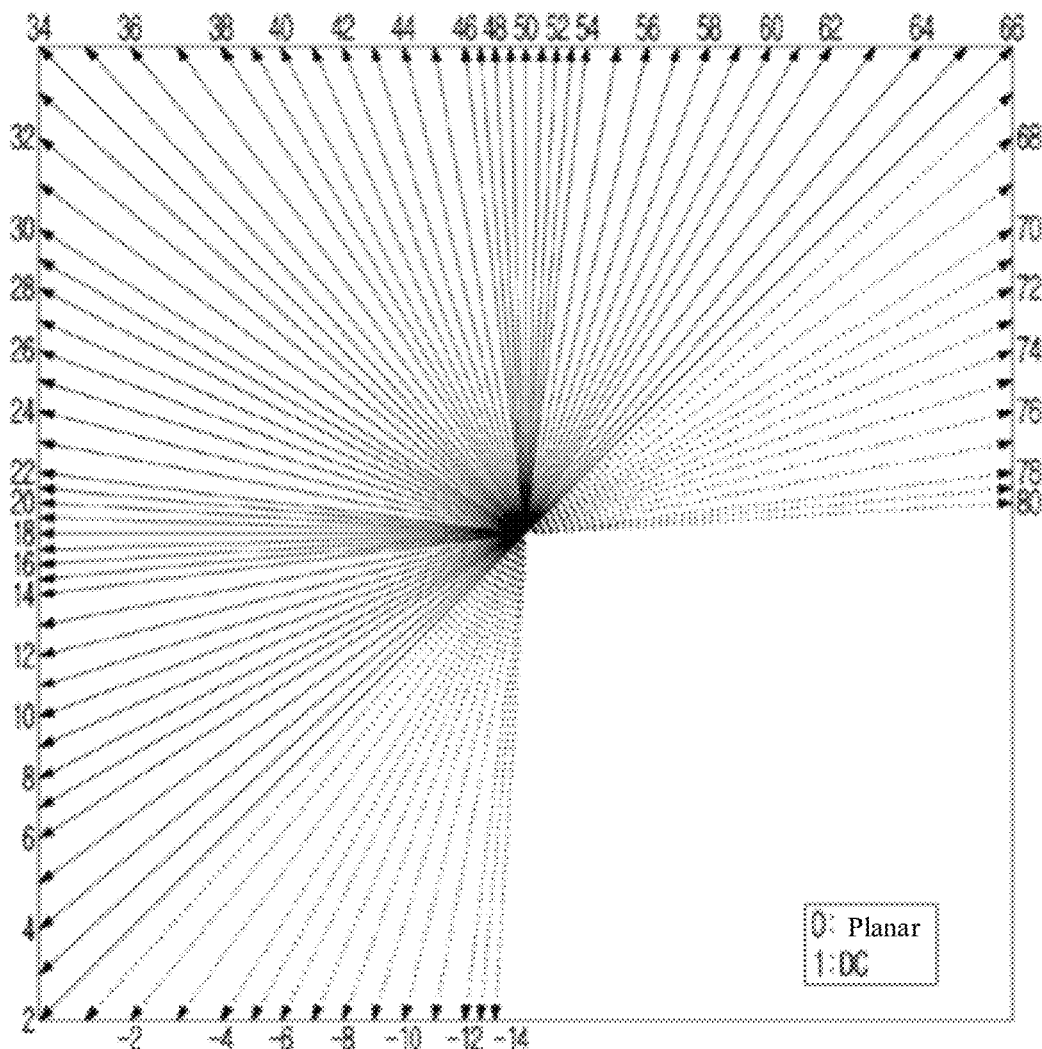
FIG. 9 is a schematic diagram illustrating an intra prediction mode predefined in an image encoding/decoding apparatus.

FIG. 9 is an example diagram illustrating an intra prediction mode predefined in an image encoding/decoding device.

Referring to FIG. 9, 67 prediction modes are configured as prediction mode candidate groups for intra prediction. 65 prediction modes are directional modes (2 to 66) and two prediction modes are non-directional modes (DC, plane). In this case, the directional mode may be divided into slope (for example, dy/dx) or angle information (degrees). All or part of the prediction modes described in the above examples may be included in the prediction mode candidate group of the luminance component or the color difference component, and other additional modes may be included in the prediction mode candidate group.

In addition, by using the correlation between color spaces, a reconstructed block of another color space that has been encoded/decoded may be used for prediction of the current block, and a prediction mode supporting it may be included. For example, in the case of the color difference component, the reconstructed block of the luminance component corresponding to the current block may be used to generate a prediction block of the current block. That is, a prediction block may be generated based on the reconstructed block in consideration of the correlation between color spaces.

The prediction mode candidate group may be adaptively determined according to the encoding/decoding settings. In order to increase the accuracy of prediction, the number of candidate groups may be increased, and in order to reduce the amount of bits according to the prediction mode, the number of candidate groups may be reduced.

For example, one of candidate group A (67, 65 directional modes and 2 non-directional modes), candidate group B (35, 33 directional modes and 2 non-directional modes), and candidate group C (18, 17 directional modes and 1 non-directional mode) may be selected, and the candidate group can be adaptively selected or determined according to the size and shape of the block.

In addition, the prediction mode candidate group may have various configurations according to the encoding/decoding settings. For example, as illustrated in FIG. 2, in FIG. 9, the prediction mode candidate group is configured in an equal manner among the modes, or in FIG. 9, the candidate group can be configured in a manner that the number of modes between 18 and 34 is greater than the number of modes between 2 and 18. Alternatively, there may also be an opposite case, and the candidate group may be configured adaptively according to the shape of the block (i.e., square, rectangle with long horizontal sides, or rectangle with long vertical sides). For example, if the width of the current block is greater than the height, intra prediction modes belonging to 2 to 15 are not used, and intra prediction modes belonging to 67 to 80 may be used for replacement. On the other hand, if the width of the current block is less than the height, intra prediction modes belonging to 53 to 66 are not used, and intra prediction modes belonging to −14 to −1 may be used for replacement.

In the disclosure, unless otherwise specified, it is assumed that intra prediction is performed by using a preset prediction mode candidate group (candidate group A) with equal mode intervals, but the main elements of the disclosure may also be used to set the above adaptive intra prediction after being changed.

FIG. 9 may be a prediction mode supported when a block is square or rectangular. In addition, the prediction mode supported when the block is rectangular may be a prediction mode different from the above example. For example, prediction modes with different numbers of prediction mode candidate groups or the same number of prediction mode candidate groups but larger block lengths are dense. Conversely, there may be a case where prediction modes are dispersed or there may be an opposite case. In the disclosure, as illustrated in FIG. 9, the prediction mode is described on the premise that the prediction mode setting (equal intervals between directional modes) is supported regardless of the shape of the block, but it may also be applied to other cases.

Various methods may be used to set an index allocated to the prediction mode. In the case of the directional mode, an index allocated to each mode may be determined based on pre-set priority information according to angle or inclination information of the prediction mode. For example, a mode corresponding to an x axis or a y axis (modes 18 and 50 in FIG. 9) may have a higher priority, a diagonal mode (modes 2, 34, and 66) having an angle difference of 45 or −45 degrees based on the horizontal or vertical mode may have a next priority, a diagonal mode having an angle difference of 22.5 or −22.5 degrees based on the diagonal mode may have a next priority, and priority information may be set in this way (the next is 11.25 or −11.25 degrees, etc.) or other various methods.

Alternatively, the index may be allocated in a specific direction order based on a preset prediction mode. For example, as illustrated in FIG. 9, the index may be allocated in a clockwise direction from a certain diagonal mode (mode 2). In the following example, the description will be made under the assumption that the index is allocated in a clockwise direction based on a preset prediction mode.

In addition, the non-directional prediction mode may allocate index information prior to the directional mode, or may allocate index information between directional modes, or may allocate index information at the end, which may be determined according to the encoding/decoding settings. In this example, it is assumed that the non-directional mode has the highest priority of allocating indexes in the prediction modes (allocating with a low index, mode 0 is a plane, and mode 1 is DC).

Although various examples of the index allocated to the prediction mode have been described through the above examples, the index may be allocated under other settings, the above example is not limited, or there may be various transform examples.

In the above example, priority information has been described in the example for allocating the index to the prediction mode, but the priority information is not only used in the index allocation of the prediction mode, but also can be used in the encoding/decoding process of the prediction mode. For example, the priority information may be used for MPM configuration, etc., and multiple priority information sets may be supported in the encoding/decoding process of the prediction mode.

The scheme of deriving the intra prediction mode (especially the luminance component) of the current block will be described below.

The current block may use a default mode predefined in the image encoding/decoding apparatus. The default mode may be a directional mode or a non-directional mode. For example, the directional mode may include at least one of a vertical mode, a horizontal mode, or a diagonal mode. The non-directional mode may include at least one of a planar mode or a DC mode. If it is determined that the current block uses the default mode, the intra prediction mode of the current block may be set to the default mode.

Alternatively, the intra prediction mode of the current block may be derived based on multiple MPM candidates. First, a predetermined MPM candidate may be selected from the aforementioned prediction mode candidate group. The number of MPM candidates may be three, four, five or more. The MPM candidates may be derived based on the intra prediction mode of adjacent blocks adjacent to the current block. The adjacent block may be a block adjacent to at least one of the left side, the top end, the top left end, the bottom left end, or the top right end of the current block.

Specifically, the MPM candidate may be determined by considering whether the intra prediction mode (candIntraPredModeA) of the left side block and the intra prediction mode (candIntraPredModeB) of the top end block are the same and whether candIntraPredModeA and candIntraPredModeB are non-directional modes.

For example, if candIntraPredModeA and candIntraPredModeB are the same and candIntraPredModeA is not a non-directional mode, the MPM candidates of the current block may include at least one of candIntraPredModeA, (candIntraPredModeA-n), (candIntraPredModeA+n), or a non-directional mode. Here, n may be an integer of 1, 2 or greater. The non-directional mode may include at least one of a planar mode or a DC mode. For example, as illustrated in Table 2 below, MPM candidates of the current block may be determined. The index in Table 2 specifies, but is not limited to, the position or priority of the MPM candidates. For example, index1 may be allocated to the DC mode, or index4 may be allocated.

TABLE 2

| Index | MPM candidate |
|---|---|
| 0 | candIntraPredModeA |
| 1 | 2 + ((candIntraPredModeA + 61)%64) |
| 2 | 2 + ((candIntraPredModeA − 1)%64) |
| 3 | INTRA DC |
| 4 | 2 + ((candIntraPredModeA + 60)%64) |

Alternatively, if candIntraPredModeA and candIntraPredModeB are different and candIntraPredModeA and candIntraPredModeB are not non-directional modes, the MPM candidates of the current block may include at least one of candIntraPredModeA, candIntraPredModeB, (maxAB−n), (maxAB+n), or a non-directional mode. Here, maxAB represents the maximum value of candIntraPredModeA and candIntraPredModeB, and n may be an integer of 1, 2 or greater. The non-directional mode may include at least one of a planar mode or a DC mode. For example, as illustrated in Table 3 below, MPM candidates of the current block may be determined. The index in Table 3 specifies, but is not limited to, the position or priority of the MPM candidates. For example, the maximum index may be allocated to the DC mode. When the difference between candIntraPredModeA and candIntraPredModeB is within a predetermined threshold range, MPM candidate 1 in Table 3 will be applied, otherwise MPM candidate 2 may be applied. Here, the threshold range may be a range greater than or equal to 2 and less than or equal to 62.

TABLE 3

| Index | MPM candidate 1 | MPM candidate 2 |
|---|---|---|
| 0 | candIntraPredModeA | candIntraPredModeA |
| 1 | candIntraPredModeB | candIntraPredModeB |
| 2 | INTRA DC | INTRA DC |
| 3 | 2 + ((maxAB + 61)%64) | 2 + ((maxAB + 60)%64) |
| 4 | 2 + ((maxAB − 1)%64) | 2 + ((maxAB)%64) |

Alternatively, if candIntraPredModeA and candIntraPredModeB are different and only one of candIntraPredModeA and candIntraPredModeB is in a non-directional mode, the MPM candidates of the current block may include at least one of maxAB, (maxAB-n), (maxAB+n), or a non-directional mode. Here, maxAB represents the maximum value of candIntraPredModeA and candIntraPredModeB, and n may be an integer of 1, 2 or greater. The non-directional mode may include at least one of a plane mode or a DC mode. For example, as illustrated in Table 4 below, MPM candidates of the current block may be determined. The index in Table 4 specifies, but is not limited to, the position or priority of the MPM candidates. For example, index 0 may be allocated to the DC mode, or the maximum index may be allocated.

TABLE 4

| Index | MPM candidate |
|---|---|
| 0 | maxAB |
| 1 | INTRA DC |
| 2 | 2 + ((maxAB + 61)%64) |
| 3 | 2 + ((maxAB − 1)%64) |
| 4 | 2 + ((maxAB + 60)%64) |

Alternatively, if candIntraPredModeA and candIntraPredModeB are different and both candIntraPredModeA and candIntraPredModeB are non-directional modes, the MPM candidates of the current block may include at least one of a non-directional mode, a vertical mode, a horizontal mode, (vertical mode-m), (vertical mode+m), (horizontal mode-m), or (horizontal mode+m). Here, m may be an integer of 1, 2, 3, 4 or greater. The non-directional mode may include at least one of a plane mode or a DC mode. For example, as illustrated in Table 5 below, MPM candidates of the current block may be determined. The index in Table 5 specifies, but is not limited to, the position or priority of the MPM candidates. For example, index1 may be allocated to the horizontal mode, or the maximum index may be allocated.

TABLE 5

| Index | MPM candidate |
|---|---|
| 0 | INTRA DC |
| 1 | Vertical mode |
| 2 | Horizontal mode |

TABLE 5-continued

| Index | MPM candidate |
|---|---|
| 3 | (Vertical mode − 4) |
| 4 | (Vertical mode + 4) |

In the aforementioned multiple MPM candidates, the MPM candidate specified by an MPM index may be set as the intra prediction mode of the current block. The MPM index may be coded and signaled by the image encoding apparatus.

As described above, the intra prediction mode may be derived by selectively using any one of the default mode or the MPM candidate. The selection may be performed based on a flag signaled by the encoding apparatus. In this case, the flag may indicate whether to set the intra prediction mode of the current block as the default mode. If the flag is a first value, the intra prediction mode of the current block is set as the default mode, and if not, information about whether the intra prediction mode of the current block is derived from the MPM candidate, MPM index, etc. may be sent.

The color difference component may have the same candidate group as the prediction mode candidate group of the luminance component, or may include a candidate group configured by a part of the prediction mode candidate group of the luminance component. In this instance, the prediction mode candidate group of the color difference component may have a fixed configuration or a variable (or adaptive) configuration.

(Fixed Candidate Group Configuration Vs Variable Candidate Group Configuration)

As an example of a fixed configuration, partial modes in the prediction mode candidate group of the luminance component (for example, it is assumed that the partial modes are at least one of a DC mode, a planar mode, a vertical mode, a horizontal mode, or a diagonal mode <it is assumed that the partial modes are at least one of DL, UL, or UR, DL is a mode in which prediction is performed from bottom right to top right, UL is a mode in which prediction is performed from top left to bottom right, and UR is a mode in which prediction is performed from top right to bottom left, and it is assumed that the partial modes are modes 2, 34, and 66, respectively, in FIG. 9, and may also be other diagonal modes>) are configured as the prediction mode candidate group of the color difference component to perform intra prediction.

As an example of a variable configuration, partial modes in the prediction mode candidate group of the luminance component (for example, it is assumed that the partial modes are a DC mode, a planar mode, a vertical mode, a horizontal mode, and a diagonal UR mode, and it is assumed that more selected modes are generally configured as a basic prediction mode candidate group) are configured as the basic prediction mode candidate group of the color difference component. However, the modes included in the candidate group may not correctly reflect the characteristics of the color difference component. In order to improve this issue, the prediction mode candidate group configuration of the color difference component may be changed.

For example, at least one prediction mode of a block or sub-block of a luminance component at a position identical to or corresponding to a block of a color difference component may be included (Example 1 described later) in the basic prediction mode candidate group, or a new prediction mode candidate group may be configured in place of some modes (Example 2 described later). For example, in the case where the corresponding position in the luminance component corresponding to the color difference component <according to the color format> cannot be configured by one block but configured as multiple sub-blocks by partitioning one block, a block of a preset position is represented. In this instance, the position of a preset block is determined at the top left, top right, bottom left, bottom right, middle, top middle, bottom middle, left middle and right middle positions in a luminance component block corresponding to a color difference component block; if it is distinguished to an intra-image coordinate, it may be a position including coordinate (0, 0) on the top left, a position including coordinate (blk_width−1, 0) on the top right, a position including coordinate (0, blk_height−1) on the bottom left, a position including coordinate (blk_width−1, blk_height−1) on the bottom right, a position including one of coordinates (blk_width/2−1, blk_height/2−1), (blk_width/2, blk_height/2−1), (blk_width/2−1, blk_height/2), and (blk_width/2, blk_height/2) on the center, a position including one of coordinates (blk_width/2−1, 0) and (blk_width/2, 0) on the top middle, a position including one of coordinates (blk_width/2−1, blk_height−1) and (blk_width/2, blk_height−1) on the bottom middle, a position including one of coordinates (0, blk_height/2−1) and (0, blk_height/2) on the left middle, and a position including one of coordinates (blk_width−1, blk_height/2−1) and (blk_width−1, blk_height/2) on the right middle. That is, it means a block including the coordinate position. The above-mentioned blk_width and blk_height refer to horizontal and vertical lengths of a luminance block, and coordinates are not limited to the above case, and may include other cases. In the following description, for the prediction mode <or color mode> of the luminance component added to the prediction mode candidate group of the color difference component, at least one prediction mode is added according to a preset priority <for example, assuming top left-top right-bottom left-bottom right-middle>. If two prediction modes are added, the mode of the top left block and the mode of the top right block are added according to the above settings. In this case, when the blocks at the top left and top right positions are configured by one block, the mode of the bottom left block having the next priority is added.

Alternatively, at least one prediction mode (which may specify blocks adjacent to a block at a preset position, when multiple modes are included in the prediction mode candidate group of the color difference component, blocks with a preset priority and prediction modes of sub-blocks with the preset priority within the sub-blocks may be included as a candidate set according to the priority) of adjacent blocks at the left, top, top left, top right, bottom left and the like or sub-blocks of corresponding blocks (when the adjacent blocks are configured with multiple blocks) may be included in the basic prediction mode candidate group, or a new prediction mode candidate group may be configured in place of partial modes.

If additional contents are added in the above description, not only a prediction mode of a block of a luminance component or an adjacent block (of a luminance block) may be included, but also at least one mode derived from the prediction mode as a prediction mode of a color difference component may be included. The following examples will include an example where a prediction mode of a luminance component is taken as a prediction mode of a color difference component, and the detailed description about an example of taking a prediction mode (for example, if an adjacent mode and a directional mode of this mode are taken as examples, when horizontal mode 18 is the prediction mode of the luminance component, modes 17, 19, 16 etc. are equivalent to the derived prediction mode, and if multiple prediction modes are configured from the color difference component as the prediction mode candidate group of the color difference component, the priority of the candidate group configuration may be set in the order from the prediction mode of the luminance component to the mode derived from the prediction mode of the luminance component) derived from the prediction mode of the luminance component or a prediction mode derived from the prediction mode of the adjacent block as a prediction mode candidate group of the color difference component will be omitted. However, the same or changed settings described below may be applied.

As an example (1), when the prediction mode of the luminance component matches one of the prediction mode candidate groups of the color difference component, the configuration of the candidate groups is the same (the number of the candidate groups does not change), and the configurations of the selected candidate groups are different when there is no match (the number of candidate groups increases).

When the configurations of the candidate groups in the above example are the same, the indexes of the prediction modes may be the same or other indexes may be allocated, which may be determined according to the encoding/decoding settings. For example, when the indexes of the prediction mode candidate group of the color difference component are plane 0, DC1, vertical 2, horizontal 3, and diagonal UR4, in the case where the luminance component is horizontal, the configuration of the prediction mode candidate group remains unchanged, and the indexes of each prediction mode remain unchanged, or other indexes may be allocated (in this example, horizontal 0, plane 1, DC2, vertical 3, and diagonal UR4). The index reset above may be an example of a process performed in order to generate fewer mode bits during prediction mode encoding/decoding (assuming: allocating fewer bits to a small index).

When configurations of the candidate groups in the above examples are not the same, they may be added if indexes of the prediction modes may remain the same, or different indexes may be allocated. For example, in the case where the index setting of the prediction mode candidate group is the same as the previous example, when the prediction mode of the luminance component is diagonal DL, the configuration of the prediction mode candidate group is increased by 1, and the prediction mode index of the existing candidate group remains unchanged. Moreover, the index of a newly added mode may be used as the last one (diagonal DL5 in this example) or other indexes may be allocated (in this example, diagonal DL0, plane 1, DC2, vertical 3, horizontal 4, and diagonal UL5).

As an example (2), when the prediction mode of the luminance component matches one of the prediction mode candidate groups of the color difference component, the configuration of the candidate groups is the same (the modes of the candidate groups do not change), and the configurations of the candidate groups are different when there is no match (at least one of the modes of the candidate groups is replaced).

When the configurations of the candidate groups in the above examples are the same, the indexes of the prediction modes may be the same or other indexes may be allocated. For example, when the indexes of the prediction mode candidate group of the color difference component are plane 0, DC1, vertical 2, horizontal 3, and diagonal UR4, in the case where the prediction mode of the luminance component is vertical, the configuration of the prediction mode candidate group remains unchanged, and the indexes of each prediction mode remain unchanged, or other indexes may be allocated (in this example, vertical 0, horizontal 1, diagonal UL2, plane 3, and DC4; the example includes, but is not limited to, an example in which the directional mode precedes in the case where the mode of the luminance component is directional, and an example in which the non-directional mode precedes in the case where the mode of the luminance component is non-directional).

When the configurations of the candidate groups in the above examples are different, a mode in which the index of the prediction mode remains unchanged remains unchanged, and the index of a replacement mode may be allocated to a change mode, or indexes different from the existing index may be allocated to multiple prediction modes. For example, when the index setting of the prediction mode candidate group is the same as the previous example, in the case where the prediction mode of the luminance component is diagonal DL, one mode in the prediction mode candidate group (diagonal UL in this example) will be replaced, and the prediction mode index of the existing candidate group remains unchanged. The index of a mode to be replaced is allocated as the index (for example, diagonal DL4) of a newly added mode or other indexes may be allocated (in this example, diagonal DL0, plane 1, DC2, vertical (3), and horizontal 4).

In the foregoing description, an example of performing index reset is given for the purpose of allocating fewer mode bits, but this is only an example according to the encoding/decoding settings, and there may be other cases. If the index of the prediction mode does not change, binarization in which a small number of bits are allocated to a small index may be performed, or binarization in which bits are allocated regardless of the size of the index may be performed. For example, when the reset prediction mode candidate group is plane 0, DC1, vertical 2, horizontal 3, and diagonal DL4, even if a large index is allocated to diagonal DL, since diagonal DL is a mode obtained from the luminance component, fewer mode bits than other prediction modes are allocated.

The prediction mode may be a mode that is supported in a manner independent of an image type, or may be a mode that determines whether to support according to some image types (for example, a mode supported by an image type I but not supported by an image type P or B).

The content described by the above examples is limited to the present example only, and additional or other modified examples are possible. In addition, the encoding/decoding settings described by the above examples may be determined implicitly or related information may be explicitly included in units of video, sequence, picture, slice, tile, etc.

(Obtaining Prediction Values in the Same Color Space Vs Obtaining Prediction Values in Other Color Spaces)

In the case of the intra prediction mode described by the above example, a prediction mode regarding a method (for example, extrapolation, interpolation, averaging, etc.) of obtaining data for generating a prediction block from adjacent regions within the same time and space is described.

In addition, a prediction mode regarding a method of obtaining data for generating a prediction block from regions located within the same time and different spaces may be supported.

For example, an example of the above content may be a prediction mode regarding a method of obtaining data for generating a prediction block in other color spaces using correlation between color spaces. In this case, when YCbCr is taken as an example, the correlation between the color spaces may represent the correlation between Y and Cb, Y and Cr, Cb and Cr. That is, in the case of the color difference component Cb or Cr, a reconstructed block of the luminance component corresponding to the current block may be generated as a prediction block of the current block (color difference vs luminance is a basic setting of the following example). Alternatively, a reconstructed block of some color difference components (Cb or Cr) corresponding to the current block of some color difference components (Cr or Cb) may be generated as a prediction block of the color difference components (Cr or Cb). In this case, the reconstructed block of other color spaces may be directly generated as a prediction block (i.e., no correction is performed) or a block obtained in consideration of correlation between colors may be generated (for example, the existing reconstructed block is corrected, in P=a*R+b, a and b represent values for correction, R and P represent values obtained in different color spaces and prediction values of the current color space, respectively) as a prediction block.

In this example, description is made by assuming that data obtained using the correlation of a color space is used as a prediction value of a current block, but it is also possible for a case where the data is used as a correction value for correcting a prediction value of an existing current block (for example, residual values of other color spaces are used as correction values; that is, there are other prediction values and the prediction values are corrected; although these prediction values are added to obtain also a prediction value, but the description is made for detailed distinguishing). In the disclosure, the former case is assumed to be described, but the disclosure is not limited thereto, and the correction values may be used identically or variably.

The prediction mode may be a mode that is supported in a manner independent of an image type, or may be a mode that determines whether to support according to some image types (for example, a mode supported by an image type I but not supported by an image type P or B).

(Comparison to Obtain Related Information)

In the above example, correlation information (a, b, etc.) between color spaces may explicitly include related information, or may be obtained implicitly. In this case, a region of comparison to obtain related information may be 1) a current block of a color difference component and a corresponding block of a luminance component, or 2) an adjacent region (for example, left block, top block, top left block, top right block, bottom left block, etc.) of the current block of the color difference component and an adjacent region of the corresponding block of the luminance component. The example is an example where the former may be explicit and the latter may be implicit.

For example, related information is obtained by comparing at least one pixel value of each color space (in this case, a pixel value to be compared may be a pixel value obtained from one pixel in each color space, and may be a pixel value obtained from multiple pixels). The pixel values derived from a filtering process of weighted averaging or the like, that is, the number of pixels referred or used for comparing one pixel value of each color space may be one pixel vs one pixel, one pixel vs multiple pixels or the like. In this case, the former may be a color space for generating a prediction value, and the latter may be a color space for reference. The above example may be possible according to the color format, or a pixel value of one pixel of the color difference component can be compared with a pixel value of the corresponding pixel of the luminance component in a way independent of the color format, the pixel value of one pixel of the color difference component may be compared with a pixel value obtained by performing filter <a-tapseparate1Dfilter, bxcmasknon-separable2Dfilter, d-tapdirectionalfilter, etc.> on multiple pixels of the luminance component, and either of the two methods may be used according to the encoding/decoding settings. The above describes the examples of color difference and luminance, but there may also be transform examples such as color difference <Cb> and color difference <Cr>).

In the above example, a region of comparison when related information is implicitly obtained may be the closest pixel line of the current block of the current color component (for example, pixels included in p[−1, −1] to p[blk_width−1, −1], p[−1, 0] to p[−1, blk_height−1]) and corresponding pixel lines of other color spaces or multiple pixel lines of the current block of the current color component (for example, in the above case, pixels included by multiple pixel lines including p[−2, −2] to p[blk_width−1, −2], p[−2, −1] to p[−2, blk_height−1] and corresponding pixel lines of other color spaces.

Specifically, assuming that the color format is 4:2:0, in order to compare the pixel value of one pixel in the current color space (color difference in this example), a pixel value of one pixel at a preset position (in this example, selected from top left, top right, bottom left and bottom right within 2×2) in 4 corresponding pixels (one pixel of the color difference component corresponds to 4 pixels within 2×2 of the luminance component) in other color spaces (bit luminance in this example) may be used. Alternatively, in order to compare the pixel value of one pixel in a chroma space, a pixel value obtained by performing filtering on multiple pixels (for example, at least two pixels in corresponding 2×2 pixels, etc.) in a luminance space may be used.

In summary, the parameter information may be derived from the reconstructed pixels in the adjacent region of the current block and the reconstructed pixels in other corresponding color spaces. That is to say, at least one parameter (for example, a or b, a1, b1 or a2, b2, etc.) may be generated based on related information, and may be used as a value that is multiplied by or added to pixels of reconstructed blocks in other color spaces (for example, a, a1, a2/b, b1, b2).

In this case, the comparison processing may be performed after determining the availability of the pixels compared in the above example. For example, when the adjacent region is available, it may be used as a pixel for comparison, and when the adjacent region is unavailable, it may be determined according to the encoding/decoding settings. For example, when the pixel in the adjacent region is unavailable, it may be excluded from the process for obtaining related information of the color space, or it may be included in the comparison process after filling the unavailable region, which may be determined according to the encoding/decoding settings.

For example, when excluded from the process for acquiring correlation information between color spaces, this may be an example corresponding to a case where a region including pixels of at least one color space is unavailable. In detail, it may be an example corresponding to a case where the pixels of one of two color spaces are unavailable or the pixels of two color spaces are unavailable, which may be determined according to the encoding/decoding settings.

Alternatively, when the process for obtaining correlation information between color spaces is performed after filling data for comparison in the unavailable region (or an operation similar to the reference pixel filling process), various filling methods may be used. For example, a preset pixel value (for example, median value 1 of bit depth<<(bit_depth−1), a value between minimum and maximum values of an actual pixel of an image, an average of the actual pixel of the image, a median value, etc.) may be used for filling, adjacent pixels or a value obtained by performing filtering (an operation similar to the reference pixel filtering process) on the adjacent pixels may be used for filling, or other methods may be used.

Figure 10:
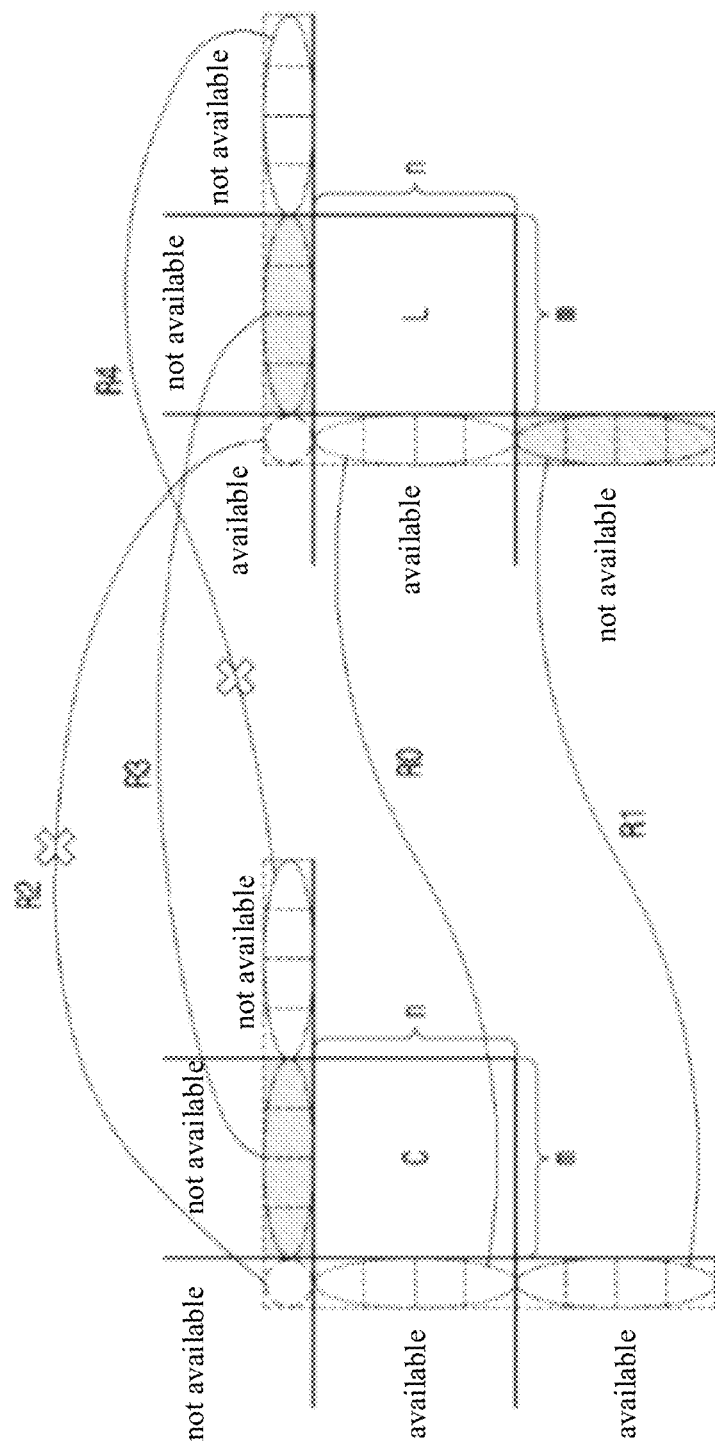
FIG. 10 illustrates an example of comparing pixels between color spaces in order to obtain correlation information.

FIG. 10 illustrates an example of comparing pixels between color spaces in order to obtain correlation information. For ease of description, it is assumed that a color format of 4:4:4 is used. In this case, the following process is described according to a component ratio of the color format (that is, including the conversion process based on the component ratio).

R0 represents an example where color space regions on both sides may be used. Since the color space regions on both sides are available regions, the pixels in the corresponding regions may be used in the comparison process to obtain related information.

R1 represents an example where one of the color space regions on both sides is unavailable (in this example, the adjacent region of the current color space is available, while the corresponding regions of other color spaces are unavailable). After using various methods to fill the unavailable regions, the unavailable regions may be used for the comparison process.

R2 represents an example where one of the color space regions on both sides is unavailable (in this example, the adjacent region of the current color space is unavailable, while the corresponding regions of other color spaces are available). Since there is an unavailable region on one side, the corresponding regions of the two color spaces cannot be used in the comparison process.

R3 represents an example where color space regions on both sides are unavailable. The unavailable regions are filled by using various methods, and may be used for the comparison process.

R4 represents an example where color space regions on both sides are unavailable. Since there are unavailable regions on both sides, the corresponding regions of the color spaces on both sides cannot be used in the comparison process.

In addition, different from FIG. 10, when the adjacent regions of the current block or the corresponding regions of other color spaces are unavailable, various settings may be made.

As an example, preset values (in this example, a is 1 and b is 0) may be allocated to a and b. This case may mean maintaining a mode that fills data in another color space with the prediction block of the current block. Moreover, this case may allow, when performing prediction mode encoding/decoding, the setting or priority of the occurrence (or selection) probability of the mode has a different setting from the existing case (for example, the probability of selection is set as lower or the priority is set to lower; in other words, due to related information with low accuracy, the accuracy of the prediction block obtained by this prediction mode may be very low, so it is estimated that the mode will not be selected as the optimal prediction mode).

For example, since there is no data to be compared, the mode of filling data of another color space with the prediction block of the current block may not be supported. That is, the mode may be a mode supported when there is at least one available region. In this instance, when performing prediction mode encoding/decoding, it may be set to allow or not allow other modes to replace the mode. The former case may be a setting where the number of prediction mode candidate groups is maintained, and the latter case is a setting where the number of prediction mode candidate groups is reduced.

The disclosure is not limited to the above examples, and there may be various transform examples.

In the above example, the unavailable case is a case where the region is outside the boundary of an image (for example, picture, slice, tile, etc.) (that is, the current block and the region are not included in the same image) when the region has not been encoded/decoded. In addition, the unavailable case may be added according to the encoding/decoding settings (for example, constrained_intra_pred_flag, etc., for example, when the type is P or B slice, the above flag is 1, and the coding mode of the corresponding region is Inter).

In the following example, the above-mentioned constraint may occur when the prediction block of the current block is generated by using reconstructed data of other color spaces after related information is obtained through comparison of color spaces. That is, as described above, when it is determined that the corresponding regions of other color spaces corresponding to the current block are unavailable, the use of this mode may be limited or this mode is unavailable.

The parameter representing correlation information between color spaces obtained through the above process and the reconstructed data of other color spaces corresponding to the current block may be used to generate a prediction value of the current block. In this instance, the reconstructed data of other color spaces used for prediction of the current block may be a pixel value of a pixel at a preset position or a pixel value obtained by the filtering process.

For example, in the case of 4:4:4, in order to generate a prediction value of one pixel in the chroma space, the pixel value of a corresponding pixel may be used in the luminance space. Alternatively, in order to generate the prediction value of one pixel in the chroma space, pixel values obtained by filtering multiple pixels (for example, pixels in directions such as left, right, top, down, top left, top right, bottom left, and bottom right by centering on the corresponding pixel, when 5-tap and 7-tap filters are applied as examples, it can be understood that there are two pixels and three pixels in directions namely left, right, top, and bottom by centering on the corresponding pixel respectively) in the luminance space may be used.

For example, in the case of 4:2:0, in order to generate the prediction value of one pixel in the chroma space, the pixel value of one pixel at a preset position (selected from top left, top right, bottom left, and bottom right) of four corresponding pixels (one pixel of the color difference component corresponds to 2×2 pixels of the luminance component) in the luminance space may be used. Alternatively, in order to generate the prediction value of one pixel in the chroma space, pixel values obtained by filtering multiple pixels (for example, at least two pixels in corresponding 2×2 pixels, or pixels in directions such as left, right, top, bottom, top left, top right, bottom left, and bottom right by centering on 2×2 pixels) in the luminance space may be used.

In summary, the parameter representing the correlation information obtained through the above process may be applied (multiplied or added, etc.) to the pixel value obtained in other color spaces to obtain a pixel value that is used as a prediction value of the pixel in the current color space.

In the above example, some color formats, some pixel value acquisition processes, etc. have been described, however, the disclosure is not limited to this, and the same or modified examples may be used in other cases.

The content described in (obtaining prediction values in the same color space vs obtaining prediction values in different color spaces) may be applied to fixed candidate group configuration vs variable candidate group configuration. For example, when the prediction value cannot be obtained in other color spaces, a replacement mode of the prediction value may be included in the candidate group.

Through the above example, in the case of the above prediction mode, related information (for example, information about support or not, parameter information, etc.) may be included in units of image, sequence, picture, slice, and tile.

In summary, a prediction mode (mode A) related to a method (the above method is a method of acquiring data for generating prediction blocks from adjacent regions within the same time and the same space according to the encoding/decoding settings) is used to configure a prediction mode candidate group, or besides the prediction mode, the prediction mode candidate group may include a prediction mode (mode B) related to a method (the above method is a method of acquiring data for generating prediction blocks from regions located within the same time and different spaces).

In the above example, the prediction mode candidate group can be configured by using only mode A or only mode B, and the prediction mode candidate group can be configured by combining mode A and mode B. Correlatively, setting information about the configuration of the prediction mode candidate group may be explicitly generated, or information about the configuration of the prediction mode candidate group may be implicitly determined in advance.

For example, the prediction mode candidate groups may have the same configuration, regardless of some encoding/decoding settings (image types in this example), or have a single configuration according to some coding/decoding settings (for example, mode A, mode B_1<color mode>, and mode B_2<color copy mode> are used to configure the prediction mode candidate group in image type I, mode A and mode B_1 are used to configure the prediction mode candidate group in image type P, and mode A and mode B_2 are used to configure the prediction mode candidate group in image type B).

In the disclosure, the prediction mode candidate group for the luminance component is illustrated in FIG. 9, and it is presumed that the prediction mode candidate group for the color difference component is configured as horizontal, vertical, and diagonal modes in FIG. 9 (plane, DC, color mode 1, color mode 2, color mode 3, color copy mode 1, color copy mode 2, adjacent block mode 1 (left block), adjacent mode 2 (top block)), but there may also be other settings of various prediction mode candidate groups.

In the image encoding method according to an embodiment of the disclosure, intra prediction may be configured as follows. The intra prediction of the prediction section may include a reference pixel configuration step, a prediction block generation step, a prediction mode determination step, and a prediction mode coding step. In addition, the image encoding apparatus may be configured to include a reference pixel configuration section, a prediction block generation section and a prediction mode encoding section for implementing the reference pixel configuration step, the prediction block generation step, the prediction mode determination step, and the prediction mode coding step. Some steps in the above process may be omitted, or other steps may be added, and may be changed to other orders than the above order.

In addition, in the image decoding method according to an embodiment of the disclosure, intra prediction may be configured as follows. The intra prediction of the prediction section may include a prediction mode decoding step, a reference pixel configuration step, and a prediction block generation step. In addition, the image decoding apparatus may be configured to include a prediction mode decoding section for implementing the prediction mode decoding step, a reference pixel configuration section for implementing the reference pixel configuration step, and a prediction block generation section for implementing the prediction block generation step. Some of the above steps may be omitted, or other steps may be added, and may be changed to other orders than the above order.

In the prediction block generation step, intra prediction in a unit of a current block (for example, a coding block, a prediction block, a transform block, etc.) may be performed, or intra prediction in a unit of a predetermined sub-block may be performed. To this end, a flag indicating whether the current block is partitioned into sub-blocks to perform intra prediction may be used. The flag may be coded and signaled by the encoding apparatus. If the flag is a first value, the current block is partitioned into multiple sub-blocks, otherwise, the current block is not partitioned into multiple sub-blocks. The partition here may be additional partition performed after the partition based on the above tree structure. The sub-blocks belonging to the current block share one intra prediction mode, but different reference pixels may be configured for each sub-block. Alternatively, the sub-blocks may use the same intra prediction mode and reference pixels. Alternatively, the sub-blocks may use the same reference pixels, but different intra prediction modes may be used for each sub-block.

The partition may be performed in the vertical or horizontal direction. A partition direction may be determined based on the flag signaled by the encoding apparatus. For example, when the flag is a first value, partition may be performed in the horizontal direction, otherwise, partition may be performed in the vertical direction. Alternatively, the partition direction may be determined based on the size of the current block. For example, when the height of the current block is greater than a predetermined threshold, partition may be performed in the horizontal direction, and when the width of the current block is greater than a predetermined threshold, partition may be performed in the vertical direction. Here, the threshold may be a fixed value predefined in the encoding/decoding apparatus, or the threshold may be determined based on information about the block size (for example, the size of a maximum transform block, the size of a maximum coding block, etc.). The information about the block size may be signaled in at least one level of sequence, picture, slice, tile, brick, or CTU row.

The number of sub-blocks may be variably determined based on the size, shape, partitioning depth, intra prediction mode, etc. of the current block. For example, when the current block is 4×8 or 8×4, the current block may be partitioned into two sub-blocks. Alternatively, when the current block is greater than or equal to 8×8, the current block may be partitioned into four sub-blocks.

In the disclosure, the encoder will be mainly described. In the case of the decoder, the detailed description on the decoder is omitted since it may be deduced from the content of the encoder in reverse.

Figure 11:
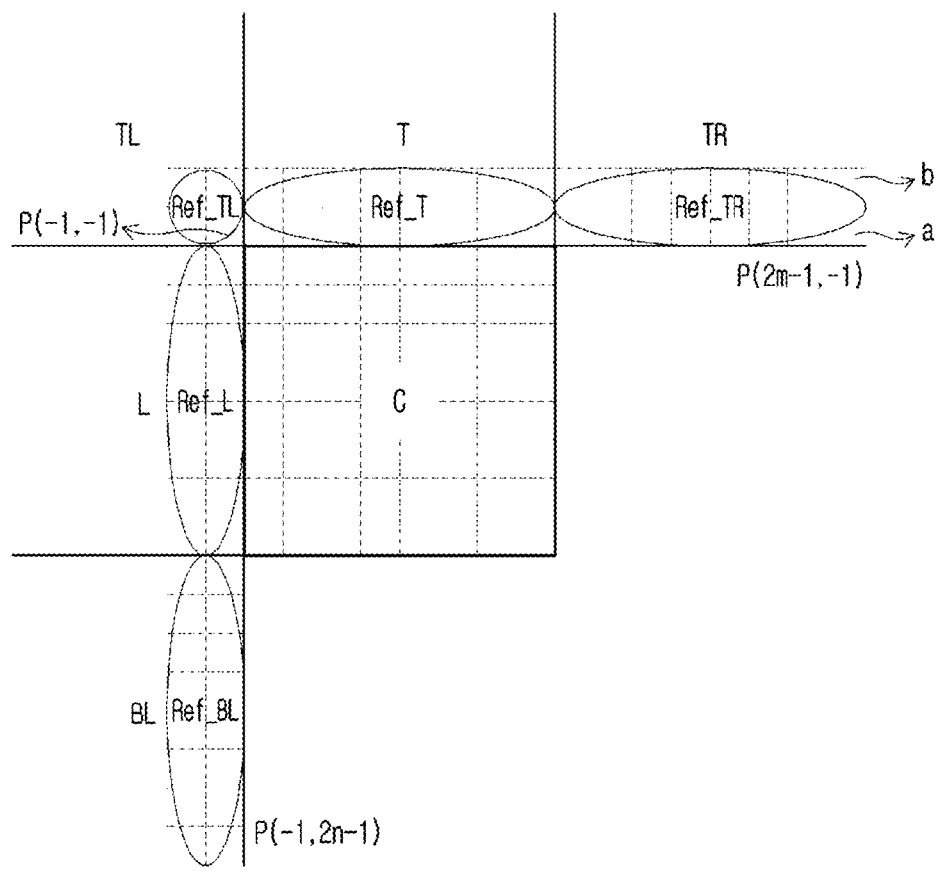
FIG. 11 is a schematic diagram for explaining a reference pixel configuration for intra prediction.

FIG. 11 is a schematic diagram for explaining a reference pixel configuration for intra prediction. The size and shape (M×N) of the current block used for prediction may be obtained from a block partition section, and will be described under the assumption that intra prediction is supported within the range of 4×4 to 128×128. Generally, intra prediction may be performed using a prediction block unit, but intra prediction in units of coding blocks and transform blocks may be performed according to settings of the block partition section. After confirming block information, the reference pixel configuration section may configure a reference pixel used for prediction of the current block. In this instance, the reference pixel may be managed by a temporary memory (for example, an array <Array>, a main array or an auxiliary array, etc.), the reference pixel may be generated and deleted during each intra prediction process of the block, and the size of the temporary memory may be determined according to configuration of the reference pixel.

In this example, it is described under the assumption that the left block, the top block, the top left block, the top right block, and the bottom left block are used for prediction of the current block by centering on the current block. However, it is not limited thereto, and a block candidate group having other configurations may be used for prediction of the current block. For example, the candidate group for the adjacent blocks of the reference pixel may be an example according to raster or Z scan, and part of the candidate group may be removed according to a scan order or the candidate group may be configured to include other block candidate groups (for example, additional configuration of the top block, the bottom block, the bottom right block, etc.).

Alternatively, blocks (for example, having corresponding coordinates according to the same coordinate or color component composition ratio in each color space) corresponding to the current block in other color spaces (for example, if the current block belongs to Cr, other color spaces correspond to Y or Cb) may be used to predict the current block. In addition, for ease of description, the description is performed by assuming that the preset position (left, top, top left, top right, and bottom left) is configured as one block, but at least one block may exist at a corresponding position. That is, multiple sub-blocks of the partition block according to the corresponding block may exist at the preset position.

In summary, the adjacent region of the current block may be a position of a reference pixel for intra prediction of the current block, and a region corresponding to the current block of another color space may be considered as the position of the reference pixel according to the prediction mode. In addition to the above examples, the position of the reference pixel defined according to the prediction mode, method, etc. may be determined. For example, when the prediction block is generated by a method such as block matching, the position of the reference pixel may be considered as a region where encoding/decoding is completed before the current block of the current image or a region included within a search range in the region where encoding/decoding is completed (for example, included on the left side or top side or top left side and top right side of the current block).

As illustrated in FIG. 11, the reference pixel for prediction of the current block may be configured by adjacent pixels of a left block, a top block, a top left block, a top right block, and a lower left block (Ref_L, Ref_T, Ref_TL, Ref_TR, and Ref_BL in FIG. 11). In this instance, the reference pixel is generally composed of pixels of an adjacent block closest to the current block (pixels in line "a" shown in FIG. 11a), but may also include other pixels (pixels in line "b" shown in FIG. 11b and other outer lines). That is, at least one of a first pixel line "a" adjacent to the current block, a second pixel line "b" adjacent to the first pixel line, a third pixel line adjacent to the second pixel line, or a fourth pixel line adjacent to the third pixel line may be used. For example, the multiple pixel lines may include all of the first to fourth pixel lines, or may include only the remaining pixel lines except the third pixel line, according to the encoding/decoding settings. Alternatively, the multiple pixel lines may include only the first pixel line and the fourth pixel line.

The current block may perform intra prediction by selectively referencing any one of the multiple pixel lines. In this instance, the selection may be performed based on an index (refIdx) signaled by the encoding apparatus. Alternatively, any one of the multiple pixel lines may be selectively used based on the size, shape and partition type of the current block, whether the intra prediction mode is a non-directional mode, angle of the intra prediction mode, etc. For example, when the intra prediction mode is a planar mode or a DC mode, only the first pixel line may be used. Alternatively, only the first pixel line may be used when the size (width or height) of the current block is smaller than or equal to a predetermined threshold. Alternatively, only the first pixel line may be used when the intra prediction mode is greater than a predetermined threshold angle (or smaller than the predetermined threshold angle). The threshold angle may be an angle of the intra prediction mode corresponding to mode 2 and mode 66 of the aforementioned prediction mode candidate group.

On the other hand, pixels adjacent to the current block may be classified as at least one reference pixel layer, which may be classified as that pixels closest to the current block are ref_0 (pixels having a pixel value difference of 1 from a boundary pixel of the current block; p (−1, −1) to p (2m−1, −1), p (−1, 0) to p (−1, 2n−1)), the next adjacent pixel (the difference between the boundary pixel of the current block and the pixel value is 2; p (−2, −2) to p (2m, −2), p (−2, −1) to p (−2, 2n)) is ref_1, and the next adjacent pixel (the difference between the boundary pixel of the current block and the pixel value is 3; p (−3, −3) to p ($2^m$+1, −3), p (−3, −2) to p (−3, 2n+1)) is ref_2, etc. That is, the reference pixel may be classified into multiple reference pixel layers according to pixel distances adjacent to the boundary pixel of the current block.

In addition, the reference pixel layers may be arranged differently for each adjacent block. For example, a reference pixel according to layer ref_0 may be used when a block adjacent to the current block and a block adjacent to the top end are used as reference blocks, and a reference pixel according to layer ref_1 may be used when a block adjacent to the top end is used as a reference block.

In this instance, a reference pixel set, which is generally referred when intra prediction is performed, belongs to adjacent blocks adjacent to the current block. The adjacent blocks are located at the bottom left, left, top left, top end, and top right end, and are pixels belonging to layer ref_0 (pixels closest to the boundary pixel), and the pixels belonging to each other are considered to be these pixels unless otherwise specified. However, only a part of pixels belonging to the above-mentioned adjacent blocks may be used as the reference pixel set, or pixels belonging to more than two layers may be used as the reference pixel set. Here, the reference pixel set or layer may be determined implicitly (preset in the encoding/decoding apparatus) or may be determined explicitly (information for determination may be received from the encoding apparatus).

The description is performed on the basis that the maximum number of supported reference pixel layers is 3, but may also have a value greater than this number, and the number of reference pixel layers and the number of reference pixel sets according to the positions of adjacent blocks that may be referred (or may be referred to as reference pixel candidate groups) may be set differently according to the size, shape, prediction mode, image type (I/PB, the image is a picture, a slice, a tile, etc. in this case), color component, etc. of a block, and related information may be included in units of sequence, picture, slice, tile, etc.

The disclosure is described on the premise that a low index (incremented by 1 from 0) is allocated from the reference pixel layer closest to the current block, but the disclosure is not limited thereto. In addition, the related information of the reference pixel configuration described below may be generated under the index setting as above (binarization of allocating a short bit to a low index in the case of selecting one of multiple reference pixel sets, etc.).

In addition, when there are more than two supported reference pixel layers, each reference pixel included in the more than two reference pixel layers may be used for weighted averaging.

For example, a prediction block may be generated using a reference pixel that is obtained from a weighted sum of pixels located in layer ref_0 (the closest pixel layer) and layer ref_1 (the next pixel layer) of FIG. 11. In this instance, according to the prediction mode (for example, a directional prediction mode), the pixels to which the weighted sum is applied in each reference pixel layer may be not only integer unit pixels but also decimal unit pixels. In addition, weighted values (for example, 7:1, 3:1, 2:1, and 1:1) are respectively applied to a prediction block obtained by using reference pixels according to a first reference pixel layer and a prediction block obtained by using reference pixels according to a second reference pixel, to obtain a prediction block. In this instance, if the weighted value is a prediction block according to the reference pixel layer adjacent to the current block, the weighted value may be higher.

Generally, for the above example, it is possible to use the closest pixel of the adjacent block as the reference pixel, but it is not limited thereto. For example, there may be various cases (for example, a case where ref_0 and ref_1 are selected as reference pixel layers and ref_0 and ref_1 are used to perform weighted sum and other methods to generate prediction pixel values, etc., that is, an implicit case).

In addition, reference pixel configuration related information (for example, selection information for a reference pixel layer or set, etc.) may not include preset information (for example, when the reference pixel layer is preset to ref_0). For example, it may be configured as, but not limited to, ref_1, ref_2, ref_3, etc.

Some cases of reference pixel configuration have been described through the above examples, which may be combined with various encoding/decoding information, etc. to determine intra prediction settings. In this instance, the encoding/decoding information includes an image type, a color component, a size and shape of a current block, a prediction mode (the type of the prediction mode (directional or non-directional), the direction of the prediction mode (vertical, horizontal, diagonal 1, diagonal 2, etc.), etc., and intra prediction settings (reference pixel configuration settings in this example) may be determined according to the encoding/decoding information of an adjacent block and the combination of the encoding/decoding information of the current block and the adjacent block.

Figure 12:
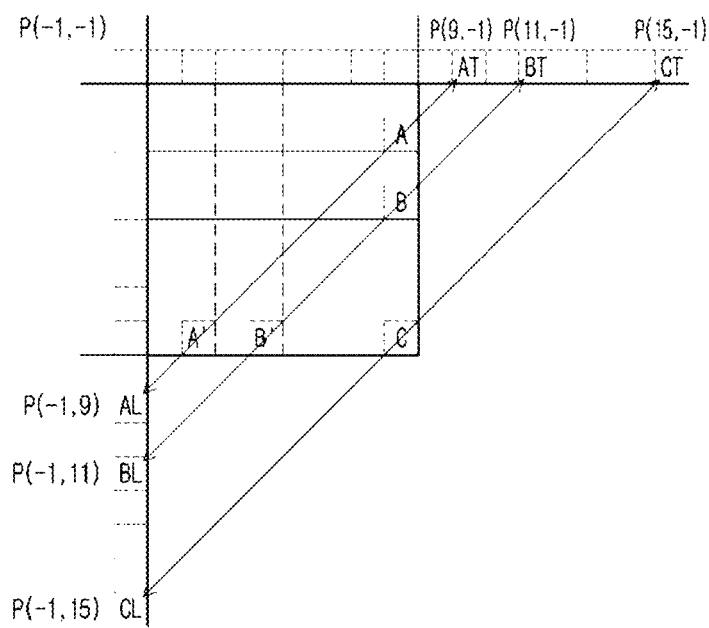
FIG. 12 is a schematic diagram for explaining a reference pixel range for intra prediction.

FIG. 12 is a schematic diagram for explaining a reference pixel range for intra prediction. In detail, the reference pixel range is determined according to the size and shape of a block, configuration of a prediction mode (in this example, angle information of the prediction mode), etc. The position indicated by an arrow in FIG. 12 is a pixel used for prediction.

Referring to FIG. 12, pixels A, A', B, B', and C refer to pixels at the bottom right end of 8×2, 2×8, 8×4, 4×8, and 8×8 blocks. In order to perform the prediction of pixels, the reference pixel range of each block may be determined by pixels AT, AL, BT, BL, CT, and CL used in the top and left side blocks.

For example, when the reference pixels are pixels A and A' (rectangular blocks), they are located within the range of p(0, −1) to p(9, −1), p(−1, 0) to p(−1, 9), p(−1, −1), when the reference pixels are pixels B and B' (rectangular blocks), they are located within the range of p(0, −1) to p(11, −1), p(−1, 0) to p(−1, 11), p(−1, −1), and when the reference pixel is pixel C (square block), it is located within the range of p(0, −1) to p(15, −1), p(−1, 0) to p(−1, 15), p(−1, −1).

The range information (for example, P(−1, −1), P(M+N−1, −1), P(−1, N+M−1), etc.) of the reference pixel obtained through the above process may be used for an intra prediction process (for example, a reference pixel filtering process, a prediction pixel generation process, etc.). In addition, the support of the reference pixels is not limited to the above cases, and various other cases are also possible.

The reference pixel configuration section for intra prediction may include a reference pixel generation section, a reference pixel interpolation section, a reference pixel filtering section, etc., and may include all or a part of the above configurations.

The reference pixel configuration section may check the availability of reference pixels to classify available reference pixels and unavailable reference pixels. For example, if a block at a preset position (or a reference pixel candidate block) may be used, the corresponding block may be used as a reference pixel, and if it is unavailable, the block cannot be used as a reference pixel.

When at least one of the following conditions is met, it is determined that a reference pixel is unavailable. For example, if any one of the cases where the reference pixel is outside a picture boundary, the reference pixel does not belong to the same partition unit as the current block (for example, slice, tile, etc.), encoding/decoding is not completed, and the use of the reference pixel is constrained according to the encoding/decoding setting is met, it is determined that the reference pixel is unavailable. That is, when none of the above conditions are met, it is determined that the reference pixel is available.

In addition, the use of reference pixels may be constrained by the encoding/decoding settings. For example, the use of reference pixels may be constrained according to whether to perform constrained intra prediction (for example, constrained_intra_pred_flag). When error-robust encoding/decoding is to be performed on external factors such as a communication environment, when it is attempted to prohibit the use of blocks reconstructed by referring to other images as reference pixels, constrained intra prediction may be performed.

When the constrained intra prediction is deactivated (for example, in picture type I or picture type P or B, constrained_intra_pred_flag=0), all reference pixel candidate blocks are available, and when activated (for example, in picture type P or B, constrained_intra_pred_flag=1), it may be determined whether to use the reference pixel of the corresponding block according to a coding mode (intra or inter) of the reference pixel candidate block. That is, if the coding mode of the block is Intra, the block may be used regardless of whether constrained intra prediction is activated. In the case of Inter, it is determined whether the block is available (deactivated) or unavailable (activated) according to whether constrained intra prediction is activated.

In addition, constrained intra prediction may be applied according to the coding mode of the reconstructed block corresponding to the current block in another color space. For example, the current block belongs to some color difference components Cb and Cr, and it is determined whether the constrained intra prediction is available according to the coding mode of the block in which encoding/decoding of the luminance component Y corresponding to the current block is completed. The above example may be an example of a case where a reconstructed block of another color space is used as a reference pixel. In addition, it may be an example of a case where the coding mode is independently determined according to the color space.

In this instance, when the reference pixel candidate block is encoded/decoded through some prediction methods (for example, prediction by block matching or template matching in a current image), it may be determined whether to use the reference pixel according to the encoding/decoding settings.

As an example, when encoding/decoding is performed using the prediction method, if the coding mode is set to Intra, the corresponding block may be determined to be available. Alternatively, even if it is Intra, special cases where the block is unavailable may be allowed.

For example, when encoding/decoding is performed using the prediction method, if the coding mode is set to Inter, the corresponding block may be determined to be unavailable. Alternatively, even if it is Inter, special cases where the block is available may be allowed.

That is, it may be determined, according to the encoding/decoding settings, whether to make an exception to the case of determining whether to use according to the coding mode.

The constrained intra prediction may be a setting applied to some image types (for example, slice/tile types P or B, etc.).

According to the availability of the reference pixel, reference pixel candidate blocks may be classified into a case where all reference pixel candidate blocks can be used, a case where some reference pixels can be used, and a case where all reference pixels are unavailable. Except for the case where all reference pixel candidate blocks can be used, in all other cases, reference pixels that are unavailable at the position of the candidate block may be filled or generated.

When a reference pixel candidate block is available, a pixel at a preset position of the block (in this example, it is assumed that the pixel is adjacent to the current block) may be stored in a reference pixel memory of the current block. In this instance, pixel data of the corresponding block position may be stored in the reference pixel memory through processes such as direct copying or reference pixel filtering.

When the reference pixel candidate block is unavailable, the pixels obtained through the reference pixel generation process may be stored in the reference pixel memory of the current block.

In a word, when the reference pixel candidate block is in an available state, the reference pixel may be configured, and when the reference pixel candidate block is in an unavailable state, the reference pixel may be generated.

The following shows examples of using various methods to fill the reference pixels at the positions of the unavailable blocks.

For example, an arbitrary pixel value may be used to generate a reference pixel, and may be a pixel value belonging to a pixel value range (for example, a value derived from a pixel value adjustment process based on a bit depth or a pixel value adjustment process based on pixel value range information of an image, such as a minimum value, a maximum value, and a median value). In detail, this may be an example applied when all reference pixel candidate blocks are unavailable.

Alternatively, reference pixels may be generated from the encoding/decoding completion of the image. In detail, reference pixels may be generated from at least one available block adjacent to an unavailable block. In this instance, at least one of extrapolation, interpolation, copying or other methods may be used, and a generation (or copying and extrapolation) direction of reference pixels may be a clockwise or counterclockwise direction, and may be determined according to the encoding/decoding settings. For example, the generation direction of reference pixels in the block may be a preset direction or a direction adaptively determined according to the position of the unavailable block. Alternatively, for a region corresponding to the current block in other color spaces, the same method as the above example may be used. The difference is that if the process of filling adjacent reference pixels of the current block is performed in the current color space, the process of filling block M×N corresponding to the current block m×n is performed in other color spaces. Therefore, various other methods including the above method may be used (for example, extrapolation in the vertical, horizontal, and diagonal directions of surrounding pixels, Planar interpolation, averaging, etc., in this case, the filling direction refers to a direction from the surrounding pixels of the block corresponding to the current block toward the inside of the block) to generate corresponding regions. This example may be a case where a prediction mode used to generate a prediction block from another color space is included in a candidate group, but is not excluded from the candidate group.

In addition, after configuration of the reference pixels is completed through the confirmation process of the availability of the reference pixels, reference pixels in a decimal unit may be generated through linear interpolation of the reference pixels. Alternatively, the reference pixel interpolation process may be performed after the reference pixel filtering process is performed. Alternatively, only the filtering process for the configured reference pixels may be performed. In a word, it may be performed before the prediction block generation process.

In this instance, in a horizontal mode, a vertical mode, some diagonal modes (for example, diagonal bottom right, diagonal bottom left, and diagonal top right) and non-directional modes, a color mode, a color copy mode, etc., the interpolation process is not performed, and in the case of other modes (other diagonal modes), interpolation may be performed.

The interpolation accuracy may be determined according to the supported prediction mode candidate group (or the total number of prediction modes), the prediction mode configuration (for example, a prediction mode direction angle and a prediction mode interval), etc.

A preset filter (for example, a 2-tap linear interpolation filter) may be used for reference pixel interpolation in a decimal unit, and one of multiple filter candidate groups (for example, a 4-tap cubic filter, a 4-tap Gaussian filter, a 6-tap Wiener filter, an 8-tap Kalman filter) may be used.

When one of multiple filter candidate groups is used, filter selection information may be explicitly generated or implicitly determined, and may be determined according to the encoding/decoding settings (for example, interpolation accuracy, block size and shape, prediction mode, etc.).

For example, an interpolation filter to be used may be determined according to the block size range, an interpolation filter to be used may be determined according to the interpolation accuracy, and an interpolation filter may be determined according to the characteristics of the prediction mode (for example, directional information, etc.).

In detail, according to the block size range, a preset interpolation filter a may be used in some ranges A, a preset interpolation filter b may be used in some ranges B, an interpolation filter c of multiple interpolation filters C may be used in some ranges C, an interpolation filter d of multiple interpolation filters D may be used in some ranges D, a preset interpolation filter may be used in some ranges, and one of multiple interpolation filters may be used in some ranges. In this instance, when use of one interpolation filter is implicit, use of one interpolation filter in multiple interpolation filters is explicit, and the size of a block for partitioning the block size range may be M×N (in this example, M and N are 4, 8, 16, 32, 64, and 128, etc.; that is, M and N may be the minimum or maximum value of each block size range).

The interpolation-related information may be included in units of video, sequence, picture, slice, tile, block, etc. The interpolation process may be a process performed at the reference pixel configuration section, or may be a process performed at the prediction block generation section.

In addition, after configuring the reference pixel, the reference pixel may be filtered to reduce deterioration remaining after the coding/decoding process to improve prediction accuracy. In this instance, the filter used may be a low-pass filter. It may be determined whether to perform filtering according to the encoding/decoding settings, if filtering is applied, fixed filtering or adaptive filtering may be applied, and decoding/decoding settings may be defined according to block size, shape, prediction mode, etc.

Fixed filtering refers to a case where a predetermined filter is applied to the reference pixel filtering section, and adaptive filtering refers to a case where one of multiple filters is applied to the reference pixel filtering section. In this instance, in the case of adaptive filtering, one of multiple filters may be determined implicitly according to the encoding/decoding settings, or selection information may be generated explicitly, and a filter such as a 3-tap (for example, [1, 2, 1]/4) or a 5-tap (for example, [2, 3, 6, 3, 2]) may be included as a filter candidate group.

As an example, filtering may not be applied at some settings (block range A).

As an example, filtering may not be applied at some settings (block range B, some mode C), and filtering may be applied at some settings (block range B, some mode D) through a preset filter (3-tap filter).

For example, filtering may not be applied at some settings (block range E, some mode F), filtering may be applied at some settings (block range E, some mode G) through a pre-filter (3-tap filter), filtering may be applied at some settings (block range E, some mode H) through a pre-filter (5-tap filter), and one of multiple filters may be selected for filtering at some settings (block range E, some mode I).

As an example, filtering may be applied through a predetermined filter (5-tap filter) at some settings (block range J, some mode K), and filtering may be further applied through a preset filter (3-tap filter). That is, multiple filtering processes may be performed. In detail, filtering may be further applied based on the results of previous filtering.

In the above example, the size of the block for partitioning the block size range may be M×N (in this example, M and N are 4, 8, 16, 32, 64, 128, etc., i.e., M and N may be minimum or maximum values of each block size range). In addition, the prediction mode may be roughly classified into a directional mode, a non-directional mode, a color mode, a color copy mode, etc., and in detail, Mode 1 adjacent to the horizontal or vertical mode/diagonal mode (interval of 45 degrees)/the horizontal or vertical mode, Mode 2 adjacent to the horizontal or vertical mode (the mode interval is slightly longer than the above interval), etc. That is, as described above, it is determined whether to perform filtering and the type of filtering according to a classification mode.

In addition, the above examples show a case where adaptive filtering is applied according to multiple factors such as a block range and a prediction mode. However, the multiple factors are not always required, and there may also be an example where adaptive filtering is performed according to at least one factor. In addition, there may be various transform examples without being limited to the above examples, and the reference pixel filter-related information may be included in units of video, sequence, picture, slice, tile, and block.

The filtering may be selectively performed based on a predetermined flag. The flag may indicate whether filtering is performed on the reference pixel to perform intra prediction. The flag may be encoded and signaled by the coding apparatus. Alternatively, the flag may be derived from the decoding apparatus based on a coding parameter of the current block. The coding parameter may include at least one of a position/region of a reference pixel, a block size, a component type, whether intra prediction in units of sub-blocks is applied or an intra prediction mode.

For example, when the reference pixel of the current block is a first pixel line adjacent to the current block, the reference pixel may be filtered, otherwise, the reference pixel may not be filtered. Alternatively, the reference pixel may be filtered if the number of pixels belonging to the current block is greater than the number of predetermined thresholds, otherwise, the reference pixel may not be filtered. The threshold is a value predetermined for the encoding/decoding apparatus, and may be an integer of 16, 32, 64 or more. Alternatively, the reference pixel may be filtered if the current block is greater than a predetermined threshold, otherwise, the reference pixel may not be filtered. The threshold may be represented as M×N, and is a value predetermined for the encoding/decoding apparatus, and M and N may be an integer of 8, 16, 32, or more. The threshold number or threshold size may be set to determine whether to filter the reference pixel by one of the threshold number and threshold size alone or a combination thereof. Alternatively, the reference pixel may be filtered if the current block is a luminance component, otherwise, the reference pixel may not be filtered. Alternatively, if the current block does not perform the above intra prediction in units of sub-blocks (that is, the current block is not partitioned into multiple sub-blocks), the reference pixel is filtered, otherwise, the reference pixel may not be filtered. Alternatively, the reference pixel may be filtered if the intra prediction mode of the current block is a non-directional mode or a predetermined directional mode, otherwise, the reference pixel may not be filtered. Here, the non-directional mode may be a planar mode or a DC mode. However, in the DC mode of the non-directional mode, it may be restricted to not filter the reference pixel. The directional mode may refer to an intra prediction mode with reference to an integer pixel. For example, the directional mode may include at least one of the intra prediction modes corresponding to modes −14, −12, −10, −6, 2, 18, 34, 50, 66, 72, 78, and 80 illustrated in FIG. 9. However, the directional mode may be restricted to exclude the horizontal mode and the vertical mode corresponding to modes 18 and 50, respectively.

When filtering the reference pixel according to the flag, filtering may be performed based on a filter predefined in the encoding/decoding apparatus. The number of filter taps may be 1, 2, 3, 4, 5 or more. The number of filter taps may be variably determined according to the position of the reference pixel. For example, a 1-tap filter may be applied to the reference pixels corresponding to at least one side of the bottommost, topmost, leftmost, and rightmost end of the pixel line, and a 3-tap filter may be applied to the remaining reference pixels. In addition, the strength of the filter may be variably determined according to the position of the reference pixel. For example, the filter strength s1 may be applied to the reference pixels corresponding to at least one side of the bottommost, topmost, leftmost, and rightmost end of the pixel line, and the filter strength s2 may be applied to the remaining reference pixels (s1<s2). The filter strength may be signaled in the coding apparatus, or may be determined based on the above coding parameters. When an n-tap filter is applied to a reference pixel, the filter may be applied to the current reference pixel and (n−1) surrounding reference pixels. The surrounding reference pixels may indicate pixels located in at least one of the top end, bottom end, left side, or right side of the current reference pixel. The surrounding reference pixels may belong to the same pixel line as the current reference pixel, and a part of the surrounding reference pixels may belong to a pixel line different from the current reference pixel.

For example, when the current reference pixel is located on the left side of the current block, the surrounding reference pixels may be pixels adjacent in at least one direction of the top end or the bottom end of the current reference pixel. Alternatively, when the current reference pixel is located at the top end of the current block, the surrounding reference pixels may be pixels adjacent in at least one of the left and right sides of the current reference pixel. Alternatively, when the current reference pixel is located at the top left end of the current block, the surrounding reference pixels may be pixels adjacent in at least one of the bottom end or the right side of the current reference pixel. The ratio between the coefficients of the filter may be [1:2:1], [1:3:1] or [1:4:1].

The prediction block generation section may generate a prediction block according to at least one prediction mode, and use the reference pixel based on the intra prediction mode. In this case, the reference pixel may be used in methods such as extrapolation (directional mode) according to the prediction mode, and may be used in methods (non-directional mode) such as interpolation or average (DC) or copy. Meanwhile, as described above, the current block may use filtered reference pixels or may use unfiltered reference pixels.

Figure 13:
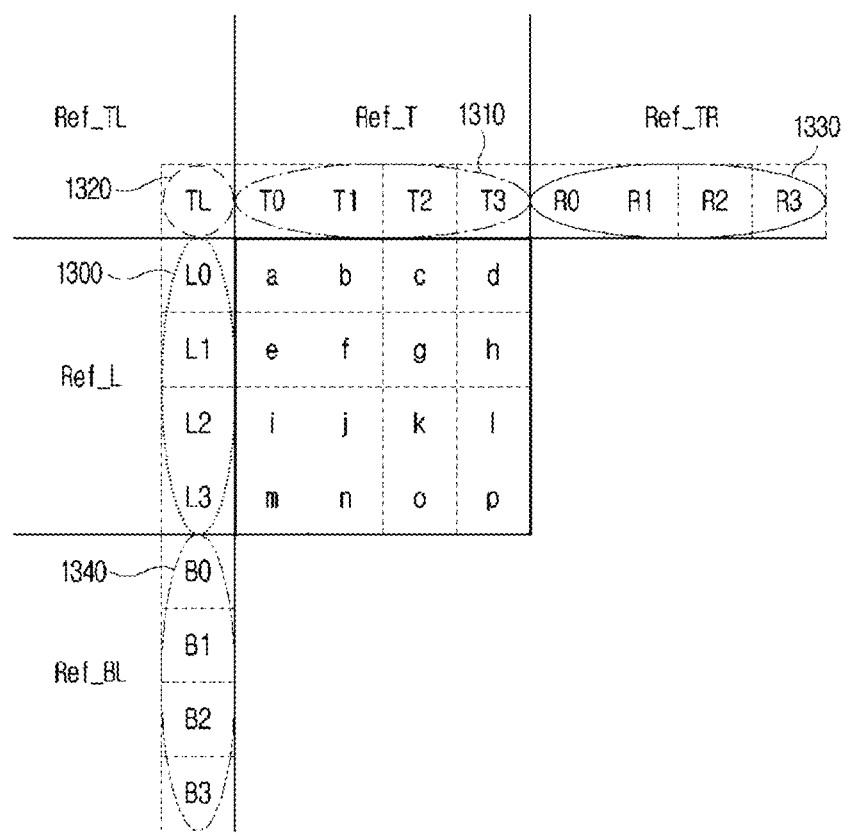
FIG. 13 is a diagram illustrating a block adjacent to a current block for generating a prediction block.

FIG. 13 is a diagram illustrating a block adjacent to a current block for generating a prediction block.

For example, in the directional mode, a mode between horizontal mode and some diagonal modes (diagonal up right, including diagonal lines other than horizontal) may use reference pixels of bottom left block+left block (Ref_BL and Ref_L in FIG. 13), the horizontal mode may use a reference pixel of the left block, a mode between the horizontal and vertical modes may use reference pixels of left block+top left block+top block (Ref_L, Ref_TL and Ref_T in FIG. 13), the vertical mode may use a reference pixel of the top block (Ref_L in FIG. 13), and a mode between vertical mode and some diagonal modes (diagonal bottom left, including diagonals other than vertical) may use reference pixels of top block+top right block (Ref_T and Ref_TR in FIG. 13). Alternatively, in the non-directional mode, the reference pixels of the left block and the top block (Ref_L and Ref_T in FIG. 13) or the reference pixels of the bottom left block, the left block, the top left block, the top block and the top right block (Ref_BL, Ref_L, Ref_TL, Ref_T, and Ref_TR in FIG. 13). Alternatively, in the case of using a color space correlation mode (color copy mode), reconstructed blocks of other color spaces (not illustrated in FIG. 12, but referred to as Ref Col in the disclosure; it means that collocated reference of blocks in different spaces at the same time) are used as reference pixels.

The reference pixels used for intra prediction may be distinguished into multiple concepts. For example, the reference pixels used for intra prediction may be distinguished into a first reference pixel and a second reference pixel, and the first reference pixel may be a pixel directly used to generate the prediction value of the current block, and the second reference pixel may be a pixel indirectly used to generate the prediction value of the current block. Alternatively, the first reference pixel may be a pixel used to generate the prediction values of all pixels of the current block, and the second reference pixel may be a pixel used to generate the prediction value of some pixels of the current block. Alternatively, the first reference pixel may be a pixel used to generate a main prediction value of the current block, and the second reference pixel may be a pixel used to generate an auxiliary prediction value of the current block. Alternatively, the first reference pixel (unconditionally) may be a pixel in a region at the starting point of a prediction direction of the current block, the second reference pixel may be a pixel that is not at the starting point of the (necessary) prediction direction of the current block.

As described in the above example, although the reference pixels can be distinguished by various definitions, there may be cases where some definitions are not distinguished according to the prediction mode. That is, it should be noted that the definition used to distinguish the reference pixels may be different according to the prediction mode.

The reference pixel described by the above example may be the first reference pixel, and the second reference pixel may further participate in generation of the prediction block. In a mode between some diagonal modes (diagonal up right, including diagonal lines other than horizontal) may use reference pixels of top left block+top block+top right block (Ref_TL, Ref_T and Ref_TR in FIG. 13), the horizontal mode may use reference pixels of top left block+top block+top right block (Ref_TL, Ref_T and Ref_TR in FIG. 13), the vertical mode may use reference pixels of top left block+left block+bottom left block (Ref_TL, Ref_T and Ref_TR in FIG. 13), the vertical mode may use reference pixels of top left block+left block+bottom left block (Ref_TL, Ref_L and Ref_BL in FIG. 13), and a mode between vertical mode and some diagonal modes (diagonal bottom left, including diagonals other than vertical) may use reference pixels of top left block+left block+bottom left block (Ref_TL, Ref_L and Ref_BL in FIG. 13). In detail, the reference pixel may be used as the second reference pixel. Also, the first reference pixel or the first and second reference pixels may be used to generate the prediction block in the non-directional mode and the color copy mode.

In addition, it can be considered that the second reference pixel includes not only pixels that have been encoded/decoded, but also pixels in the current block (prediction pixels in this example). That is, a main prediction value may be a pixel used to generate an auxiliary prediction value. The disclosure will mainly describe an example in which a pixel that has been encoded/decoded is considered as the second reference pixel, but the disclosure is not limited thereto, and there may also be a transform example in which pixels that have not been encoded/decoded (prediction pixels in this example) are used.

To compensate for shortcomings of the existing prediction mode, the prediction block may be generated or corrected using multiple reference pixels.

For example, the directional mode is a mode used for predicting the directionality of the corresponding block by using some reference pixels (first reference pixel), but may not accurately reflect the changes in the block, which may cause that the prediction accuracy is reduced. In this instance, when the prediction block is generated or corrected by using an additional reference pixel (second reference pixel), the accuracy of prediction can be improved.

For this purpose, a case where a prediction block is generated using various reference pixels as the above example will be described in the following example, but the disclosure is not limited to the case of the above example, and even if the terms of the first and second reference pixels are not used, the terms may be derived and understood from the above definitions.

The setting for using the additional reference pixel to generate the prediction block may be explicitly determined or implicitly set. In the explicit case, the unit may include video, sequence, picture, slice, tile, etc. In the following example, the case of implicit processing will be described, but the disclosure is not limited thereto, and there may be other modified (explicit or combined) examples.

According to the prediction mode, the prediction block may be generated in various ways. In detail, the prediction method may be determined according to the position of the reference pixel used in the prediction mode. In addition, the prediction method may be determined according to a pixel position in a block.

The case of the horizontal mode will be described below.

For example, when the left block is used as the reference pixel (Ref_L in FIG. 13), the prediction block is generated in the horizontal direction by using (for example, extrapolation, etc.) the closest pixel (1300 in FIG. 13).

In addition, the prediction block may be generated (or corrected; the generation may involve a final prediction value; the correction may not involve all pixels) by using reference pixels adjacent to the current block corresponding to the horizontal direction. In detail, the closest pixel of the corresponding block (1310 in FIG. 13; other 1320 and 1330 may also be considered) may be used to correct the prediction value, and the change degree or gradient information of the pixel, etc. (for example, the change degree or gradient information of pixel values reflected in R0-T0, T0-TL, T2-TL, T2-T0, T2-T1, etc.) may be fed back to the correction process.

In this instance, the pixels to be corrected may be all pixels in the current block, or may be limited to some pixels (for example, it may be determined in units of a single pixel that has no specific shape or exists in an irregular position, as in the following example, it is determined in units of a line pixel having a certain shape; for ease of description, the description is performed by assuming a pixel unit with a line as a unit in the following example). If the correction pixel is restrictedly applied to some pixels, the unit may be determined as at least one line corresponding to the prediction mode direction. For example, pixels corresponding to a to d may be included in a correction target, and further, pixels corresponding to e to h may also be included in the correction target. In addition, the correction information obtained from the adjacent pixels of the block may be applied identically regardless of the position of the line, or the correction information may be applied differently in units of lines, and as the distance from the adjacent pixels is larger, the application of correction information may be less (for example, a larger partition value may be set according to the distance, such as L1-TL and L0-TL).

In this instance, pixels included in a correction object may have only one setting in one image, or may be adaptively determined according to various encoding/decoding elements.

Taking the case of adaptive determination as an example, pixels to be corrected may be determined according to the size of a block. In a block smaller than 8×8, no line is corrected, only one pixel line can be corrected for a block larger than 8×8 and smaller than 32×32, and two pixel lines may be corrected for a block larger than 32×32. The definition of the block size range may be derived from the previous description of the disclosure.

Alternatively, the pixels to be corrected may be determined according to the shape of the block (for example, square or rectangle; specifically, a long rectangle in the horizontal direction or a long rectangle in the vertical direction). For example, in the case of a block 8×4, two pixel lines (a to h in FIG. 13) may be corrected, and in the case of a block 4×8, one pixel line (a to d in FIG. 13) may be corrected. If the shape of a horizontally stretched block is determined to be in the horizontal mode in the case of 8×4, the directionality of the current block may depend more on the top block, and if the shape of a vertically stretched block is determined to be in the horizontal mode in the case of 4×8, the directionality of the current block may not be so dependent on the top block. Moreover, the above opposite arrangement is also possible.

Alternatively, the pixels to be corrected may be determined according to the prediction mode. In the horizontal or vertical mode, a pixel lines may be correction targets, while in other modes, b pixel lines may be correction targets. As described above, in the case of some modes (for example, a non-directional mode DC, a color copy mode, etc.), the pixels to be corrected are not rectangular, but the range is specified in units of pixels (for example, a to d, e, i, m). This will be described in detail in the following example.

In addition to the above description, according to additional encoding/decoding elements, adaptive settings may be applied. The above description focuses on the limitation of the horizontal mode. However, it is not only applicable to the above examples, but also the same or similar settings are applied to other modes. Also, the case as in the above example is implemented according to a combination of multiple elements, rather than one coding/decoding element.

In the case of the vertical mode, since it may be obtained by applying different directions to the prediction method of the horizontal mode, the detailed description thereof is omitted. In addition, in the following example, repeated content with the description of the horizontal mode is omitted.

The case of a diagonal mode (diagonal up right) will be described below.

For example, when the left block and the bottom left block are used as reference pixels (first reference pixels or main reference pixels, Ref_L and Ref_BL in FIG. 13), the prediction block is generated in the diagonal direction by using the closest pixels (1300 and 1340 in FIG. 13) of the corresponding block (for example, extrapolation, etc.).

In addition, the prediction block may be generated (or corrected) by using reference block (second reference pixels or auxiliary reference pixels; Ref_T and Ref_TR in FIG. 13) adjacent to the current block located at diagonally opposite positions. In detail, the prediction value may be corrected by using the closest pixels of the corresponding block (1310 and 1330 in FIG. 13, and 1320 can be additionally considered), and may be fed back to the correction process through the weighted average of the auxiliary reference pixel and the main reference pixel (for example, a weighted value may be obtained based on at least one of the prediction pixel, the main reference pixel, or a distance difference of an x axis or a y axis between the prediction pixel and the auxiliary reference pixel; an example of the weighted value applied to the main reference pixel and the auxiliary reference pixel may include 15:1 to 8:8; if there are more than two auxiliary reference pixels, the example of the weighted value is that the weighted values in the auxiliary reference pixels such as 14:1:1, 12:2:2, 10:3:3, 8:4:4 are the same, or the weighted values between the auxiliary reference pixels such as 12:3:1, 10:4:2, 8:6:2 may be different; in this case, by centering on the corresponding prediction pixel, different weighted values are determined according to the proximity of tilt information in the current prediction mode direction, that is, it is determined the gradient of a current prediction mode to which the gradient of the corresponding prediction pixel and each auxiliary reference pixel is closer).

In this instance, the filtering has one setting in one image or the filtering is determined adaptively according to various encoding/decoding elements.

Taking the case of adaptive determination as an example, the pixels to be filtered (for example, the number of pixels, etc.) may be determined according to the positions of the pixels to be corrected. If the prediction mode is a diagonal mode (mode 2 in this example) and the pixel to be corrected is c, prediction is performed using L3 (the first reference pixel in this example), and correction is performed using T3 (the second reference pixel in this example). That is, it may be a case where one first reference pixel and one second reference pixel are used for one pixel prediction.

Alternatively, when the prediction mode is a diagonal mode (mode 3 in this example) and the pixel to be corrected is b, prediction is performed using L1\* (or L2\*, in this example, the first reference pixel) obtained by performing interpolation on pixels of decimal units between L1 and L2, and correction is performed using T2 (in this example, the second reference pixel), or correction may be performed using T3. Alternatively, correction may be performed using T2 and T3, or correction may be performed using T2\* (or T3\*) that is obtained by performing interpolation on pixels of decimal units between T2 and T3 obtained based on the directivity of the prediction mode. That is, in order to predict one pixel, one first reference pixel (in this example, assuming L1\*, it may be regarded as two pixels when the directly used pixels are regarded as L1 and L2; or according to a filter used to perform interpolation on L1\*, it may be regarded as two or more pixels) and two second reference pixels (in this example, assuming T2 and T3, L1\* may be regarded as one pixel) may be used.

In a word, at least one first reference pixel and at least one second reference pixel may be used for one pixel prediction, which may be determined according to the prediction mode and the position of the prediction pixel.

If the correction pixels are restrictively applied to some pixels, corrected pixels may be determined in units of at least one horizontal line or vertical line according to the intra prediction mode direction. For example, pixels corresponding to a, e, i and m or pixels corresponding to a to d may be included in the correction target, and further, pixels corresponding to b, f, j and n or pixels corresponding to e to h may also be included in the correction target. In some cases of diagonal up right, pixels in horizontal line units may be corrected, and in some cases of diagonal down left, pixels in vertical line units may be corrected, which are not limited thereto.

In addition to the above description, according to additional coding/decoding elements, adaptive settings may be applied. The above description focuses on the limitation of diagonal up right. However, it is not only restrictively applicable to the above examples, but also the same or similar settings are applied to other modes. Also, the above example is implemented according to multiple elements rather than a combination of one coding/decoding element.

In the case of diagonal down left, since it may be obtained by only applying different directions to the prediction method of diagonal up right, the detailed description is omitted.

The case of diagonal up left will be described below.

For example, when the left block, the top left block and the top block are used as reference pixels (first reference pixels or main reference pixels, Ref_L, Ref_TL and Ref_T in FIG. 13), the prediction block is generated in the diagonal direction by using the closest pixels (1300, 1310 and 1320 in FIG. 13) of the corresponding block (for example, extrapolation, etc.).

In addition, the prediction block may be generated (or corrected) by using reference pixels (second reference pixels or auxiliary reference pixels, Ref_L, Ref_TL and Ref_T in FIG. 13, at the same position as the main reference pixel) adjacent to the current block located at positions matching diagonal lines. In detail, pixels other than the closest pixels of the corresponding block (pixels located on the left side of 1300, pixels located on the left side, top side, and top left side of 1320, pixels located on the top side of 1310, etc. in FIG. 13) may be used to correct the prediction value, and may be fed back to the correction process by the weighted average of the auxiliary reference pixel and the main reference pixel (for example, an example of the ratio of the weighted values applied to the main reference pixel and the auxiliary reference pixel may be 7:1 to 4:4, etc., if there are more than two auxiliary reference pixels, an example of the weighted value may be a case where the weighted values in the auxiliary reference pixels are the same such as 14:1:1, 12:2:2, 10:3:3, and 8:4:4, or weighted values between the auxiliary reference pixels are different such as 12:3:1, 10:4:2, and 8:6:2; in this case, the weighted values applied differently may be determined according to whether they are adjacent to the main reference pixel) or linear extrapolation, etc.

If the correction pixels are restrictively applied to some pixels, corrected pixels can be determined in units of a horizontal line or a vertical line adjacent to the reference pixel used in the prediction mode. In this instance, horizontal and vertical lines may be considered at the same time, and overlap may be allowed. For example, pixels corresponding to a to d and pixels (a overlapping) corresponding to a, e, i and m may be included in a correction target. Further, pixels corresponding to e to h and pixels corresponding to b, f, j and n (a, b, e, and f overlap) may be included in the correction target.

The case of a non-directional mode (DC) will be described below.

For example, when at least one of the left block, the top block, the top left block, the top right block or the bottom left block is used as the reference pixel, the closest pixel of the block (assuming pixels 1300 and 1310 in FIG. 13 in this example) may be used (for example, averaged, etc.) to generate the prediction block.

Alternatively, an adjacent pixel of the reference pixel (the second reference pixel or the auxiliary reference pixel of the reference pixel; the positions of Ref_L and Ref_T in FIG. 13 in this example are the same as the main reference pixel or in addition to the main reference pixel, the pixel located at the next adjacent position is also included; a case similar to diagonal up right) may be used to generate (or correct) the prediction block. In detail, pixels at the same or similar positions as the main reference pixel of the corresponding block may be used to correct the prediction value, and may be fed back to the correction process by the weighted average of the auxiliary reference pixel and the main reference pixel (for example, an example of the ratio of the weighted values applied to the main reference pixel and the auxiliary reference pixel may be 15:1 to 8:8, etc., if there are more than two auxiliary reference pixels, an example of the weighted value may be a case where weighted values in the auxiliary reference pixels are the same such as 14:1:1, 12:2:2, 10:3:3, and 8:4:4, or weighted values between the auxiliary reference pixels are different such as 12:3:1, 10:4:2, and 8:6:2).

In this instance, the filtering has one setting for one image or the filtering is determined adaptively according to various encoding/decoding elements.

Taking the case of adaptive determination as an example, a filter may be determined according to the size of a block. For the pixels located at the top left, top end, and left end of the current block (in this example, assuming that the pixel located at the top left end filters pixels on the left and above the pixel, and the pixel located at the top end filters pixels on the top side of the pixel, and the pixel on the left end filters pixels on the left side of the pixel), some filtering settings may be used in a block smaller than 16×16 (in this example, filtering is applied according to a weighting ratio of 8:4:4 and 12:4), and some filtering settings may be used in a block larger than 16×16 (in this example, filtering is applied according to a weighting ratio of 10:3:3 and 14:2).

Alternatively, the filter may be determined according to the shape of a block. For example, for a 16×8 block, some filter settings may be used for the pixels at the top end of the current block (in this example, it is assumed that pixels on the top left, top, and top right sides of the pixel are filtered, that is, it may be regarded as an example where the filtered pixels are also changed; the weighting ratio of filtering is 10:2:2:2), and some filter settings may be used for pixels at the left end of the current block (in this example, it is assumed that a pixel at the left end of the pixel is filtered, and the weighting ratio of filtering is 12:4). This is an example assuming that it can be applied to multiple pixels on the top side of the block in a block shape longer in the horizontal direction. Also, the opposite arrangement may also be implemented.

If the correction is restricted to some pixels, corrected pixels can be determined in units of a horizontal line or a vertical line adjacent to the reference pixel used in the prediction mode. In this instance, horizontal and vertical lines may be considered at the same time, and overlap may be allowed. For example, pixels corresponding to a to d and pixels (a overlapping) corresponding to a, e, i and m may be included in a correction target. Further, pixels corresponding to e to h and pixels corresponding to b, f, j and n (a, b, e, and f overlap) may be included in the correction target.

In addition to the above description, according to additional coding/decoding elements, adaptive settings may be implemented. The above description focuses on the limitation of a non-directional mode. However, it is not only restrictively applicable to the above examples, but also the same or similar settings are applied to other modes. Also, the example as described above is implemented according to a combination of multiple elements, rather than one coding/decoding element.

The case of the color copy mode will be described below.

For the color copy mode, the prediction block is generated by a method different from the prediction method of the existing prediction mode, but the reference pixels may be used identically or similarly to generate (or correct) the prediction block. Since the content of obtaining the prediction block may be derived through the above examples and the following examples, the content of obtaining the prediction block is omitted.

For example, the prediction block may be generated by using (for example, copying) a block corresponding to the current block in a different color space as a reference pixel (first reference pixel or main reference pixel).

Alternatively, the prediction block may be generated (or corrected) by using reference pixels (second reference pixels or auxiliary reference pixels; Ref_L, Ref_T, Ref_TL, Ref_TR, and Ref_BL in FIG. 13) of a block adjacent to the current block. In detail, the closest pixels (it is assumed to be 1300 and 1310 in FIG. 13 in this example) of the corresponding block may be used to correct the prediction value, and may be fed back to the correction process by the weighted average of the auxiliary reference pixel and the main reference pixel (for example, an example of the ratio of the weighted values applied to the main reference pixel and the auxiliary reference pixel may be 15:1 to 8:8, etc., if there are more than two auxiliary reference pixels, an example of the weighted value may be a case where weighted values in the auxiliary reference pixels are the same such as 14:1:1, 12:2:2, 10:3:3, and 8:4:4, or weighted values between the auxiliary reference pixels are different such as 12:3:1, 10:4:2, and 8:6:2).

Alternatively, pixels of a block adjacent to blocks acquired in other color spaces (second reference pixels or auxiliary reference pixels; when it is assumed that the picture in FIG. 13 is a block corresponding to the current block in other color spaces, pixels are Ref_L, Ref_T, Ref_TL, Ref_TB, Ref_BL and Ref R, Ref_BR, Ref_B not illustrated in FIG. 13) may be used to generate (or correct) the prediction block. Pixels to be corrected and surrounding pixels (For example, a first reference pixel or a first reference pixel and a second reference pixel in different color spaces, i.e., within a block, when the weighted average or the like is applied, the first reference pixel to be corrected and the filtered first reference pixel are required, and at a block boundary, the first reference pixel to be corrected and the filtered first reference pixel are required) may be filtered and fed back to the correction process.

In the case where a combination of the two cases occurs, not only pixels of adjacent blocks of the current block can be used, but also pixels in prediction blocks obtained in other color spaces can be used for correction, and pixels to be corrected and surrounding pixels (for example, pixels of adjacent blocks for correcting target pixels and pixels within a current block adjacent to adjacent blocks for correcting target pixels) are filtered (for example, at a correction target position, an M×N mask is used to apply an example of filtering; at this time, the mask filters the pixels and all or part of pixels at top, bottom, left, right, top left, top right, bottom left, bottom left, etc.) and fed back to the correction process.

This example illustrates the case where the filtering is applied after obtaining the prediction value of the current block in other color spaces, but it is also possible that the filtered value in the corresponding color space before the prediction value is obtained is taken as the prediction value of the current block. In this instance, it should be noted that this case only differs in order from the above example, and the filtered object is the same.

In this instance, the filtering has only one setting in one image or the filtering is determined adaptively according to various encoding/decoding elements.

For example, for the case of adaptive determination, the filtering setting may be determined according to the prediction mode. In detail, it is possible to set the adaptive filtering according to the detailed color copy mode in the color copy mode. For example, in certain color copy modes (in this example, when a related information set <a and b> is obtained in an adjacent region of the current block and an adjacent region of a block corresponding to different color spaces), some filter settings <1> may be adopted, and in some color copy modes (in this example, compared to the above mode, when multiple correlation information sets are obtained, that is, a1 and b1, a2 and b2), some filter settings <2> may be adopted.

In the filter settings, it may be determined whether to apply filtering. For example, according to the filter settings, filter <1> may be applied or filter <2> may not be applied. Alternatively, filter A <1> may be used or filter B <2> may be used. Alternatively, the filtering may be applied to all pixels on the left and top sides of the current block, or the filtering may be applied to some pixels on the left and top sides.

If pixels to be corrected are limited to some pixels, the pixels to be corrected can be determined in units of horizontal lines or vertical lines that are adjacent to the reference pixels used in the prediction mode (auxiliary reference pixels in this example, different from the foregoing example). In this instance, horizontal and vertical lines may be considered at the same time, and overlap may be allowed.

For example, pixels corresponding to a to d and pixels (a overlapping) corresponding to a, e, i and m may be included in a correction target. Further, pixels corresponding to e to h and pixels corresponding to b, f, j and n (a, b, e, and f overlap) may be included in the correction target.

In a word, main reference pixels for generating the prediction block may be obtained from other color spaces, and auxiliary reference pixels for correcting the prediction block may be obtained from blocks adjacent to the current block of the current color space. Also, they may be obtained from blocks adjacent to corresponding blocks of other color spaces. Also, they may be obtained from some pixels of the prediction block of the current block. That is, some pixels in the prediction block may be used to correct some pixels in the prediction block.

In addition to the above description, according to additional encoding/decoding elements, adaptive settings may be applied. The above description focuses on the limitation of a non-directional mode. However, it is not only restrictively applicable to the above examples, but also the same or similar settings are applied to other modes. Also, the example as described above is implemented according to a combination of multiple elements, rather than one coding/decoding element.

This example is an example of obtaining a prediction block of a current block using correlation between color spaces, but a block for obtaining correlation is obtained from an adjacent region of the current block and an adjacent region of corresponding blocks of different color spaces, and therefore, filtering may be applied to a block boundary.

There are multiple cases where multiple reference pixels may be used to generate the prediction block according to the encoding/decoding settings. In detail, it may be determined whether generation or correction of the prediction block using the second reference pixel is supported according to the encoding/decoding settings.

As an example, it may be implicitly or explicitly determined whether to use additional pixels in the prediction process. In the explicit case, the above information may be included in units of video, sequence, picture, slice, tile, block, etc.

As an example, the determination regarding whether additional pixels are used in the prediction process may be applied to all prediction modes, or may be applied to some prediction modes. In this instance, some prediction modes may be at least one of horizontal, vertical, some diagonal modes, non-directional modes, color copy modes or the like.

As an example, the determination regarding whether additional pixels are used in the prediction process may be applied to all blocks or may be applied to some blocks. In this instance, some blocks may be defined according to the size, shape, etc. of the blocks, and the corresponding blocks are M×N (for example, the lengths of M and N are 8, 16, 32, 64, etc.; if the blocks are square, the length is 8×8, 16×16, 32×32, 64×64, etc.; if the blocks are rectangular, the rectangle may be 2:1, 4:1, etc.).

In addition, it may be determined whether additional pixels are used in the prediction process according to some encoding/decoding settings. In this instance, the encoding/decoding settings may be constrained_intra_pred_flag, and additional reference pixels may be limitedly used in the prediction process according to the flag.

For example, when the use of a region including the second reference pixel is limited by the flag (i.e., assuming a region filled by a process of reference pixel filling or the like according to the above flag), the second reference pixel may be limited to use in the prediction process. Alternatively, the second reference pixel may be used in the prediction process independently of the flag.

In addition to the cases described by the above example, there may be various applications and modifications such as combinations of one or more elements. In addition, although the above example describes only some cases related to the color copy mode, in addition to color copy, the example may be equally or variably used to generate or correct a prediction mode of a prediction block using multiple reference pixels.

The above example has described a case having one setting for generating or correcting the prediction block by using multiple reference pixels in each prediction mode, but multiple settings may be used for each prediction mode. That is, multiple candidate groups of filtering settings may be configured to generate selection information.

In a word, information about whether to perform filtering may be explicitly or implicitly processed, and when performing filtering, information about filtering selection information may be explicitly or implicitly processed. When processing information explicitly, the information may be included in units of video, sequence, picture, slice, tile, and block.

The generated prediction block may be corrected, and a process of correcting the prediction block will be described below.

The correction process may be performed based on predetermined reference pixels and weights. In this instance, the reference pixel and the weighted value may be determined according to the position of the pixel (hereinafter, referred to as the current pixel) in the current block to be corrected. The reference pixel and the weighted value may be determined according to the intra prediction mode of the current block.

When the intra prediction mode of the current block is the non-directional mode, the reference pixels ref L and ref T of the current pixel may belong to a first pixel line adjacent to the current block and may be located at the same horizontal/vertical line as the current pixel. The weighted value may include at least one of a first weighted value wL in an x-axis direction, a second weighted value wT in a y-axis direction, or a third weighted value wTL in a diagonal direction. The first weighted value may refer to a weighted value applied to a left reference pixel, the second weighted value may refer to a weighted value applied to a top reference pixel, and the third weighted value may refer to a weighted value applied to a top left reference pixel. Here, the first weighted value and the second weighted value may be determined based on the position information of the current pixel and a predetermined scaling factor (nScale). The scaling factor may be determined based on the width W and height H of the current block. For example, a first weighted value wL[x] of a current pixel predPixel[x][y] is determined to be (32>>((x<<1)>>nScale)) and a second weighted value (wT[x]) is determined to be (32>>((y<<1)>>nScale)). The third weighted value wTL[x][y] may be determined to be ((wL[x]>>4)+(wT[y]>>4)). However, when the intra prediction mode is a planar mode, the third weighted value may be determined to be 0. The scaling factor may be set to ((Log 2(nTbW)+Log 2(nTbH)−2)>>2).

When the intra prediction mode of the current block is the vertical/horizontal mode, the reference pixels ref L and ref T of the current pixel may belong to a first pixel line adjacent to the current block and may be located at the same horizontal/vertical line as the current pixel. In the vertical mode, a first weighted value wL[x] of a current pixel predPixel[x][y] is determined to be (32>>((x<<1)>>nScale)), a second weighted value wT[y] may be determined to be 0, and a third weighted value wTL[x][y] may be determined to be equal to the first weighted value. On the other hand, in the horizontal mode, a first weighted value wL[x] of a current pixel predPixel[x][y] is determined to be 0, a second weighted value wT[y] may be determined to be (32>>((y<<1)>>nScale)), and a third weighted value wTL[x][y] may be determined to be equal to the second weighted value.

When the intra prediction mode of the current block is the diagonal mode, the reference pixels refL and refT of the current pixel may belong to a first pixel line adjacent to the current block and may be located at the same diagonal line as the current pixel. Here, the diagonal line has the same angle as the intra prediction mode of the current block. The diagonal line may represent a diagonal line from the bottom left end to the top right end, or may represent a diagonal line from the top left end to the bottom right end. In this instance, a first weighted value wL[x] of a current pixel predPixel[x][y] is determined to be (32>>((x<<1)>>nScale)), a second weighted value wT[y] is determined to be (32>>((y<<1)>>nScale)), and a third weighted value wTL[x][y] may be determined to be 0.

When the intra prediction mode of the current block is less than or equal to mode 10, the reference pixels refL and refT of the current pixel may belong to a first pixel line adjacent to the current block and may be located at the same diagonal line as the current pixel. Here, the diagonal line has the same angle as the intra prediction mode of the current block. In this instance, the reference pixel may be restricted such that only one of the left reference pixel or the top reference pixel of the current block is used. A first weighted value wL[x] of a current pixel predPixel[x][y] is determined to be 0, a second weighted value wT[y] is determined to be (32>>((y<<1)>>nScale)), and a third weighted value wTL[x][y] may be determined to be 0.

When the intra prediction mode of the current block is greater than or equal to mode 58, the reference pixels refL and refT of the current pixel may belong to a first pixel line adjacent to the current block and may be located at the same diagonal line as the current pixel. Here, the diagonal line has the same angle as the intra prediction mode of the current block. In this instance, the reference pixel may be restricted such that only one of the left reference pixel or the top reference pixel of the current block is used. A first weighted value wL[x] of a current pixel predPixel[x][y] is determined to be (32>>((x<<1)>>nScale)), a second weighted value wT[y] is determined to be 0, and a third weighted value wTL[x][y] may be determined to be 0.

Based on the determined reference pixels refL[x][y] and refL[x][y] and the weighted values wL[x], wT[y] and wTL[x][y], correction of the current pixel predPixels[x][y] may be performed as in Formula 1 below.

$$predPixels[x][y] = \text{clip1Cmp}((refL[x][y]*wL[x] + refT[x][y]*wT[y] - p[-1][-1]*wTL[x][y] + (64 - wL[x] - wT[y] + wTL[x][y])*predPixels[x][y] + 32) >> 6) \quad \text{[Formula 1]}$$

However, the above correction process may be performed only when the current block does not perform intra prediction in units of sub-blocks. The correction process may be performed only when the reference pixel of the current block is the first pixel line. The correction process may be performed only when the intra prediction mode of the current block corresponds to a specific mode. Here, the specific mode may include at least one of a non-directional mode, a vertical mode, a horizontal mode, a mode less than a predetermined first threshold mode, or a mode greater than a predetermined second threshold mode. The first threshold mode may be 8, 9, 10, 11 or 12, and the second threshold mode may be 56, 57, 58, 59 or 60.

The prediction mode determination section performs a process for selecting the optimal mode in multiple prediction mode candidate groups. In general, a block distortion (for example, distortion of the current block and the reconstructed block; Sum of Absolute Difference (SAD), Sum of Square Difference (SSD), etc.) and a rate-distortion technology for generating a bit amount of the corresponding mode may be considered to determine a mode with the optimal coding cost. The prediction block generated based on the prediction mode determined by the above process may be sent to a subtraction section and an addition section.

The prediction mode coding section may code the prediction mode selected by the prediction mode determination section. In the prediction mode candidate group, index information corresponding to the prediction mode may be encoded, or the prediction mode may be predicted to code information related thereto. That is, the former case indicates a method of directly coding a prediction mode without performing prediction, and the latter case indicates a method of predicting a prediction mode so as to code mode prediction information and information obtained based on prediction information. In addition, the former is an example that may be applied to a color difference component, and the latter is an example that may be applied to a luminance component. It is not limited thereto, and other cases are also possible.

In the case of performing coding by predicting the prediction mode, the prediction value (or prediction information) of the prediction mode may be referred to as a Most Probable Mode (MPM). In this instance, a preset prediction mode (for example, a DC mode, a planar mode, a vertical mode, a horizontal mode, a diagonal mode, etc.) or a prediction mode of a spatially adjacent block (for example, a left block, a top block, a top left block, a top right block, a bottom left block, etc.) is configured as an MPM. In this example, the diagonal mode may represent diagonal up right, diagonal down right, and diagonal down left, which may correspond to mode 9, mode 2, and mode 66 in FIG. 9.

In addition, a mode derived from modes included in an MPM candidate group may be configured as the MPM candidate group. For example, in the case of a directional mode included in the MPM candidate group, a mode with a mode interval difference a (for example, a is a non-zero integer such as 1, −1, 2, or −2; in the case where mode 10 has been included in FIG. 9, the derived modes are mode 9, mode 11, mode 8, mode 12, etc.) is re-included (or additionally included) in the MPM candidate group.

The above example may correspond to a case where the MPM candidate group is configured in multiple modes, the MPM candidate group (or the number of MPM candidate groups) may be determined according to the encoding/decoding settings (for example, a prediction mode candidate group, an image type, a block size, a block shape, etc.), and at least one mode may be included.

The prediction mode for configuring the MPM candidate group may have priority. The order of prediction modes included in the MPM candidate group may be determined according to the priority, and the configuration of the MPM candidate group may be completed when the number of MPM candidate groups is filled out according to the priority. In this instance, the priority may be, in turn, a prediction mode of a spatially adjacent block, a preset prediction mode, and a mode derived from the prediction mode first included in the MPM candidate group, but other modifications are possible.

When the prediction mode coding of the current block is performed using the MPM, information about whether the prediction mode matches the MPM (for example, most_probable_mode_flag) may be generated.

If the prediction mode matches the MPM (for example, most_probable_mode_flag=1), MPM index information (for example, mpm_idx) may be additionally generated according to the configuration of the MPM. For example, if the MPM is configured as one prediction mode, no additional MPM index information is generated, and if the MPM is configured as multiple prediction modes, index information corresponding to the prediction mode of the current block may be generated at the MPM candidate group.

If the prediction mode does not match the MPM (for example, most_probable_mode_flag=0), non-MPM index information (for example, non_mpm_idx) corresponding to the prediction mode of the current mode may be generated in a remaining prediction mode candidate group (or non-MPM candidate group) other than the MPM candidate group in the prediction mode candidate groups, which may be an example of a case where non-MPM is configured as one group.

When the non-MPM candidate group is composed of multiple groups, information about which group the prediction mode of the current block belongs may be generated. For example, non-MPM is configured by groups A and B (assuming that A is configured by m prediction modes, B is configured by n prediction modes, non-MPM is configured by m+n prediction modes, and n is greater than m; assuming that the mode of A is a directional mode and has equal intervals, and the mode of B is a directional mode and does not have equal intervals), if the prediction mode of the current block matches the prediction mode of group A (for example, non_mpm_A_flag=1), index information corresponding to the prediction mode of the current block may be generated in candidate group A, and if no match (for example, non_mpm_A_flag=0), index information corresponding to the prediction mode of the current block may be generated in the remaining prediction mode candidate groups (or candidate group B). As the above example, the non-MPM may be configured as at least one prediction mode candidate group (or set), and non-MPM configuration may be determined according to the prediction mode candidate group. For example, when there are at most 35 prediction mode candidate groups, there may be one non-MPM, and there are two or more non-MPMs in other cases.

As the above example, the purpose of supporting the non-MPM is that the number of prediction modes is large when the non-MPM is composed of multiple groups and the mode bit amount is reduced when the prediction mode is not predicted by the MPM.

When prediction mode coding (or prediction mode decoding) of the current block is performed using the MPM, a binarization table applied to each prediction mode candidate group (for example, an MPM candidate group, a non-MPM candidate group, etc.) may be separately generated, and a binarization method applied to each candidate group may also be separately applied.

The prediction-related information generated by the prediction mode coding section may be transmitted to the encoding section and included in a bit stream.

Figure 14:
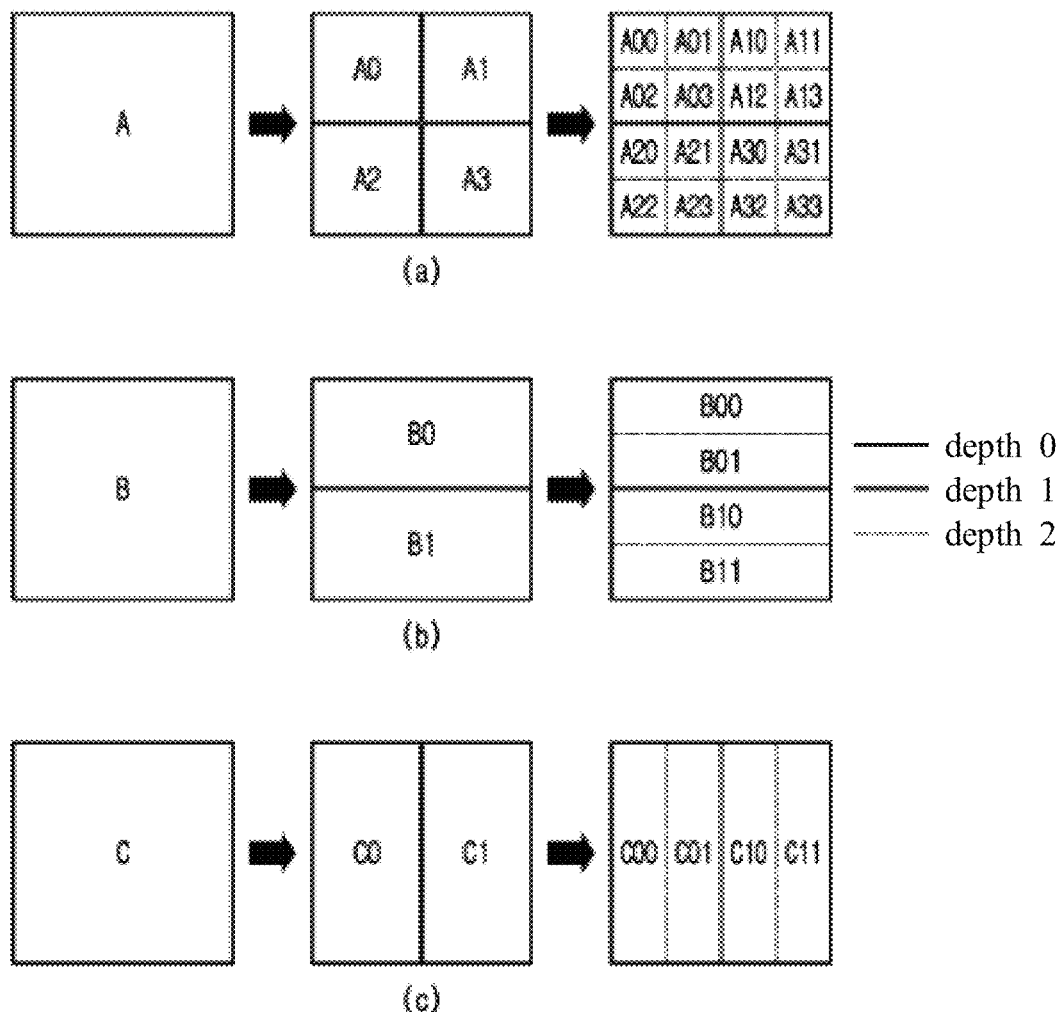

FIG. 14 is an example of a tree-based partition block according to an embodiment of the disclosure.

In FIG. 14, i represents quad tree partitioning, ii represents horizontal partition in binary tree partitioning, and iii represents vertical partition in binary tree partitioning. In the figure, A to C represent initial blocks (blocks before partition, for example, assuming that it is a coding tree unit), and numbers after the text represent the number of each partition when partition is performed. In the case of a quad tree, the top left block, the top right block, the bottom left block and the bottom right block are respectively allocated with numbers 0 to 3, and in the case of a binary tree, the left/top block and the right/bottom block are respectively allocated with numbers 0 and 1.

Referring to FIG. 14, the partition state or information performed to acquire the corresponding block may be determined through the text and the numbers obtained in the partition process.

For example, in i of FIG. 14, block A00 is top left block (adding 0 to A0) in four blocks obtained by performing quad tree partitioning on top left block A0 (adding 0 to A) of four blocks obtained after performing quad tree partitioning on the initial block A.

Alternatively, in ii of FIG. 14, block B10 is top block (adding 0 to B1) in two blocks obtained by performing horizontal partition in binary tree partition on bottom block B1 (adding 1 to B) of two blocks obtained after performing horizontal partition in binary tree partition on the initial block B.

Through the above partition, the partition state and information (for example, supported partition settings <type of tree mode, etc.>) of each block, a block support range such as a minimum size and a maximum size <a support range according to a partition method in detail>, an allowable partitioning depth <a support range according to a partition method in detail>, a partition flag <a partition flag according to a partition method in detail>, an image type <I/P/B>, the partition state of a coding mode <Intra/Inter> block, encoding/decoding settings required to confirm information, information, etc. can be obtained, and it is possible to confirm which block (parent block) the current block belongs to before the partition step for obtaining the current block (child block). For example, in i of FIG. 14, for block A31, adjacent blocks may include A30, A12, and A13, and it may be confirmed that A30 belongs to the same block A3 as A31 in the partition step of the previous step. In the case of A12 and A13, in the previous step, that is, the partition step of A3, A12 and A13 belong to another block A1, and it can be confirmed that A12 and A13 belong to the same block A only in the previous step.

Since the above example is for a case of one partition operation (quad partitioning of a quad tree or horizontal/vertical partitioning of a binary tree), the case of performing multi-tree-based partitioning will be explained in the following examples.

Figure 15:
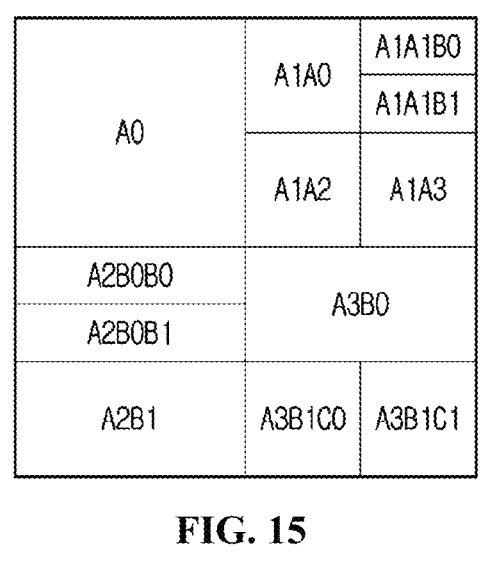

FIG. 15 is an example of a multi-tree-based partition block according to an embodiment of the disclosure.

Referring to FIG. 15, the partition state or information performed to acquire the corresponding block may be confirmed through the text and the numbers obtained in the partition process. In this example, each word does not mean an initial block, but information about the partition is indicated by a number.

For example, in the case of block A1A1B0, top right block A1 is obtained when the quad tree partitioning is performed on the initial block, a top right block (adding A1 to A1) is obtained when the quad tree partitioning is performed on block A1, and a top block (adding B0 to A1A1) is represented when the horizontal partition in the binary tree partitioning is performed on block A1A1.

Optionally, in the case of block A3B1C1, bottom right block A3 is obtained when the quad tree partitioning is performed on the initial block, a bottom block (adding B1 to A3) is obtained when the horizontal partition in the binary tree partitioning is performed on block A3, and a right block (adding C1 to A3B1) is represented when the vertical partition in the binary tree partition process is performed on A3B1.

In this example, by the partition information, according to the partition step of each block, it is possible to determine relationship information between the current block and the adjacent block, for example, in which partition step the current block and the adjacent block are identical.

FIGS. 14 and 15 are some examples for determining partition information of each block, and the partition information of each block may be confirmed using various information for determining the partition information and a combination of information (for example, partition flag, depth information, depth information maximum value, block range, etc.), so that the relationship between blocks may be determined.

Figure 16:
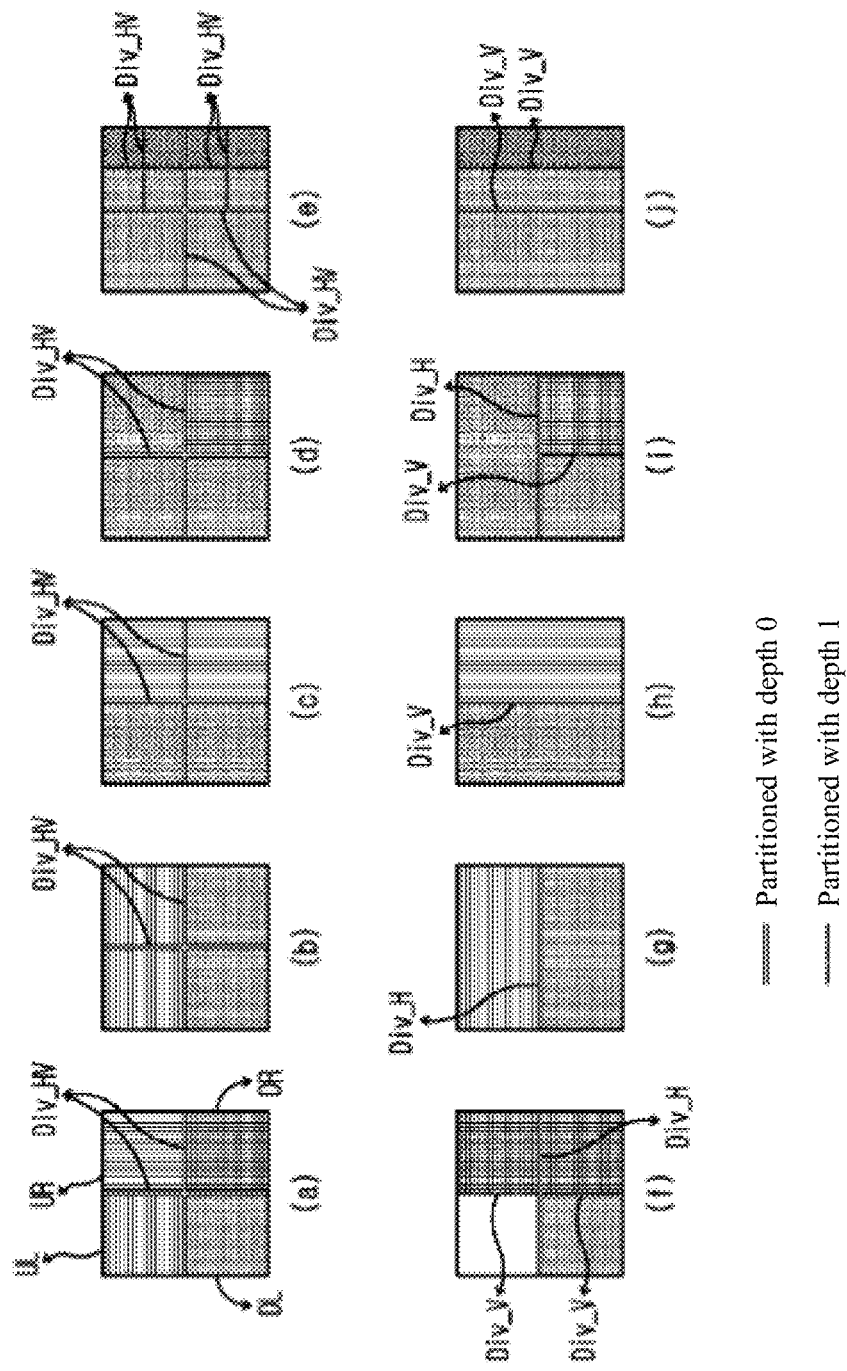
FIG. 16 is a schematic diagram illustrating various situations of block partition.

FIG. 16 is a schematic diagram illustrating various situations of block partition.

In general, since there is various texture information in an image, it is difficult to perform encoding/decoding using an encoding/decoding method. For example, some regions may have regions where stronger edge components exist in a particular direction, and some regions may have complex regions where no edge components exist. In order to effectively perform coding thereon, block partition plays an important role.

The purpose of performing block partition is to effectively partition regions according to the features of an image. However, when only one partition mode (for example, quad tree partitioning) is used, it may be difficult to appropriately reflect the characteristics of an image to perform partitioning.

Referring to FIG. 16, it may be confirmed that images including various textures are partitioned according to quad tree partitioning and binary tree partitioning. a to e may be a case where only quad tree partitioning is supported, and f to j may be a case where only binary tree partitioning is supported.

In this example, partitions according to the quad tree partitioning are referred to as UL, UR, DL, and DR, and the binary tree partitioning is also described based on this.

a of FIG. 16 may be a texture form in which the quad tree partitioning achieves the optimal performance, it may be partitioned into four by one partition (Div_HV) of the quad tree, and encoding/decoding is performed in units of each block. Meanwhile, when the binary tree partitioning is applied, as illustrated in f of FIG. 16, three partitions (Div_V twice, Div_H once) may be required compared to the quad tree.

b of FIG. 16 is that the texture is partitioned into top and bottom regions of a block, in b of FIG. 16, when quad tree partitioning is applied, one partition (Div_HV) is required, and in g of FIG. 16, one partition Div_H may also be performed with binary tree partitioning. Assuming that the quad tree partition flag requires 1 bit and the binary tree partition flag requires more than 2 bits, the quad tree may be considered to be efficient in terms of flag bits, but coding/decoding information (for example, information for expressing texture information (information for expressing texture (residual signal, coding coefficient, information indicating the presence or absence of coding coefficient)), prediction information <for example, intra prediction related information and inter prediction related information>, transform information <for example, transform category information, transform partition information, etc.) is generated in units of each block. In this case, the efficiency of quad tree partitioning is not high compared to the binary tree partitioning since texture information is an example of partitioning similar regions and re-generating corresponding information.

In other cases of FIG. 16, it is also possible to determine which tree is more efficient according to the category of texture. From the above examples, it may be confirmed that it is extremely important to support the size of a variable block and various partition modes, so that an effective region according to image characteristics may be divided by the above examples.

The detailed analysis of quad tree partitioning and binary tree partitioning is performed as follows.

Referring to b in FIG. 16, blocks (left block and top block in this example) adjacent to the bottom right block (current block) are illustrated. It can be seen that the left block is a block having similar characteristics to the current block, and the top block is a block having different characteristics from the current block. Although a block has similar properties to some blocks (the left block in this example), it may be the case that the block has been segmented from the perspective of the properties of quad tree partitioning.

In this instance, since the current block has similar characteristics to the left block, similar coding/decoding information may be generated. When an intra prediction mode (for example, an MPM, i.e., information that predicts the mode of the current block from adjacent blocks with the purpose of reducing the bit amount of the prediction mode of the current block), a motion information prediction mode (for example, skip mode, merge mode, information for reducing mode bits (for example, contention mode)) for effectively reducing such a situation occurs, the information of the left block is available for the reference. That is, when encoding information (for example, intra prediction information, inter prediction information, filter information, coefficient information, etc.) of the current block is referred from one of a left block or a top block, more accurate information (in this example, the left block) may be referred.

Referring to e in FIG. 16, a small block in the bottom right corner (a block that partitions the current block twice) is assumed. Similarly, the current block also has similar characteristics in a top block of the left block or the top block, so that the coding performance can be improved by referring to the coding information from the corresponding block (top block in this example).

Conversely, referring to j in FIG. 16, reference is made to the left block adjacent to the rightmost block (the block that partitions the current block twice). In this example, since there is no top block, when referring only to the left block, it can be confirmed that the current block is a block having a different characteristic from the left block. It can be confirmed that quad tree partitioning may be similar to a part of adjacent blocks, while binary tree partitioning has a high probability of having different characteristics from adjacent blocks.

In detail, when some blocks (x) and adjacent blocks (y) are the same blocks before being respectively partitioned, for the quad tree partitioning, some blocks (x) and the adjacent blocks (y) which are the same as the blocks before partition may have similar characteristics or different characteristics, and conversely, for the binary tree, in most cases, some blocks (x) and the adjacent blocks (y) which are the same as the blocks before partition may have different features. In other words, if it is the case of similar characteristics, it is not necessary to perform block partition, but blocks are finally determined before the partition, but in most cases, the blocks are partitioned due to different characteristics.

In addition to the above example, in i of FIG. 16, a bottom right block x and a bottom left block y may have the following relationships. That is, since the image characteristics of top blocks are similar, the division is determined without performing the partition, and since the image characteristics of bottom blocks are different, the division is determined after partitioning to a bottom left block and a bottom right block.

In a word, in the case of quad tree partitioning, if there is an adjacent block having a parent block identical to the current block in adjacent blocks adjacent to the current block, it may have similar or different characteristics to the current block since the quad tree characteristic is to partition unconditionally a block into ½ in the horizontal and vertical directions. In the case of binary tree partitioning, if there is an adjacent block having a parent block identical to the current block in adjacent blocks adjacent to the current block, horizontal or vertical partition may be performed on the adjacent block according to the image characteristics, so that having been partitioned may mean being partitioned due to different characteristics.

(Quad Tree Partitioning)

An adjacent block (assumed in this example as a left block or a top block, but not limited thereto) that is the same as a pre-partition block compared to the current block may have similar or different characteristics to/from the current block.

In addition, adjacent blocks different from the current block and the pre-partition block may have similar or different characteristics to/from the current block.

(Binary Tree Partitioning)

An adjacent block (assumed in this example as a left block or a top block, the maximum number of candidates is one due to a binary tree) that is the same as a pre-partition block compared to the current block may have different characteristics.

In addition, adjacent blocks different from a pre-partition block compared to the current block may have similar or different characteristics to/from the current block.

The descriptions will be made below on the premise that the above assumption is the main assumption of the disclosure. According to the above content, it is possible to distinguish case (1) where the characteristics of the adjacent blocks are similar to or different from the current block and case (2) where the characteristics of the adjacent blocks are different from the characteristics of the current block.

Reference is again made to FIG. 15.

As an example (the current block is A1A2), since pre-partition block A1 of block A1A2 is different from a pre-partition block (initial block) of block A0, block A0 (left block) in the adjacent blocks may be classified (i.e., in a case where it is not known whether the characteristic is similar to or different from the current block) as a general case.

For an adjacent block A1A0 (top block), since pre-partition block A1 of block A1A2 is the same as a pre-partition block of block A1A0, the partition mode may be confirmed. In this instance, since the partition mode is quad tree partitioning (A), it is classified as a general case.

As an example (the current block is A2B0B1), pre-partition block A2B0 of block A2B0B1 is the same as pre-partition block A2B0B1 of block A2B0B1 for block A2B0B0B0 (top block) in the adjacent blocks, thus confirming the partition mode. In this instance, since the partition mode is binary tree partition (B), it is classified as an exception case.

As an example (the current block is A3B1C0), in adjacent blocks, since pre-partition block A3B1 of block A3B1C0 is different from pre-partition block A3 of block A3B0, block A3B0 (top right block in this example) may be classified as a general case.

As described in the above example, adjacent blocks may be classified into a general case and an exception case. For the general case, it is not known whether the coding information of the corresponding adjacent block can be used as the coding information of the current block, and for the exception, it is determined that the coding information of the corresponding adjacent block cannot be used as the coding information of the current block.

Based on the above classification, a method of obtaining prediction information of a current block from adjacent blocks may be used.

In a word, it is confirmed whether the blocks before the partition of the current block and the adjacent blocks are the same (A).

If A has the same result, a partition mode of the current block (if so, not only the current block, but also the adjacent blocks are blocks determined using the same partition mode, thus confirming only the current block) is confirmed (B).

If the result of A is different, the process quits (ends).

If the result of B is quad tree partitioning, the adjacent blocks are marked as normal and the process quits (ends).

If the result of B is binary tree partitioning, the adjacent blocks are marked as exceptional and the process quits (ends).

The above example may be applied to the setting of the intra prediction mode prediction candidate group (related to the MPM) of the disclosure. General prediction candidate group settings (for example, candidate group configuration priorities, etc.) and exception prediction candidate group settings may be supported, and priorities may be pushed back or excluded from candidate groups derived from the block based on the states of the above adjacent blocks.

In this instance, the adjacent blocks applying the settings may be limited to a spatial case (same space), or may be applicable to a case of deriving from other color spaces of the same image, such as a color copy mode. That is, the above settings may be performed in consideration of the partition state or the like of a block derived by the color copy mode.

In addition to the above example, the following example is an example of adaptively determining coding/decoding settings (for example, a prediction candidate group setting, a reference pixel setting, etc.) according to a relationship between blocks (in the above example, a relative relationship between the current block and other blocks is identified using partition block information, etc.).

This example (luminance component) is described under the assumption that a total of 3 candidates are selected from adjacent blocks (left and top in this example) and configured as an MPM candidate group when there are 35 predefined intra prediction modes in the encoding/decoding apparatus.

A total of two candidates may be configured by adding one candidate to left block L0 and top block T0, respectively. If the candidate group cannot be configured in each block, it may be replaced and filled with a DC mode, a planar mode, a vertical mode, a horizontal mode, a diagonal mode, etc. If two candidates are filled by the above process, the remaining candidate may be considered to be filled with the number in various cases.

For example, if the candidates filled in each block are the same, adjacent modes of the above mode are replaced in a manner that does not overlap the modes included in the candidate group (for example, k_mode−2, k_mode−2, k_mode+1, k_mode+2, etc., when the same mode is k_mode). Alternatively, when the candidates filled in each block are the same or different, the candidate group may be configured by adding a planar mode, a DC mode, a vertical mode, a horizontal mode, and a diagonal mode.

Through the above process, an intra prediction mode candidate group (general case) may be configured. The candidate group thus established belongs to the general case, and the adaptive intra prediction mode candidate group may be configured according to adjacent blocks (exceptional case).

For example, if an adjacent block is marked with an exception state, a candidate group derived from the block may be excluded. If a left block is marked as an exception state, the candidate group may be configured with a top block and a preset prediction mode (for example, a mode derived from a DC block, a planar block, a vertical block, a horizontal block, a diagonal block, and a top block, etc.).

The above example may be applied identically/similarly even when the MPM candidate group is configured by more than three MPM candidates.

The description will be performed based on the following assumptions: this example (color difference component) has five intra prediction modes (a DC mode, a planar mode, a vertical mode, a horizontal mode, and a color mode in this example), and coding/decoding is performed by configuring prediction modes that are adaptively prioritized as candidate groups (i.e., coding/decoding is performed directly without using an MPM).

First, the color mode is endowed with the highest priority (index 0 in this example; 'for 0', 1 bit is allocated), while other modes (planar, vertical, horizontal, and DC in this example) are endowed with a low priority (indexes 1 to 4 respectively in this example, 3 bits are allocated with '100', '101', '110', '111').

If the color mode matches one of the other prediction modes (DC, planar, vertical, and horizontal) of the candidate group, a preset prediction mode (for example, a diagonal mode, etc.) may be allocated to a priority endowed to the matching prediction mode (indexes 1 to 4 in this example), and if there is no match, the candidate group configuration ends.

Through the above process, a candidate group for an intra prediction mode may be configured. The example made in such a way corresponds to the general case, and the adaptive candidate group may be configured according to the blocks of the acquired color mode.

In this example, if a block corresponding to the current block in other color spaces of the acquired color mode is configured as one block (i.e., a state of non-partitioning), it may be referred to as a general case, and if it is configured as multiple blocks (i.e., a state of partitioning more than two blocks), it may be referred to as an exception case. As described above, there may be an example under the following assumptions: this example differs from an example in which classification is performed according to whether a current block is the same as a parent block of an adjacent block, a partition mode or the like, and when multiple corresponding blocks of different color spaces are configured, there is a higher possibility of characteristics different from the current block. That is, it can be understood to be an example of adaptively determining encoding/decoding settings according to a relationship between blocks.

If a corresponding block is marked as an exception state according to the above assumption example, the prediction mode derived from the block may have a low priority. In this case, one of the other prediction modes (planar, DC, vertical, and horizontal) may be allocated to a high priority, and a lower priority may be allocated to other prediction modes and color modes not included in the priority.

For ease of description, the above examples are described under some assumptions, but are not limited thereto, and the same or similar applications may be used for the various embodiments of the disclosure described above.

In summary, candidate group A may be used when there are blocks marked as exception states in adjacent blocks, and candidate group B may be used when there are blocks marked as exception states. It can be understood that the above classification is divided into two cases, but intra prediction candidate group configuration in block units may be adaptively implemented according to exception states and block positions.

In addition, the above example describe tree-based partitioning in the partition mode, but is not limited thereto. In detail, in the above example, it is possible to set a block obtained using at least one tree-based partitioning mode as a coding block, and directly perform prediction, transform, etc. without partitioning the block into prediction blocks, transform blocks, etc.

As another example of partition settings, a coding block is obtained using tree-based partitioning and at least one prediction block is obtained based on the obtained coding block.

For example, it is assumed that a coding block (2N×2N) may be obtained using tree-based partitioning (a quad tree in this example), and a prediction block is obtained using type-based partitioning (candidate types supportable in this example are 2N×2N, 2N×N, N×2N, and N×N). In this instance, when a coding block (assumed to be a parent block in this example) is partitioned into multiple prediction blocks (assumed to be sub-blocks in this example), the setting of the above exception state or the like may also be applied between the prediction blocks.

As illustrated in g of FIG. 16, if there are two prediction blocks (separated by a thin solid line) in the coding block (thick solid line), the bottom block has a different characteristic from the top block, and does not refer to the coding information of the top block or has a low priority.

Figure 17:
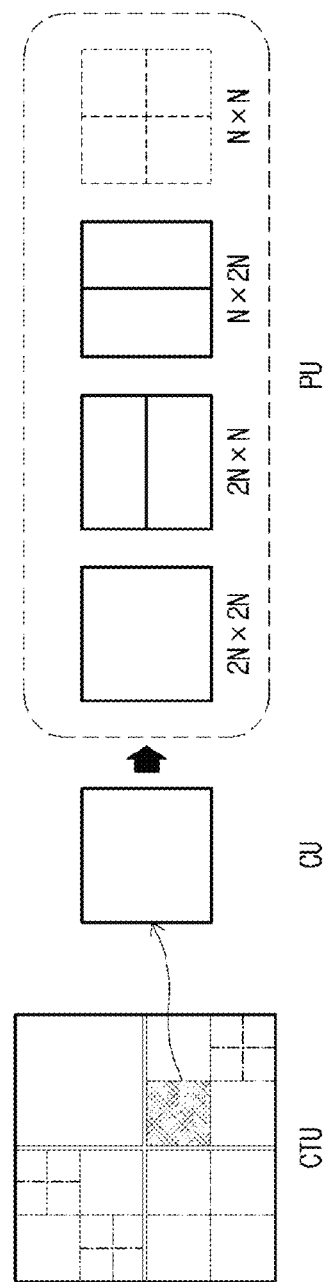
FIG. 17 illustrates an example of block partition according to an embodiment of the disclosure.

FIG. 17 illustrates an example of block partition according to an embodiment of the disclosure. In detail, an example in which the basic coding block (maximum coding block, 8N×8N) obtains a coding block (diagonal block, 2N×2N) using quad tree-based partitioning is illustrated, and the obtained coding block is partitioned into at least one prediction block (2N×2N, 2N×N, N×2N, and N×N) by type-based partitioning.

Setting of an intra prediction mode candidate group for the case of obtaining rectangular blocks (2N×N and N×2N) will be described below.

Figure 18:
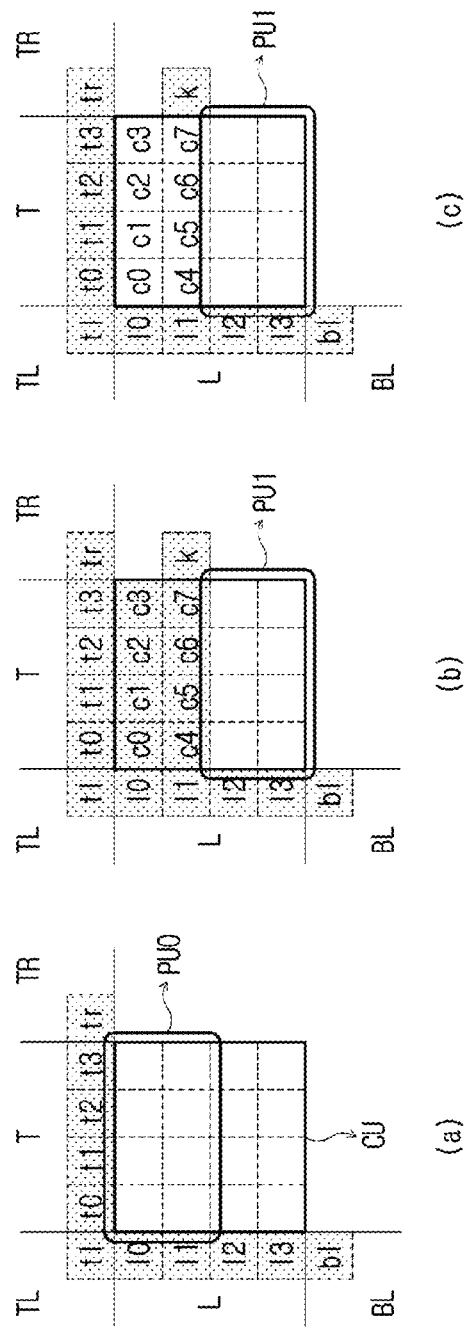
FIG. 18 illustrates various examples of intra prediction mode candidate groups for setting blocks that generate prediction information (prediction blocks are 2N×N in this example).

FIG. 18 illustrates various examples of intra prediction mode candidate groups regarding setting blocks that generate prediction information (prediction blocks are 2N×N in this example).

This example assumes that when there are 67 intra prediction modes (luminance component), a total of 6 candidates are selected from adjacent blocks (left, top, top left, top right, and bottom left in this example) and configured in the MPM candidate group.

Referring to FIG. 13, four candidates may be configured in the order of L3-T3-B0-R0-TL, and two candidates can be configured in a preset mode (for example, planar and DC). If the maximum number (6 in this example) is not filled in the above configuration, a prediction mode (for example, k_mode−2, k_mode−2, k_mode+1, k_mode+2, etc., when k_mode is available) derived from prediction modes included in the candidate group, a preset mode (for example, vertical, horizontal, or diagonal, etc.), etc. may be included.

In this example, in the case of spatially adjacent blocks, the candidate group priority is the order of left block-top block-bottom left block-top right block-top left block of the current block (in detail, sub-blocks on the bottom side of the left block and the right side of the top block), and for the preset mode, the order is assumed to be planar-DC-vertical-horizontal-diagonal mode in turn.

Referring to a of FIG. 18, as in the candidate group setting of the above example, the current block (2N×N, PU0) may configure the candidate group in the order of l1-t3-l2-tr-t1 (because other contents are repeated, they are omitted). In this example, an adjacent block of the current block may be a block that has been encoded/decoded (a coding block, i.e., a prediction block in other coding blocks).

Unlike the above, at least one intra prediction mode candidate group may be set when the position of the current block corresponds to PU1. In general, a block adjacent to the current block is more likely similar to the characteristics of the current block, and therefore it is most advantageous to configure the candidate group from the corresponding block (1). On the other hand, the candidate group may need to be configured for parallel processing of encoding/decoding (2).

If the current block is PU1, in the candidate group configuration setting as in (1), for example, b of FIG. 18, candidate groups may be configured in the order of l3-c7-bl-k-l1 (k may be derived from c7 or tr, etc.), and in the candidate group configuration setting as in (2), for example, c of FIG. 18, candidate groups may be configured in the order of l3-bl-k-l1 (k may be derived from tr, etc.). The difference between the two examples is whether a candidate group of intra prediction modes for the top block is included. That is, in the former case, the intra prediction mode of the top block is included in the candidate group in order to improve the efficiency of coding/decoding of the intra prediction mode, and in the latter case, the intra prediction mode of the top block, which cannot be referred, is excluded from the candidate group for parallel processing or the like since it has not yet been determined whether encoding/decoding is completed.

Figure 19:
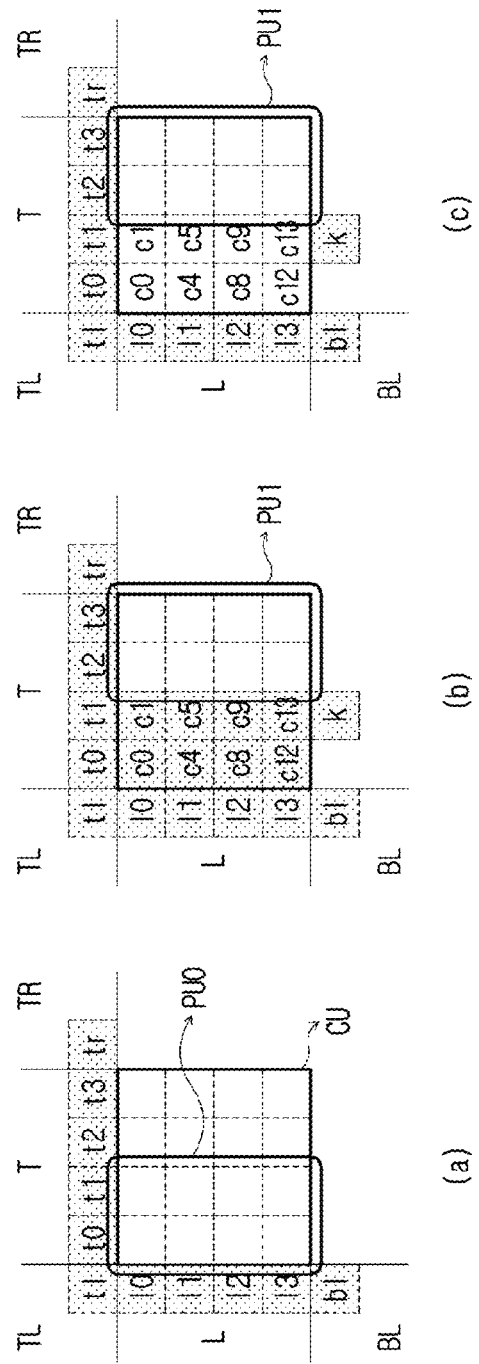
FIG. 19 illustrates various examples of intra prediction mode candidate groups for setting blocks that generate prediction information (prediction blocks are N×2N in this example).

FIG. 19 illustrates various examples of intra prediction mode candidate group settings regarding setting blocks that generate prediction information (prediction blocks are N×2N in this example).

This example assumes that when there are 67 intra prediction modes (luminance component), a total of 6 candidates are selected from adjacent blocks (left, top, top left, top right, and bottom left in this example) and configured in the MPM candidate group.

Referring to FIG. 13, one candidate may be configured in the order of L3-L2-L1-L0 (top block), one candidate may be formed in the order of T3-T2-T1-T0 (top block), two candidates may be configured in the order of B0-R0-TL (top left block, top right block, and bottom left block), and two candidates may be configured in a preset mode (for example, planar and DC). If the maximum number is not filled in the above configuration, a prediction mode derived from prediction modes included in the candidate group, a preset mode, etc. may be included. In this instance, a priority of the candidate group configuration may be the order of left block-top block-planar block-DC block-bottom left block-top right block-top left block.

Referring to a of FIG. 19, the current block (N×2N, PU0) may configure one candidate in the order of l3-l2-l1-l0, one candidate in the order of t1-t0, and two candidates in the order of bl-t2-tl in the same way as the candidate group settings in the above examples. In this example, an adjacent block of the current block may be a block that has been encoded/decoded (a coding block; i.e., a prediction block in other coding blocks).

Unlike the above, at least one intra prediction mode candidate group may be set when the position of the current block corresponds to PU1. In the above examples, (1) and (2) may be configured.

If the current block is PU1, it is also possible to configure one candidate in the order of c13-c9-c5-c1, one candidate in the order of t3-t2, and two candidates in the order of k-tr-t1 (k may be derived from bl or c13 etc.) in the candidate group configuration setting as in (1), for example, b of FIG. 19, and it is also possible to configure one candidate in the order of t3-t2 and two candidate groups in the order of k-tr-t1 (k may be derived from bl etc.) in the candidate group configuration setting as in (2), for example, c of FIG. 19. The difference between the two examples is whether a candidate group of intra prediction modes for the top block is included. That is, in the former case, the intra prediction mode of the left block is included in the candidate group in order to improve the efficiency of coding/decoding of the intra prediction mode, and in the latter case, the intra prediction mode of the left block, which cannot be referred, is excluded from the candidate group for parallel processing or the like since it has not yet been determined whether encoding/decoding is completed.

In this way, the candidate group configuration may be determined according to settings of the candidate group configuration. In this example, the settings of the candidate group configuration (in this example, settings of candidate group configuration for parallel processing) may be determined implicitly, or related information may be explicitly included in units of video, sequence, picture, slice, tile, etc.

A summary of the above content is as follows. It is assumed that the related information is determined implicitly or generated explicitly.

Setting of the intra prediction mode candidate group configuration is confirmed in an initial stage of coding/decoding (A).

If a confirmation result for A is that reference can be made to the setting of a previous prediction block in the same coding block, the intra prediction mode of the block is included in the candidate group (end).

If a confirmation result for A is that reference is prohibited to the setting of a previous prediction block in the same coding block, the intra prediction mode of the block is excluded from the candidate group (end).

For ease of description, the above examples are described under some assumptions, but are not limited thereto, and the same or similar applications may be applied to the various embodiments of the disclosure described above.

Figure 20:
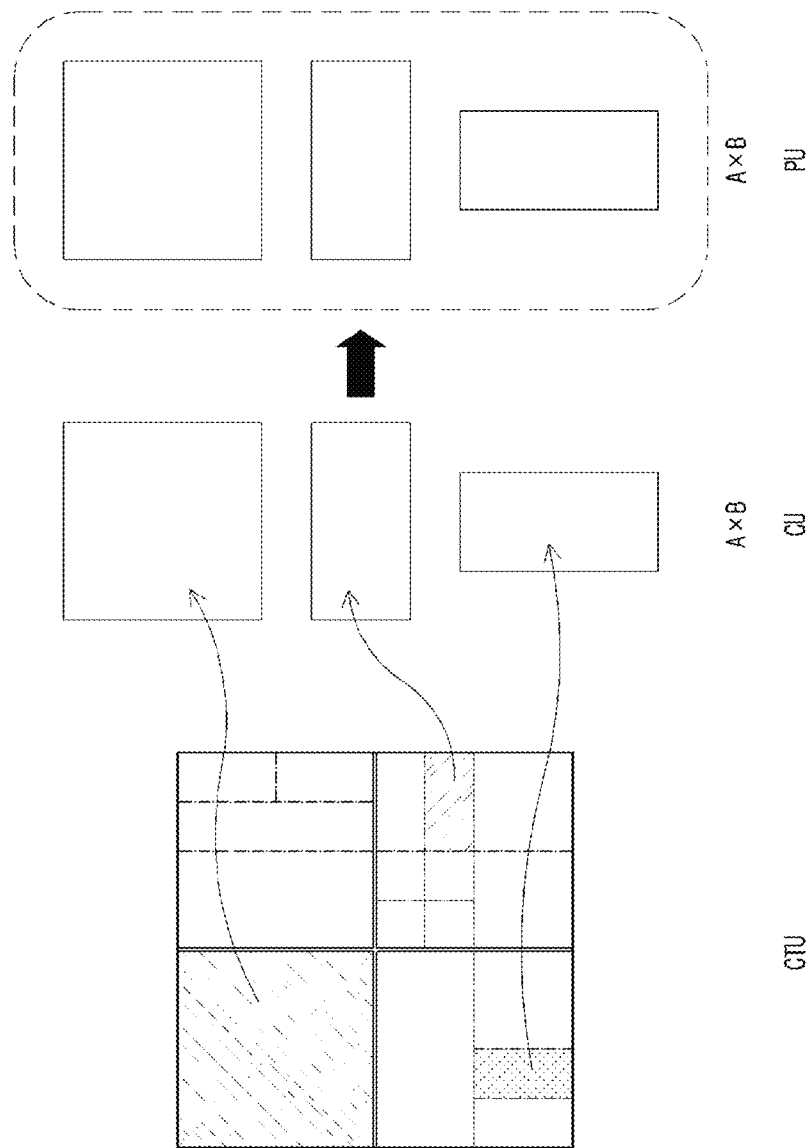
FIG. 20 illustrates an example of block partition according to an embodiment of the disclosure.

FIG. 20 illustrates an example of block partition according to an embodiment of the disclosure. In detail, a basic coding block (maximum coding block) represents an example of obtaining a coding block (diagonal block A×B) by binary tree-based partitioning (or multiple tree-based partitionings), and the obtained coding block is set as a prediction block.

In this instance, setting of the motion information prediction candidate group for the case of obtaining a rectangular block (A×B, A≠B) will be described below.

Figure 21:
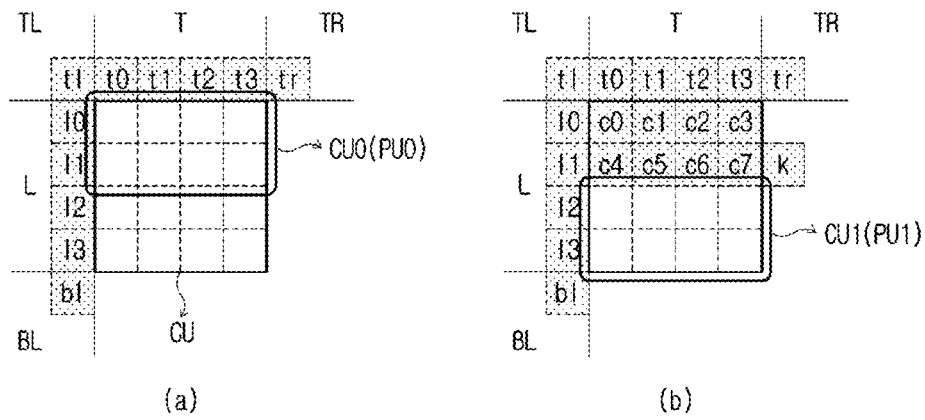
FIGS. 21 and 22 illustrate various examples of intra prediction mode candidate groups for setting blocks that generate prediction information.

FIG. 21 illustrates various examples of intra prediction mode candidate groups for setting blocks that generate prediction information (coding block, 2N×N in this example).

The description is performed under the following assumptions. When this example (luminance component) has 67 intra prediction modes, a total of 6 candidates are selected from adjacent blocks (left, top, top left, top right, and bottom left in this example) and configured in an MPM candidate group. When multiple non-MPM candidate groups are configured (in this example, A and B, a mode in which the probability of predicting the prediction mode of the current block in the non-MPM candidates is higher belongs to A), a total of 16 candidates are configured in group A, and a total of 45 candidates are configured in group B.

In this instance, group A includes candidates classified according to certain rules (for example, composed of equidistant modes in the directional mode) not included in the modes of the MPM candidate groups, or may include candidates not included in a final MPM candidate group according to the MPM candidate group priority, etc. Group B may be composed of candidates not included in group A in the MPM candidate group and the non-MPM candidate group.

Referring to a of FIG. 21, a current block (CU0 or PU0, where the size is assumed to be 2N×N and a horizontal/vertical ratio is 2:1) may configure six candidates as a candidate group in the order of l1-t3-planar-DC-l2-tr-t1-l1*-t3*-l2*-tr*-tl*-vertical-horizontal-diagonal mode. In the above example, * represents a mode derived from the prediction mode of each block (for example, an addition mode of +1, −1, etc.).

On the other hand, referring to b of FIG. 21, a current block (CU1 or PU1, where the size is 2N×N) may configure six candidates as a candidate group in the order of l3-c7-planar-DC-bl-k-l1-l3*-c7*-bl*-k*-l1*-vertical-horizontal-diagonal mode.

In this example, in the case where the setting of (2) in FIG. 18 is applied, as illustrated in b of FIG. 21, the candidate group is excluded from the prediction mode candidate group of the top block according to the order of l3-planar-DC-bl-k-l1-c7-l3*-bl*-k*-l1*-vertical-horizontal-diagonal-c7*, or the priority is lowered, and therefore, it may be included in group A.

However, the difference from the case of FIG. 18 is that: even if a block is rectangular, the block is partitioned into coding units and immediately set as a prediction unit without additional partition. Therefore, as illustrated in FIG. 18, the candidate group configuration setting may not be applicable to this example (for example, the setting of (2)).

However, in the case of k in FIG. 21, since it is a position where encoding/decoding is not completed, it may be derived from an adjacent block where encoding/decoding is completed.

Figure 22:
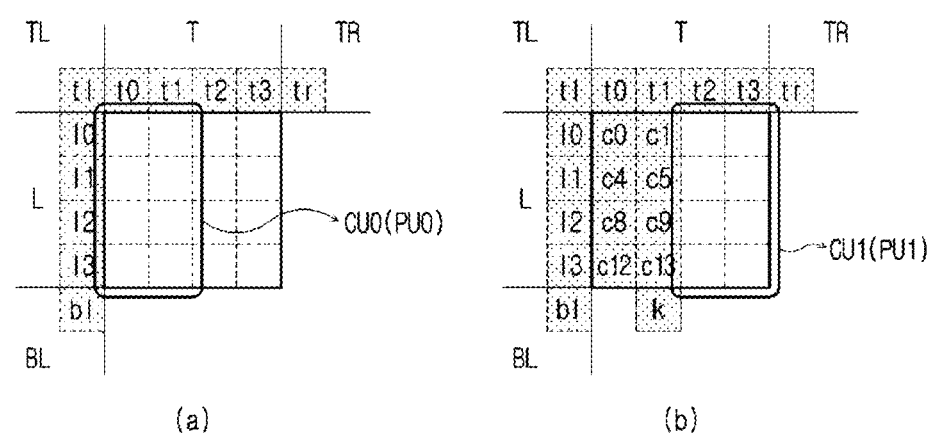

FIG. 22 illustrates various examples of setting intra prediction mode candidate groups for blocks that generate prediction information (coding blocks N×2N in this example).

The description will be performed based on the following assumptions. When this example (color difference component) has five intra prediction modes (a DC mode, a planar mode, a vertical mode, a horizontal mode, and a color copy mode in this example), coding/decoding is performed by configuring prediction modes that are adaptively prioritized as candidate groups.

In this instance, the priority will be described based on the assumption that the priority is determined from adjacent blocks (left, top, top left, top right, and bottom left in this example).

Referring to FIG. 13, a first grade candidate may be determined in left block L3, top block T3, top left block TL, top right block R0, and bottom left block B0. In this instance, a mode having the most frequent value in the prediction modes of the block may be determined as the first grade candidate. If multiple modes have the most frequent values, a preset priority is given (for example, color copy mode-planar-vertical-horizontal-DC).

This example may be regarded to be similar to an MPM candidate setting (in this example, the first bit is determined to be 0 or 1; if the first bit is 1, 2 bits need to be added; the first bit may perform bypass coding or conventional coding according to the encoding/decoding settings, and the remaining bits may perform bypass coding) regarding obtaining a mode (the mode is a mode of being estimated as a prediction mode of the current block) from adjacent blocks and thus determining priority (that is, determining the amount of allocated bits; for example, in the case of the first grade, it is '0'; in the case of the second to fourth grades, they are '100', '101', '110', and '111') and regarding predicting a prediction mode.

Referring to a of FIG. 22, a current block (CU0 or PU0, where the size is assumed to be N×2N and a horizontal/vertical ratio is 1:2) may determine the first grade candidate in blocks l3, t1, t1, t2, and b1.

On the other hand, referring to b of FIG. 22, a current block (CU1 or PU1, where the size is N×2N) may determine the first grade candidate in blocks c13, t3, t1, tr, and k.

In the present example, when the setting as in (2) of FIG. 19 is applicable, the current block CU1 may determine the first grade candidate in blocks t3, t1, tr, and k. In addition, if the block corresponding to the current block in other color spaces in which the color copy mode is acquired is not configured as one block, the priority of the color copy mode is pushed back (lowered) in the preset priority, so that the priority is changed to Planar-vertical-horizontal-DC-color copy mode, etc. As described above, there may be an example under the following assumptions. This example differs from an example in which classification is performed according to whether a current block is the same as a parent block of an adjacent block, a partition mode, or the like, but when multiple corresponding blocks of different color spaces are configured, there is a higher possibility of characteristics different from the current block. That is, it can be understood to be an example of adaptively determining encoding/decoding settings according to a relationship between blocks.

However, the difference from the case of FIG. 19 is that: even if a block is rectangular, the block is partitioned into coding units and corresponds to a case of immediately setting as a prediction unit without additional partition. Therefore, as illustrated in FIG. 19, the candidate group configuration setting may not be applicable to this example.

However, in the case of k in FIG. 22, since it is a position where encoding/decoding is not completed, it may be derived from an adjacent block where encoding/decoding is completed.

For ease of description, the above examples have been described under some assumptions, but are not limited thereto, and the same or similar applications are possible in the various embodiments of the disclosure described above.

In the embodiments of FIGS. 21 and 22, it is assumed that blocks M×N (M≠N) that may be partitioned by binary tree partitioning occur consecutively.

In the above case, a case may occur as described in FIGS. 14 to 16 (an example of setting a candidate group by determining a relationship between a current block and an adjacent block, etc.). That is, in FIGS. 21 and 21, adjacent blocks before partition of CU0 and CU1 are identical to each other, and CU0 and CU1 may be obtained by horizontal partition or vertical partition of binary tree partitioning.

In addition, in the embodiments of FIGS. 18 and 19, it is assumed that there are multiple rectangular prediction blocks in a coding block after the coding block is partitioned.

In the above case, a case may also occur as described in FIGS. 14 to 16. A conflict with the examples of FIGS. 18 and 19 then occurs. For example, in FIG. 18, in the case of PU1, it may be determined whether to use the information of PU0, and in FIGS. 14 to 16, the information of PU0 is not used since the characteristics of PU1 are different from those of PU0.

With regard to the above content, the candidate group may be configured without collision according to the setting of an initial stage of encoding/decoding. The candidate group of motion information predictions may be set according to various other encoding/decoding settings.

The case of setting the prediction mode candidate group is described by the above example. In addition, it may be set to limit the use of reference pixels for predicting the current block from adjacent blocks marked with exception states.

For example, when a prediction block is generated by distinguishing a first reference pixel from a second reference pixel according to an embodiment of the disclosure, in the case where the second reference pixel is included in a block marked as an exception state, generation of the prediction block by using the second reference pixel may be restricted. That is, the prediction block may be generated using only the first reference pixel.

In a word, the above example may be considered as an element in encoding/decoding settings relating to the use of the second reference pixel.

Various cases regarding settings of the intra prediction mode candidate group in the disclosure will be described.

In this example, it is assumed that there are 67 intra prediction modes, configured by 65 directional modes and 2 non-directional modes namely planar and DC modes. However, it is not limited thereto, and other intra prediction modes may be set. In this example, it is assumed that six candidates are included in the MPM candidate group. However, it is not limited thereto, and the MPM candidate group may also be configured by four, five or seven candidates. In addition, there is a setting where there is no overlap mode in the candidate group. In addition, the priority refers to an order of determining whether to include in the MPM candidate group, but may be considered as an element for determining binarization, entropy coding/decoding settings, etc. for each candidate belonging to the MPM candidate group. The following example will be described by centering on the luminance component, but the same or similar or modified applications may also be performed for the color difference component.

The modes included in the intra prediction mode candidate group (for example, the MPM candidate group, etc.) of the disclosure may be configured as prediction modes of spatially adjacent blocks, preset prediction modes, prediction modes derived from the prediction modes included in the candidates, etc. In this instance, a rule (for example, priority, etc.) for configuring the candidate group may be determined according to the encoding/decoding settings.

The following examples describe cases about fixed candidate group configurations.

As an example (1), a fixed priority for configuring the intra prediction mode candidate group (in this example, the MPM candidate group) may be supported. For example, a preset priority may be supported. For example, when the prediction modes of spatially adjacent blocks are added to the candidate group, the preset priority is the order of left block (L3 in FIG. 13)-top block (T3 in FIG. 13)-bottom left block (B0 in FIG. 13)-top right block (R0 in FIG. 13)-top left block (TL in FIG. 13). When a preset prediction mode is added to the candidate group, the preset priority is the order of planar-DC-vertical-horizontal-diagonal mode. In addition, there may be a combined configuration of the above example, such as the order of left block-top block-planar block-DC block-bottom left block-top right block-top left block. If the number of candidates cannot be reached even when the candidates are executed according to the priority, the derived mode of the prediction mode that has been included (for example, +1 and −1 of a left block mode, +1 and −1 of a top block mode, etc.), the vertical mode, the horizontal mode, the diagonal mode, etc., may have the next priority.

In the above example, when prediction modes of spatially adjacent blocks are added to a candidate group, candidate modes have priorities of left block-top block-bottom left block-top right block-top left block, and the prediction modes of the left block (L3 of FIG. 12) are sequentially included in the candidate group, while when corresponding modules do not exist, the prediction mode of the top block (T3 in FIG. 13) as the next priority is included in the candidate group. In this way, a prediction mode is included in the candidate group in an order, and when the prediction mode of the corresponding block is unavailable or overlaps with the included mode, the order jumps to the next block.

As another example, when prediction modes of spatially adjacent blocks are added to a candidate group, the candidate group may be configured in the order of left block-top block-bottom left block-top right block-top left block. In this instance, the prediction mode of the left block first considers the prediction mode of a block located in L3, but if there is an unavailable or overlapping mode, the prediction mode candidates of the left block are filled in the order of next sub-blocks L2, L1, and L0. Likewise, the same or similar settings are applied to top block (T3-T2-T1-T0), bottom left block (B0-B1-B2-B3), top right block (R0-R1-R2-R3), and top left block (TL). For example, if prediction modes of blocks cannot be added to the candidate group even if it is performed in the order of L3-L2-L1-L0, the next sequential block may be performed.

The following examples describe cases of adaptive candidate group configurations. The adaptive candidate group configuration may be determined according to the state of a current block (for example, block size and shape), the state of an adjacent block (for example, block size and shape, a prediction mode, etc.), or a relationship between the current block and the adjacent block.

As an example (3), an adaptive priority for configuring the intra prediction mode candidate group (MPM candidate group in this example) may be supported. The priority may be set according to the frequency. That is, frequently occurring prediction modes may have a high priority, while less occurring prediction modes may have a low priority.

For example, the priority may be set according to the frequency of prediction modes of spatially adjacent blocks.

The preset priority for the case of the same frequency may be supported. For example, assuming that modes occurring twice in the left block, the top block, the bottom left block, the top right block and the top left block respectively (assuming that one prediction mode is acquired for each block) are mode 6 and mode 31 and a mode occurring once is mode 14, in this example (assuming that the a mode occurring in the previous sequential block in the order of left block-top block-bottom left block-top right block-top left block is mode 6), mode 6 and mode 31 are included as a first candidate and a second candidate.

Planar and DC modes are included as third and fourth candidates, and mode 14 having a prediction mode with a frequency of 1 is included as a fifth candidate. Then mode 5 and mode 7 derived from the first candidate and the second candidate and modes 30 and 32 may be set to the next priority. In addition, mode 13 and mode 15 derived from the fifth candidate are set to the next priority, and then the vertical mode, the horizontal mode and the diagonal mode may have the next priority.

That is, a prediction mode having a frequency of 2 or more is allocated with a priority before the planar mode and the DC mode, and a prediction mode having a frequency of 1 may be allocated with a priority after the planar mode and the DC mode, for example, the derived mode, the preset mode, etc. of the above example have a lower priority.

In a word, the preset priority (for example, the order of left block-top block-planar block-DC block-bottom left block-top right block-top left block) may be a priority set in consideration of statistical characteristics of a general image, and the adaptive priority (a case where it is included in a candidate group according to the frequency in this example) may be an example of performing partial modification of the preset priority in consideration of partial features of an image (in this example, a mode of occurring at a frequency of two or more is set before the fixed planar and DC modes, and a mode of occurring at a frequency of one is set after the fixed planar and DC modes).

In addition, not only the priority about the candidate group configuration may be determined according to a frequency, but also the binarization and entropy coding/decoding settings for each candidate belonging to the MPM candidate group may be determined based on the frequency. As an example, binarization of MPM candidates having m frequencies may be determined based on the frequency. Alternatively, context information about candidates may be adaptively determined according to the frequency. That is, in this example, context information that sets a selection probability of the mode to high may be used. That is, when m is 1 to 4 (in this example, a non-directional mode is included in 2 of the total 6 candidates, and thus the maximum value of the frequency is 4), the context information may be set differently.

If 0 in 0 and 1 of a bin index (Bin index; an order of bits when more than one bit is configured according to binarization; for example, when a certain MPM candidate is configured as '010', the first bin to the third bin may be 0, 1, and 0) is a bin indicating that the candidate is selected as an MPM (a bin is used to determine whether it is a final MPM, or in order to recognize the final MPM, it is necessary to confirm an additional bin; that is, in the above '010', if the first bin is 0, it is necessary to confirm the second bin and the third bin, and it can be confirmed whether the mode is the final MPM; if there is one bin, it is immediately confirmed whether it is the final MPM according to 0 and 1 of the bin), and 1 is a bin indicating that the candidate is not selected as the MPM, context information with a high occurrence probability of 0 is applied (that is, when performing binary arithmetic, the occurrence probability of 0 may be set to 90%, the occurrence probability of 1 may be set to 10%, and it is assumed that the basic case is that the occurrence probabilities of 0 and 1 are 60% and 40%), so that CABAC can be applied.

As an example (4), an adaptive priority for configuring the intra prediction mode candidate group (MPM candidate group in this example) may be supported. For example, the priority may be set according to the directionality of prediction modes of spatially adjacent blocks.

In this instance, the categories for directionality are a mode group toward the top right (2 to 17 in FIG. 9), a horizontal mode group (18 in FIG. 9), a mode group toward the bottom right (19 to 49 in FIG. 9), a vertical mode group (50 in FIG. 9), a mode group toward the bottom left (51 to 66 in FIG. 9), and a non-directional mode group (planar or DC mode). Alternatively, it may be divided into a horizontally directional mode group (modes 2 to 34 in FIG. 9), a vertically directional mode group (modes 35 to 66 in FIG. 9), and a non-directional mode group (planar or DC mode), and various configuration examples are possible.

For example, if the priority of the base candidate group is the order of top left block-planar block-DC block-bottom left block-top right block-top left block, the candidate groups may be configured in the above order. However, after configuring the candidate groups, priorities for binarization and entropy coding/decoding settings for each candidate may be determined based on the category. As an example, binarization with fewer bits allocated may be performed for categories in the MPM candidate group that include a large number of candidates. Alternatively, context information may be adaptively determined according to the category. That is, the context information may be determined according to the number of modes included in each category (for example, when the first category is m and the second category is n, the context information is determined according to a combination of m and n).

As an example (5), the adaptive priority may be supported according to the size and shape of the current block. For example, the priority may be determined according to the size of the block, and the priority may be determined according to the shape of the block.

If the block size is 32×32 or more, it may be included in the candidate group in the order of left block-top block-planar block-DC block-bottom left block-top right block-top left block, and if the block size is less than 32×32, it may be included in the candidate group in the order of left block-top block-bottom left block-top right block-top left block-planar block-DC block.

Alternatively, if the block is square, it may be included in the candidate group in the order of left block-top block-planar block-DC block-bottom left block-top right block-top left block, if the block is rectangular (horizontally elongated), it may be included in the candidate group in the order of top block-top right block-top left block-planar block-DC block-left block-bottom left block, and if the block is rectangular (vertically elongated), it may be included in the candidate group in the order of left block-bottom left block-top left block-planar block-DC block-top right block. This example may be understood as the case where blocks adjacent to longer blocks have a leading order.

As an example (6), the adaptive priority may be supported according to the relationship between the current block and the adjacent blocks.

Figure 23:
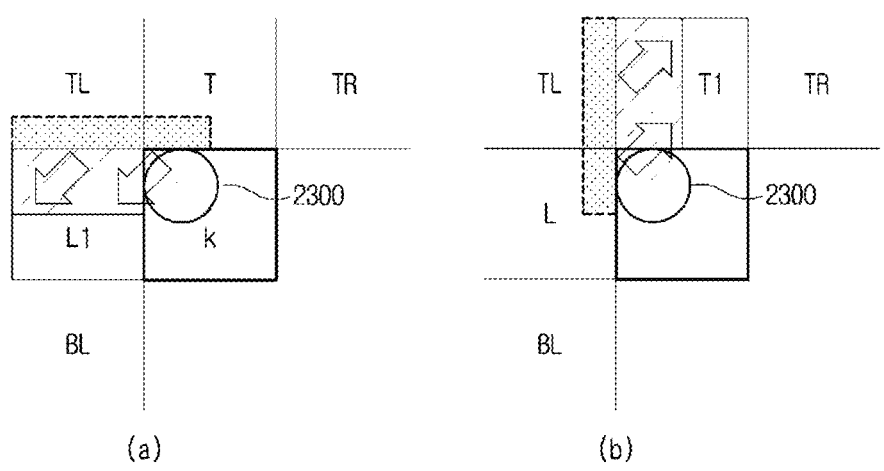
FIGS. 23 to 25 illustrate examples of generating a prediction block according to a prediction mode of adjacent blocks.

Referring to a in FIG. 23, an example of generating a prediction block according to a prediction mode of an adjacent block (a sub-block of a left block in this example) is illustrated.

When the prediction mode (used for ease of description, only referring to the directional content) of the left block (a top sub-block of the left block in this example) is a directional mode existing in modes 51 to 66 in FIG. 9 (a right tilting mode in the vertical mode), the pixel as a reference when the prediction block of the left block is generated corresponds to the diagonal portion (part of TL and T) in the figure. The right region of the left block may substantially be a region having a high correlation with the left region of the left block, but since coding/decoding has not been performed at present, a prediction block may be generated by reference pixels of a bottom region of T where coding/decoding has been completed.

Even if the prediction is performed from a part of the bottom region of block T as described above, a final prediction mode is determined to be a mode existing in modes 51 to 66, which means that some regions 2400 of the current block also have the same or similar directionality (or edges, etc.) as the above prediction mode.

That is, this may mean that the probability of selecting the prediction mode of the left block as the prediction mode of the current block is higher. Alternatively, this may mean that the probability of selecting modes 51 to 66 is higher.

Referring to b in FIG. 23, when the relevant description is derived from the above example, when the prediction modes of the top block exist in modes 2 to 17 in FIG. 9 (a down tilting mode in the horizontal mode), it may mean that some regions of the current block also have the same directionality as the corresponding prediction modes.

That is, this may mean that the probability of selecting the prediction mode of the top block as the prediction mode of the current block is higher. Alternatively, this may mean that the probability of selecting modes 2 to 17 is higher.

As described above, when it is possible to determine the prediction mode of the current block through the prediction modes of the adjacent blocks, the priority may be adaptively determined.

For example, when a basic candidate group is configured with a priority in the order of left block-top block-planar block-DC block-bottom left block-top right block-top left block, the priority does not change in the case of being identical to a in FIG. 23, and may change in the order of top block-left block-planar block-DC block-bottom left block-top right block-top left block in the case of b in FIG. 23.

Alternatively, for the case of a in FIG. 23, it may be the order of left block-(left+1) block-(left−1) block-top block-Planar block-DC block-bottom left block-top right block-bottom left block, and for the case of b in FIG. 23, it may change in the order of top block-(top−1) block-(top+1) block-left block-Planar block-DC block-bottom left block-top right-bottom left block.

Figure 24:
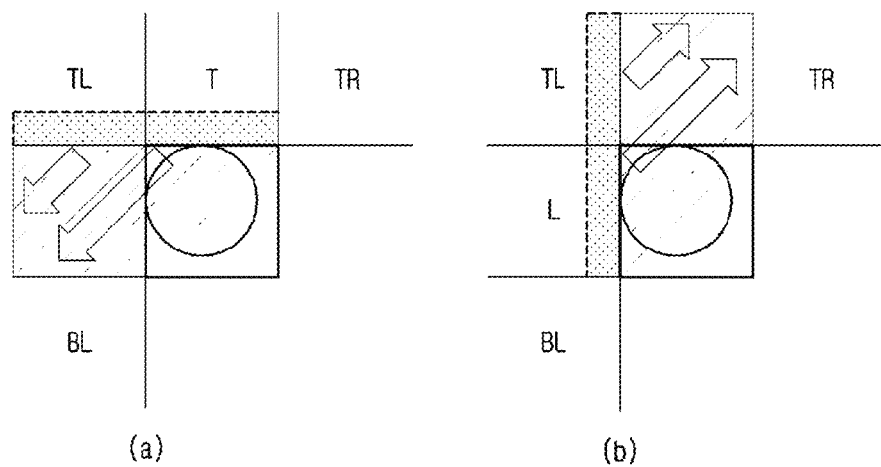

Referring to a in FIG. 24, an example of generating a prediction block according to a prediction mode of an adjacent block (a left block in this example) is illustrated.

In the case where the prediction mode of the left block is a mode having a directionality existing in modes 51 to 66 of FIG. 9, the pixels referred to for generating the prediction block of the left block correspond to diagonal portions TL and T in the figure. The right region of the left block may be a region having a high correlation with the left region of the left block, but since coding/decoding has not been performed at present, a prediction block may be generated by reference pixels of a bottom region of block T where coding/decoding has been completed.

Even if the prediction is performed from the bottom region of block T as described above, a final prediction mode is determined to be a mode existing in modes 51 to 66, which means that some regions of the current block also have the same or similar directionality (or edges, etc.) as the above prediction mode.

That is, this may mean that the probability of selecting the prediction mode of the left block is high. Alternatively, this may mean that the probability of selecting modes 51 to 66 is high.

Referring to b in FIG. 24, when the relevant description is derived from the above example, when the prediction modes of the top block exist in modes 2 to 17 in FIG. 9, it may mean that some regions of the current block also have the same directionality as the corresponding prediction modes.

That is, this may mean that the probability of selecting the prediction mode of the top block as the prediction mode of the current block is high. Alternatively, this may mean that the probability of selecting modes 2 to 17 is high.

As described above, when it is possible to determine the prediction mode of the current block through the prediction modes of the adjacent blocks, the priority may be adaptively determined.

For example, when a basic candidate group is configured with a priority in the order of left block-top block-planar block-DC block-bottom left block-top right block-top left block, the priority does not change for the case of a in FIG. 24, and may change in the order of top block-left block-planar block-DC block-bottom left block-top right block-top left block for the case of b in FIG. 23. In this instance, as in the case of a in FIG. 24, the priority is the same as before, and instead, binarization and entropy coding/decoding settings for prediction mode candidates of the left block in the MPM candidate group may be adaptively determined. As an example, binarization (allocation of shorter bits) of prediction mode candidates for the left block may be determined. Alternatively, context information may be adaptively determined. That is, in this example, context information that sets the selection probability of the candidate to high may be used.

If 0 in 0 and 1 of a certain bin index is a bin indicating that the candidate is selected as an MPM (in the case of determining whether it is a final MPM with one bin or confirming an additional bin in order to recognize the final MPM), and 1 is a bin indicating that the candidate is not selected as the MPM, CABAC may be applied by applying the context information that the occurrence probability of 0 is high.

Alternatively, for the case of a in FIG. 24, it may be the order of left block-(left+1) block-(left−1) block-(left+2) block-(left−2) block-top block-Planar block-DC block-bottom left block-top right block-bottom left block, and for the case of b in FIG. 24, it may change in the order of top block-(top−1) block-(top+1) block-(top−2) block-(top+2) block-left block-Planar block-DC block-bottom left block-top right-bottom left block.

Figure 25:
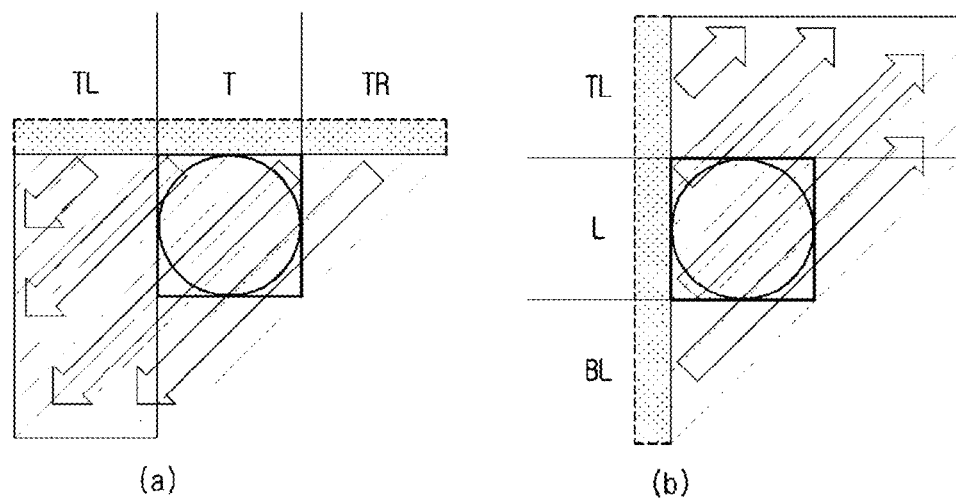

Referring to a in FIG. 25, an example of generating a prediction block according to a prediction mode of an adjacent block (in this example, a left block) is illustrated.

The case where the prediction modes of the left block and the bottom left block have directionality existing in modes 51 to 66 of FIG. 9 is considered. The left block and the bottom left block may or may not belong to the same block. In this example, for ease of description, it is assumed that the left block and the bottom left block belong to the same block (i.e., the same mode) for which partition has been completed.

The pixels referred in the prediction block generation of (left+bottom left) blocks correspond to diagonal portions TL, T, and TR in the figure. Even if the prediction is performed from the bottom region of block T and block TR as described in the above example, a final prediction mode is determined to be a mode existing in modes 51 to 66, which means that the whole region of the current block also has the same or similar directionality as the above prediction mode.

That is, this may mean that the probability of selecting the prediction mode of the left block or the bottom left block (the prediction modes of two blocks are the same in this example) as the prediction mode of the current block is (very) high. Alternatively, this may mean that the probability of selecting modes 51 to 66 (in this example, the prediction modes of two blocks are different) is high.

In b of FIG. 25, when the prediction modes of (top+top right) blocks exist in modes 2 to 17 in FIG. 9, it may mean that the whole region of the current block also has the same directionality as the corresponding prediction modes.

That is, this may mean that the probability of selecting the prediction mode of the top block or the top right block (the prediction modes of two blocks are the same in this example) as the prediction mode of the current block is (very) high. Alternatively, this may mean that the probability of selecting modes 2 to 17 (in this example, the prediction modes of two blocks are different) is high.

As described above, when it is possible to determine the prediction mode of the current block through the prediction modes of the adjacent blocks, the priority may be adaptively determined.

For example, when the basic candidate group is configured with a priority in the order of left block-top block-planar block-DC block-bottom left block-top right block-top left block, it may change in the order of left block-bottom left block-planar block-DC block-top block-top right block-top left block for the case of a in FIG. 25. The priority may change in the order of top block-top right block-planar block-DC block-left block-bottom left block-top left block for the case of b in FIG. 25. That is, the priority of related block may be put in front.

Alternatively, for the case of a in FIG. 25, the priority may change in the order of left block-bottom left block-(left+1) block-(left−1) block-(bottom left+1) block-(bottom left−1) block-planar block-DC block-top block-top right block-top left block, and for the case of b in FIG. 25, the priority may change in the order of top block-top right block-(top−1) block-(top+1) block-(top right−1) block-(top right+1) block-planar block-DC block-bottom left block-top left block.

In addition, in the case of FIG. 25, the binarization and entropy coding/decoding setting of each candidate belonging to the MPM candidate group may be determined based on the category described in the fourth example. As an example, binarization (i.e., allocation of shorter bits) for MPM candidates (modes a and b of FIG. 24) may be determined. Alternatively, context information according to the category may be adaptively determined. That is, in this example, context information of setting a high occurrence probability of the category to which the mode (modes a and b of FIG. 25) belongs may be used.

If 0 in 0 and 1 of a certain bin index is a bin indicating that a mode belonging to a category different from the above category is selected as an MPM, and 1 is a bin indicating that a mode belonging to the category is selected as the MPM, CABAC may be applied by applying context information indicating a high occurrence probability of 1.

In order to confirm the above content, it is necessary to confirm whether a block located in a predetermined direction (left, top, top left, top right, and bottom left) is configured as a single block (i.e., unpartitioned). Therefore, if the block is configured as a single block, the case is performed with the prediction mode of the block, and if it is configured as a partition block, part or all of the prediction modes of each block are confirmed to perform the case. However, the complexity of this case may be greatly increased.

To this end, the process may be simply configured. It is assumed that the range of the current block is (a, b) to (a+M−1, b+N−1). The left block includes pixels centering on the current block that belong to a range of (a−1, b) to (a−1, b+N−1). The directionality of the prediction mode of the left block may be determined by confirming the prediction modes of some but not all pixels.

For example, the directionality of the prediction block is determined using the prediction mode of the coordinates of the top right side (on the basis of the current block, top left) of the left block (a−1, b) and the prediction mode of the coordinates of the bottom right side (on the basis of the current block, bottom left) of the left block (a−1, b+N−1). In this case, the left block may be configured as a single block, and may be configured as a partition block. Even if it is a single block or a partition block, the prediction modes including the coordinates may be the same. However, even if the prediction modes are not the same, if they are prediction modes belonging to modes 51 to 66 of FIG. 9, as described by a in FIG. 24, a high priority may be allocated with respect to prediction mode coding of the prediction modes.

The above example assumes the case of a left block, but other directions may be similarly applicable. In addition to the left block, in order to confirm the prediction mode of the bottom left block, it is possible to confirm the prediction mode belonging to the coordinates of the bottom left block, for example, (a−1, b+N).

In a word, it may be used for reference in the intra prediction mode candidate group configuration by confirming prediction modes about some coordinates of a block located in a predetermined direction and confirming prediction modes or prediction mode directionality in the direction. In this instance, the number of coordinates may be an integer of 1 or more, for example, 1, 2, and 3.

In summary, when a mode determined to have a high correlation with the current block is confirmed, a high priority may be allocated to the mode within the candidate group. Alternatively, a high priority may be allocated within the candidate group to prediction modes derived based on the mode (for example, adjacent prediction modes, such as +1 or −1). That is, the mode may prioritize all or part of the predictions mode or the preset prediction modes (DC mode, planar mode, horizontal mode, vertical mode, diagonal mode, etc.) of other spatially adjacent blocks.

Unlike the case described in the above example, if it cannot be determined that there is a high correlation with the current block, a basically set candidate group may be configured. That is, considering the candidate group configuration method of the high correlation process, one of multiple prediction mode candidate group configuration methods or the configured candidate groups may be selected based on the state information (block size, shape, position, prediction mode, etc.) of adjacent blocks.

Figure 26:
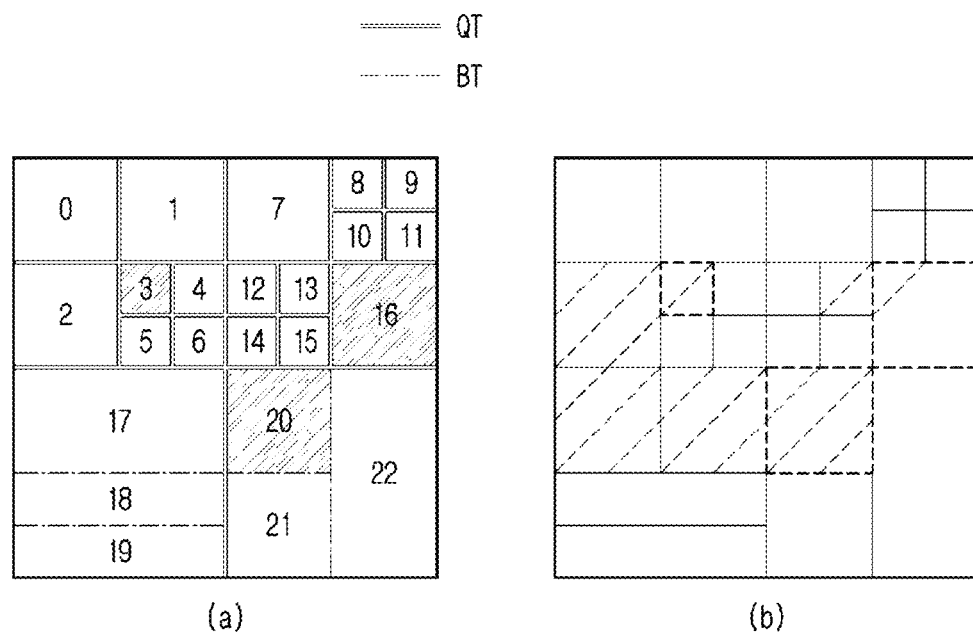
FIG. 26 is a schematic diagram of a relationship between a current block and an adjacent block.

FIG. 26 is a schematic diagram of a relationship between a current block and an adjacent block.

a of FIG. 26 illustrates a coding order according to a partition block.

When performing quad tree partitioning, coding is performed in the order of top left block (0)-top right block (1)-bottom left block (2)-bottom right block (3). When quad tree partitioning is further performed in the sub-blocks (depth 1), coding is performed in the above order in each sub-block (depth 2), and coding is performed prior to depth information. For a top left block partitioned at depth 1, there is an order of top left block (0-0)-top right block (0-1)-bottom left block (0-2)-bottom right block (0-3) at depth 2. For a bottom right block partitioned at depth 1, there is an order of top left block (3-0), top right block (3-1), bottom left block (3-2) and bottom right block (3-3) at depth 2. That is, the coding is performed in the order of x-y-z represented by the depth information.

When performing binary tree partitioning, coding is performed in the order of left block (0)-right block (1) or top block (0)-bottom block (1) in the case of horizontal partition. When binary tree partitioning is further performed in the sub-blocks (depth 1), coding is performed in the above order in each sub-block (depth 2), and coding is performed prior to depth information.

In a of FIG. 26, in the case where block 3 is the same as a in FIG. 25 and block 16 is the same as a in FIG. 23, block 20 corresponds to the same case as a in FIG. 24.

For example, block 3 is a case where a left block is configured as one block without being partitioned from a bottom left block, and has a prediction mode (one mode) in a specific direction, or has prediction modes (more than one mode) in a specific direction even if the left block is separated from the bottom left block.

Block 16 is a case where a left block is configured as multiple blocks after being partitioned, and at least part of sub-blocks have a prediction mode (one mode) in a specific direction.

Block 20 is a case where a left block is configured as one block and has a prediction mode (one mode) in a specific direction, or the left block is configured as multiple sub-blocks after being partitioned, and all the sub-blocks have prediction modes (more than one mode) in a specific direction.

An example of a relationship between a current block and an adjacent block is illustrated by b in FIG. 26. If the relationship is determined to be as in b of FIG. 26, this may be taken into account in the configuration of the prediction mode candidate group.

Through the above examples, some examples of the relationship between the current block and the adjacent block are checked, however, various other cases are possible, and the intra prediction mode candidate group configuration may be set in consideration of the case.

Also, in the above examples, various cases regarding configuration of the intra prediction mode candidate group are checked. There may be a candidate group configuration to apply one of the settings described in each embodiment, the settings described in each embodiment may be applied identically or similarly in other embodiments, and multiple settings may be applied to configure the candidate group. In addition, a candidate group configuration may be constructed by combining the above examples with additional settings.

In this example, assuming an example in which the non-MPM candidate group is configured as multiple candidate groups (group A and group B), the prediction mode of the MPM candidate group is not selected, and encoding/decoding is performed using a mode candidate group (group A) in which the next one of the prediction modes of the non-MPM candidate group is estimated as the prediction mode of the current block.

In this example, it is assumed that 16 candidates are included in candidate group A and 45 candidates are included in candidate group B.

The setting regarding configuration of the candidate group A may use various methods, and a prediction mode that is not included according to the priority of the MPM candidate group may be included in candidate group A.

Alternatively, candidate group A may be configured according to a preset category independently of the above example. For example, in FIG. 9, prediction modes with certain intervals may be configured in the candidate group. That is, blocks 2, 6, 10, 14, 18, etc. in FIG. 8 may be included in group A. In this case, for group B, blocks 3, 4, 5, 7, 8, 9, 11, etc. may be included in group B. Of course, it is a setting that excludes the modes included in the MPM candidate group.

The disclosure is not limited to the above examples, various modifications and other settings are possible.

In a word, the MPM candidate group is configured firstly and then candidate group A is configured. Also, the remaining prediction modes may be configured as candidate group B.

The mode of the MPM candidate group may use Truncated Unary binarization, the mode of the candidate group A may use fixed length binarization, and the mode of the candidate group B may use Truncated Unary binarization, although various other binarization methods may be used.

The mode of the MPM candidate group may perform coding/decoding on all or part of the bins by a conventional coding section, and the non-MPM candidate mode may perform coding/decoding on all the bins by a bypass coding section. Alternatively, the mode of the candidate group A in the non-MPM candidate group may perform coding/decoding on a part of the bins by the conventional coding section, but it is not limited thereto, and various cases may be used.

The above is a description on basic settings, and there may be many transform embodiments of the disclosure.

Next, a case where a prediction block is generated using multiple reference pixels will be described.

Figure 27:
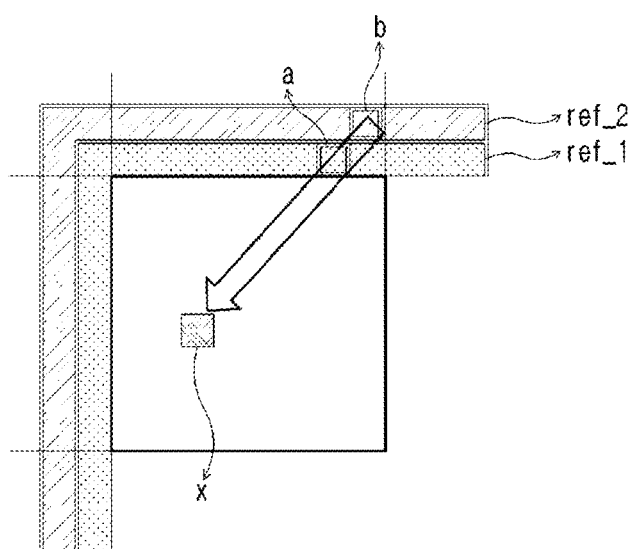
FIGS. 27 and 28 illustrate intra prediction in consideration of directionality of a prediction mode.

FIG. 27 illustrates an example of generating a prediction block using multiple reference pixel layers.

A pixel value generated by applying a weighted average to a of ref_1 and b of ref_2 may be used as a prediction value of x pixels of the current block.

Generation of the prediction block using multiple reference pixel layers sometimes results in better prediction results. That is, this means that multiple pixels may produce more accurate prediction results when generating the prediction values of the pixels of the current block.

However, rel_1 and ref_2 may be applied to a case where the current block has high correlation with an edge direction or the like, and in some cases, using multiple reference pixel layers may result in poor prediction results. For example, if the current block has high correlation in a vertical direction, and if the top block has high correlation in a diagonal direction, use of multiple reference pixel layers cannot achieve a good effect.

In this case, it is preferable to explicitly determine whether to use an existing reference pixel layer or to use multiple reference pixel layers.

Alternatively, it may be implicitly determined whether to use multiple reference pixel layers to generate a prediction block by confirming whether there is high correlation between the reference pixel layers.

It is illustrated by the above example that, in the intra prediction, partition is performed in units of predetermined sub-blocks, and sub-block-based prediction and transform are performed, etc. In this instance, the sub-blocks belonging to the current block may share an intra prediction mode. In this instance, applying multiple reference pixel layers to the sub-blocks in the block may achieve better results.

Figure 28:
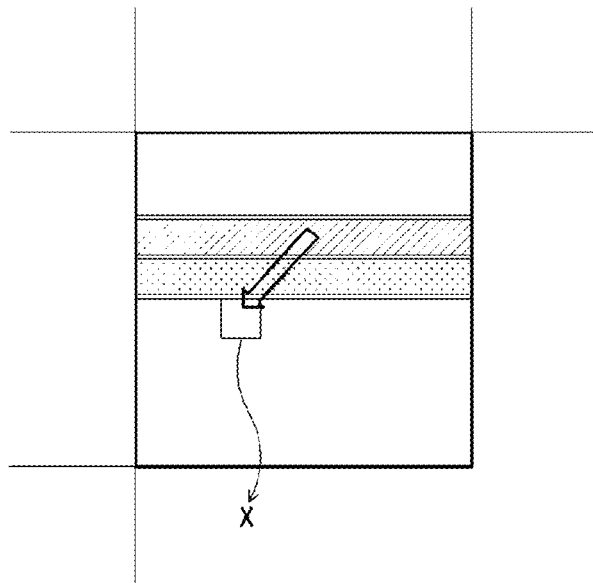

FIG. 28 illustrates an example of generating sub-blocks in a current block by using multiple reference pixel layers. The current block is 4M×4N, the sub-block is 4M×N, and forward prediction is performed (up→down or left→right as a reference, backward down→up, right→down), while the prediction mode using reference pixels of which prediction directions are a top left block, a top block and a top right block is k (No. 66 in FIG. 9).

Referring to FIG. 28, the sub-block 4M×N including x may perform intra prediction using the first previous sub-block having been encoded as a reference pixel layer. Alternatively, the sub-block including x may perform intra prediction using the second previous sub-block having been encoded as a reference pixel layer. Alternatively, the sub-block including x may perform intra prediction using the first and second previous sub-blocks as reference pixel layers (when a weighted value is applied to each reference pixel layer, a weighted value applied to the sub-block including x is equal to or greater than that of other sub-blocks).

In general, unconditional use of reference pixel layers does not always produce the correct result when multiple reference pixel layers are used on the basis of a coding block. However, in the above example, the previous sub-block of a target sub-block used for coding has the same direction as the target sub-block, thus producing a better result. Therefore, multiple reference pixel layer settings may be explicitly applied to sub-blocks in the current block, so as to explicitly determine whether to perform or select which reference pixel layer. Alternatively, multiple reference pixel layers may be implicitly applied to the first k sub-blocks of the target sub-block to generate a prediction value of the target sub-block.

If multiple sub-blocks are respectively set to use different reference pixel layers on a sub-block unit, and it is desired to generate a prediction block using the above settings, different settings may be performed according to positions in the current block of the sub-blocks.

For example, it is assumed that four horizontally partitioned sub-blocks are supported in the current block. Then, the first sub-block may perform prediction and coding using the closest reference pixel of the current block, and the second sub-block may perform prediction and coding using the closest reference pixel of the current block and data of the first sub-block.

In addition, the third sub-block may perform prediction and coding using data of the first and second sub-blocks, and the fourth sub-block may perform prediction and coding using data of the second and third sub-blocks.

The reference pixel filtering and reference pixel interpolation applicable to each reference pixel layer (or sub-block) may use the same filter or may use different filters above. In this instance, the filters are distinguished by the number of filter taps and filter coefficients. In addition, filtering may also be applied identically or differently. Alternatively, the reference pixel filtering and the reference pixel interpolation are not performed separately, but may be implemented by one filter. For example, by performing reference pixel filtering using a 6-tap interpolation filter instead of a 3-tap low frequency filter and a 4-tap interpolation filter, twice filtering may not be performed.

As described above, various reference pixel configurations may be set, and then prediction may be performed using multiple reference pixel layers. Various combinations may be described by various other embodiments of the disclosure.

An example of generating a prediction block will be described below.

It has been previously described that reference pixels for intra prediction may be distinguished into a number of concepts. Instead of using multiple reference pixel layers, the prediction block may be generated or corrected using a first reference pixel and a second reference pixel according to the prediction mode.

Examples with different application modes according to the prediction mode are described. However, this example may be applied to a case where the current block is partitioned into multiple sub-blocks. That is, compared to using a reference pixel as a first reference pixel for an adjacent block of the current block, using a pixel located at a position opposite to the direction of the prediction mode or a position corresponding to the direction of the prediction mode as a second reference pixel, when the current block is partitioned into multiple sub-blocks, the first reference pixel may be a top block. That is, the disclosure may change the position of the first reference pixel in an example of generating a prediction block using multiple reference pixels.

Alternatively, the above method may not be used when the current block is partitioned into multiple sub-blocks and transformed. The reason is that use of the second reference pixel may result in a low efficiency in arranging the closest pixels that have previously completed coding.

That is, it is confirmed whether coding is performed by partitioning the current block (transform block) into sub-blocks. Therefore, in the disclosure, a prediction block may be generated or corrected using the first reference pixel and the second reference pixel according to the prediction mode if coding is performed by prediction, transform, etc. at an original block size without partition. If coding is performed after the partition, generation or correction of the prediction block using the second reference pixel is prohibited.

If the second reference pixel is used when coding is performed after the partition according to the sub/decoding settings, the corresponding process may be performed by adjusting the position of the first reference pixel.

Figure 29:
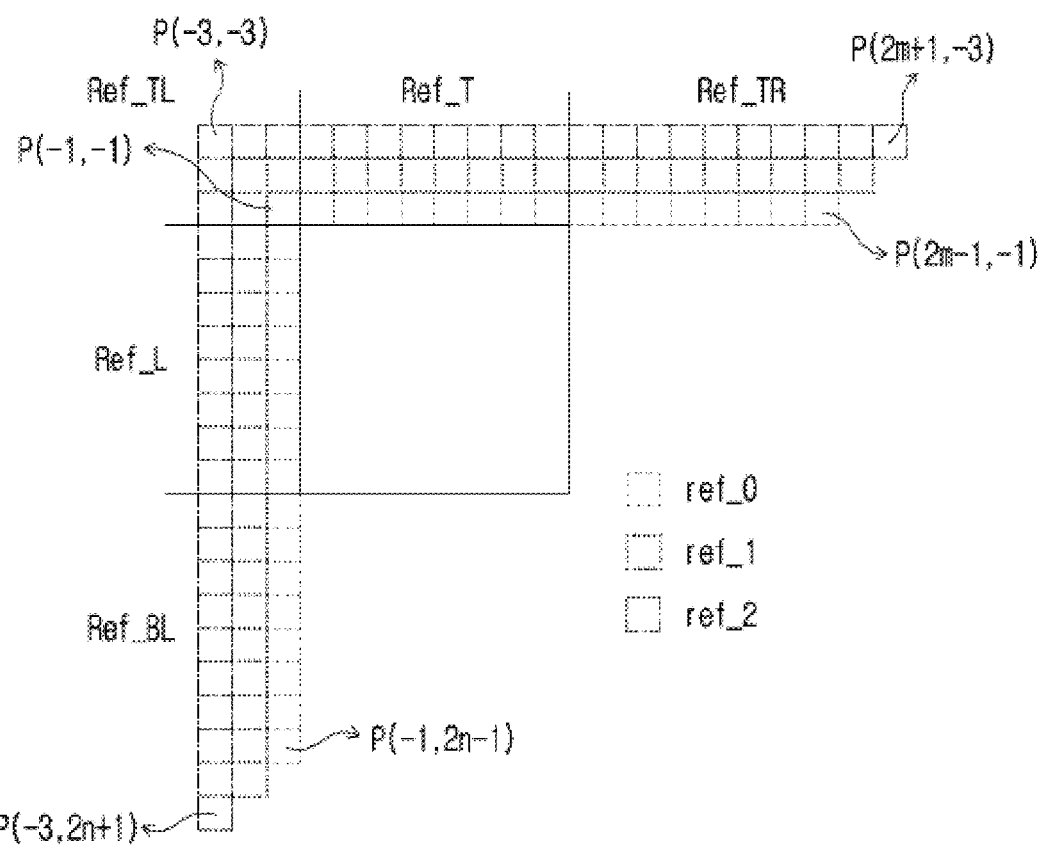
FIG. 29 is a schematic diagram for explaining a reference pixel configuration for intra prediction.

FIG. 29 is a schematic diagram for explaining a reference pixel configuration for intra prediction. The size and shape (M×N) of the current block for performing prediction may be obtained from a block partition section and described under the following assumptions: the range of 4×4 to 256×256 is supported in order to perform intra prediction. Generally, intra prediction may be performed in units of a prediction block, but intra prediction in units of coding blocks and transform blocks may be performed according to the settings of the block partition section. After confirming block information, the reference pixel configuration section may configure a reference pixel used for prediction of the current block. In this instance, the reference pixel may be managed by a temporary memory (for example, an array <Array>, a main array or an auxiliary array, etc.), the reference pixel may be generated and deleted during each intra prediction process of the block, and the size of the temporary memory may be determined according to the configuration of the reference pixel.

In this example, it is assumed that the left block, the top block, the top left block, the top right block, and the bottom left block are used for prediction of the current block by centering on the current block. However, it is not limited thereto, and a block candidate group having other configurations may be used for prediction of the current block. For example, the candidate group for the adjacent blocks of the reference pixel may be an example following a raster or Z scan, and part of the candidate group may be removed according to a scan order or configured to include other block candidate groups (for example, further configuration of the top block, the bottom block, the bottom right block, etc.). That is, the positions of referable adjacent blocks may be changed according to the scan order or the like.

Alternatively, blocks (for example, having corresponding coordinates according to the same coordinate or color component composition ratio in each color space) corresponding to the current block in other color spaces (for example, if the current block belongs to Cr, other color spaces correspond to Y or Cb) may be used to predict the current block. In addition, for ease of description, the description is performed by assuming that one block is configured at the preset position (left, top, top left, top right, and bottom left), but at least one block may exist at a corresponding position. That is, multiple sub-blocks obtained by partitioning the corresponding block may exist at the preset position.

In a word, the adjacent region of the current block may be a position of a reference pixel for intra prediction of the current block, and a region corresponding to the current block in another color space may be considered further as the position of the reference pixel according to the prediction mode. In addition to the above examples, the position of the reference pixel defined according to the prediction mode, method, etc. may be determined. For example, when the prediction block is generated by a method such as block matching, the position of the reference pixel may be considered as a region where coding/decoding is completed before the current block of the current image or a region included within a search range in the region where coding/decoding is completed (for example, including the left side or top side or top left side and top right side of the current block).

As illustrated in FIG. 29, the reference pixel for prediction of the current block (M×N) may be configured by adjacent pixels of a left block, a top block, a top left block, a top right block, and a bottom left block (Ref_L, Ref_T, Ref_TL, Ref_TR, and Ref_BL in FIG. 7).

In this instance, adjacent pixels may be classified by at least one reference pixel layer, the closest pixel is ref_0 (the pixel value difference is 1, p (−1, −1) to p (2M−1, −1), p (−1, 0) to p (−1, 2N−1)), the next adjacent pixel (the pixel value difference is 2, p (−2, −2) to p (2M, −2), p (−2, −1) to p (−2, 2N)) may be ref_1, and the next adjacent pixel (the pixel value difference is 3, p (−3, −3) to p (2M+1, −3), p (−3, −2) to p (−3, 2N+1)) may be ref_2, etc. In detail, ref k represents a reference pixel set in which a pixel value difference in adjacent blocks (Ref_TL, Ref_T, Ref_TR, Ref_L, and Ref_BL in this example) is k+1. Description (or main description) on use of the reference pixel set ref k in the disclosure is performed under the following assumption. Pixels having a pixel value difference of k+1 in Ref_TL, Ref_T, Ref_TR, Ref_L, and Ref_BL are used as reference pixels and used for a prediction block, but the disclosure is not limited thereto. This means that in the reference pixel set for predicting the current block, adjacent blocks may be the same or different.

For example, it is also possible to use ref_0 (p (−1, −1) to p (2M−1, −1)) in Ref_TL, Ref_T and Ref_TR, to use ref_1 (p (−2, 0) to p (−2, N−1)) in Ref_L, and to use ref_2 (p (−3, N) to p (−3, 2N+1)) in Ref_BL.

In addition, one reference pixel set refers to a set of reference pixels Ref_TL, Ref_T, Ref_TB, Ref_L, and Ref_BL (i.e., obtained from an adjacent block used for intra prediction of the current block), but in the following example, the reference pixel set may be configured by a partial combination of the reference pixels (for example, Ref_T+Ref_TR, Ref_L+Ref_BL, Ref_T+Ref_TL+Ref_L, etc., or there may be a case when a block at each position is configured by sub-blocks, that is, Ref_T0+Ref_T1, Ref_L0+Ref_TL+Ref_T, etc.).

In the disclosure, it is described by assuming that there are at most three reference pixel sets, however, it is not limited thereto, and more reference pixel sets (k is 3 or more) may be used. In this instance, the supported reference pixel set (or the maximum number of sets, referred to as a reference pixel candidate group in the following examples) may be determined according to the encoding/decoding settings (for example, block size, shape, prediction mode, image type, color component, etc.).

In the disclosure, a case where a low index (incremented by 1 from 0) is allocated from the closest reference pixel set is assumed, but the disclosure is not limited thereto. In addition, the related information of the reference pixel configuration described below may be generated under the index setting as above (binarization of allocating a short bit to a small index in the case of selecting one of multiple reference pixel sets, etc.), but the disclosure is not limited thereto.

Generally, the closest pixel of an adjacent block may be configured as a reference pixel (reference pixel layer ref_0 in this example), but other pixels may be configured as reference pixels according to the encoding/decoding settings. If other reference pixel layers or at least one reference pixel layer is used, prediction accuracy may be improved, thereby improving coding performance. In this instance, there may be various settings related to the reference pixel layer setting.

For example, the reference pixel set used for intra prediction may be determined implicitly or information relating to the used reference pixel set may be generated explicitly. In detail, at least one preset reference pixel set may be configured as reference pixels, or at least one reference pixel set determined by the reference pixel set selection information may be configured as reference pixels. Through the above process, the reference pixel set (for example, ref_0, ref_1, ref_2, ref_0+ref_1, ref_0+ref_2, ref_1+ref_2, ref_0+ref_1+ref_2) may be configured as reference pixels for the current block.

In addition, it is possible to distinguish between a case where the number of reference pixel sets configured as reference pixels is 1 and a case where the number of reference pixel sets configured as reference pixels is two or more. The former case represents that pixels in one reference pixel set are used to generate a prediction block, while the latter case represents that at least one pixel (for example, when two or more reference pixel sets are configured as reference pixels, a value derived from a median value, weighted average, etc. of pixel values (this value may also be a value derived from one or more pixels in each reference pixel set) in each reference pixel set may be a value derived from one ore more pixels) in each reference pixel set is used to generate a prediction block.

For example, a prediction block may be generated using a reference pixel that is obtained by a weighted sum of pixels in a first reference pixel set (ref_0 in this example) and pixels in a second reference pixel set (ref_1 in this example). In this instance, according to the prediction mode (for example, a directional prediction mode), the pixels to which the weighted sum is applied in each reference pixel layer may be not only integer unit pixels but also decimal unit pixels. Alternatively, weighted values (for example, 7:1, 3:1, 2:1, 1:1, etc.) may be respectively applied to a prediction block obtained by using pixels in the first reference pixel set as reference pixels and a prediction block obtained by using pixels in the second reference pixel set, so as to obtain a prediction block.

Assuming the case of explicitly generated information about the reference pixel configuration, indication information allowing the adaptive reference pixel configuration (adaptive_intra_ref_pixel_enabled_flag in this example) may occur in units of video, sequence, picture, slice, tile, etc.

If the indication information means that the adaptive reference pixel configuration is allowed (adaptive_intra_ref_sample_enabled_flag=1 in this example), the adaptive reference pixel configuration information (adaptive_intra_ref_sample_flag in this example) may occur in units of picture, slice, tile, block, etc.

If the configuration information means that the adaptive reference pixel configuration is allowed (adaptive_intra_ref_sample_flag=1 in this example), reference pixel configuration related information (for example, reference pixel set selection information, etc., intra_ref_idx in this example) may occur in units of picture, slice, tile, block, etc.

In this case, when the adaptive reference pixel configuration is not allowed or the configuration is not the adaptive reference pixel configuration, the reference pixel may be configured according to a predetermined setting. In general, an example thereof may be, but is not limited to, a case where a closest pixel of an adjacent block is configured as a reference pixel, there may be various cases (for example, a case where ref_0 and ref_1 are configured as reference pixels, and a prediction pixel value is generated by performing a weighted value sum or the like on ref_0 and ref_1, etc.; that is, an implicit case).

Further, in addition to the above preset case (for example, the case of ref_0), the reference pixel configuration related information (for example, reference pixel set selection information, etc.) may be configured by, but not limited to, a candidate group (for example, ref_1, ref_2, ref_3, etc.).

The description is performed under the hierarchical structure from a top layer unit by the above example, but is not limited thereto. In addition, in some cases, related information may be determined implicitly. For example, as described above, in some cases, the related information may occur according to the encoding/decoding settings, in some cases, the related information is determined implicitly, and in some cases, it may be a combined case.

Some cases of reference pixel configuration are described through the above examples, which may be combined with various encoding/decoding information, etc. to determine intra prediction settings. In this instance, the encoding/decoding information includes an image type (I/PB), a color component, a size and shape of a current block, a prediction mode (type of the prediction mode (directional or non-directional)), a direction of the prediction mode (vertical, horizontal, diagonal 1, diagonal 2, etc.), etc., and intra prediction settings (reference pixel configuration settings in this example) may be determined according to the encoding/decoding information of an adjacent block and the combination of the encoding/decoding information of the current block and the adjacent block.

Figure 30:
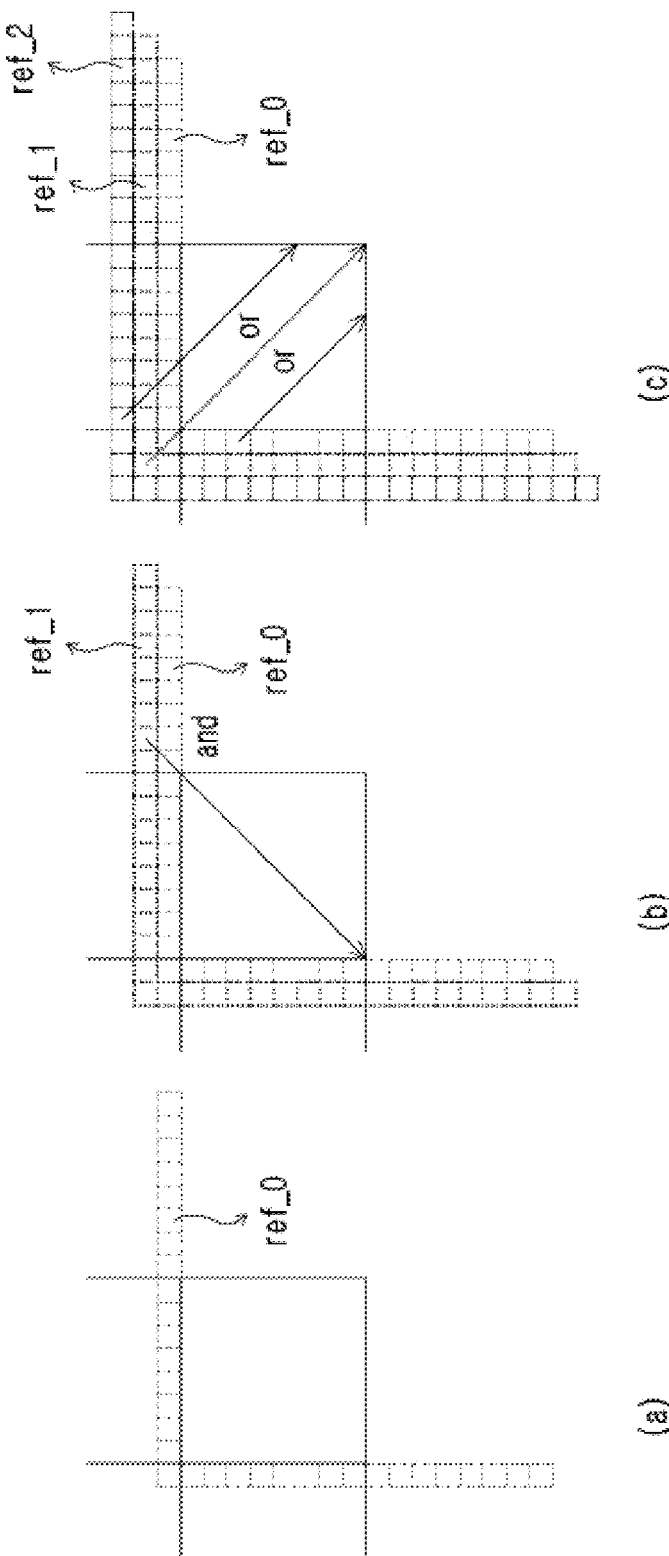
FIGS. 30 to 35 are schematic diagrams regarding a reference pixel configuration.

FIG. 30 is a schematic diagram regarding a reference pixel configuration.

a in FIG. 30 is a case where a reference pixel set is configured as a reference pixel, and a subsequent intra prediction process (reference pixel generation, reference pixel filtering, reference pixel interpolation, prediction block generation, post-processing filtering, etc.; some intra prediction processes may be adaptively configured according to the reference pixel set configuration) may be performed after ref_0 is configured as a reference pixel. For example, reference pixel set information is not generated with one reference pixel set, and an intra prediction process according to a non-directional mode may be performed.

b in FIG. 30 is a case where at most two reference pixel sets are configured as reference pixels, and after configuring ref_0+ref_1 ('and' in the figure) as reference pixels, a subsequent intra prediction process may be performed. For example, although there are multiple reference pixel sets but no reference pixel set information is generated, the intra prediction process may be performed according to some prediction mode (from top left to bottom left or from bottom left to top right in this example).

c in FIG. 30 is a case where at most one reference pixel set is configured as a reference pixel, and after configuring one of ref_0, ref_1 and ref_2 ('or' in the figure) as reference pixels, a subsequent intra prediction process may be performed. For example, the reference pixel set information is generated through multiple reference pixel sets, and intra prediction processing according to some prediction modes (top left to bottom right in this example) may be performed.

In a word, b and c of FIG. 30 are cases where two and three reference pixel sets (in other words, two and three reference pixel candidate groups respectively) are supported respectively, b represents at most two reference pixel sets configured by reference pixels (for example, derived from the weighted average of pixel values of each reference pixel set, etc.), and c represents at most one reference pixel set configured by reference pixels (for example, derived from pixel values of a selected reference pixel set of three candidate groups).

Figure 31:
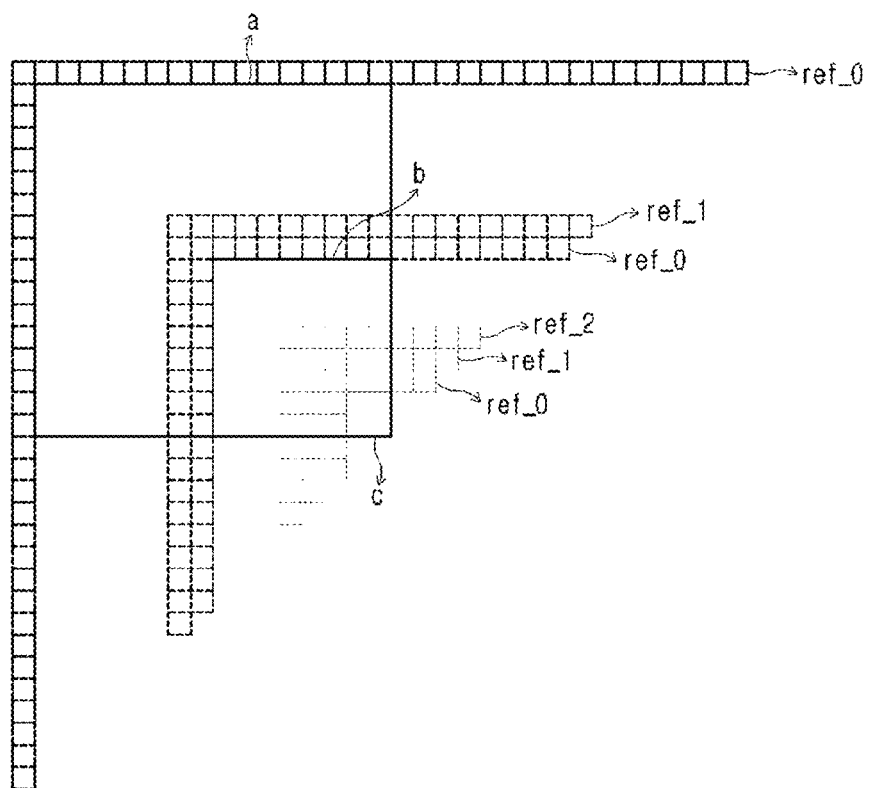

FIG. 31 is a schematic diagram of a reference pixel configuration.

a in FIG. 31 illustrates a case where one reference pixel set is a reference pixel candidate group when the block size is 64×64 or more. b in FIG. 31 illustrates a case where two reference pixel sets are reference pixel candidate groups (meaning at most two reference pixel sets for reference pixels; that is, it can be understood that both b and c of FIG. 30 are possible; the same case below) when the block size is greater than 16×16 and less than 64×64. c in FIG. 31 illustrates a case where three reference pixel sets are reference pixel candidate groups (meaning at most three reference pixel sets for reference pixels) when the block size is smaller than 16×16. In the present example, as the size of the current block is larger, the size of the adjacent block is more likely to be smaller, which may be a partition result due to other image characteristics. Therefore, in order to avoid performing prediction from pixels with a large distance from the pixel value of the current block, it is assumed that as the size of the block is larger, the number of candidates of the reference pixel set is reduced, but an opposite case may also be assumed. The disclosure is not limited thereto. Various examples of variations may be made.

Figure 32:
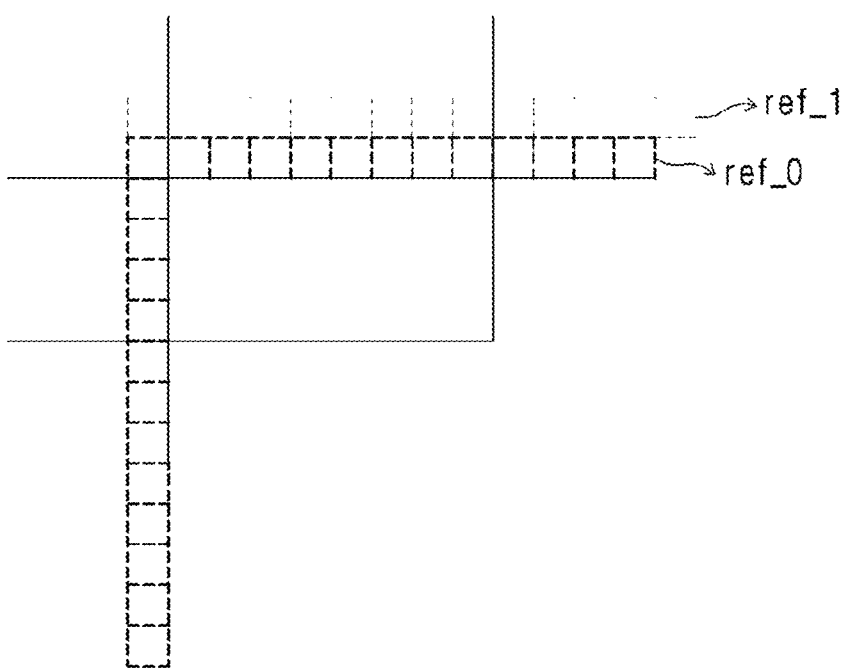

FIG. 32 is a schematic diagram regarding a reference pixel configuration.

FIG. 32 illustrates a case where multiple reference pixel sets on a longer side are reference pixel candidate groups and one reference pixel set on a shorter side is a reference pixel candidate group when the current block is rectangular (horizontally long in this example). In this example, it is assumed that one reference pixel set is configured on the shorter side, but it can be understood that there are a smaller number of configurations than the longer side, and there may also be a large number of configurations in the opposite case. This example is to prevent, but not limited to, a case where a reference pixel with a short length is frequently far away from the current block when the block is rectangular, so that the accuracy of prediction is reduced.

For example, in the case of the directional mode predicted using the reference pixels of the top and top right sides of the block, the prediction may be performed by using multiple reference pixel sets (both b and c of FIG. 30 are possible), and in the case of the directional mode predicted using the reference pixels of the left and bottom left sides of the block, the prediction may be performed using a single reference pixel set. That is, it may be the case that the reference pixel set is adaptively determined according to adjacent blocks in one block.

As an example of a case where one of multiple reference pixel sets is configured as reference pixels, when each reference pixel set is the same or similar, generating reference pixel configuration information (for example, reference pixel selection information, adaptive reference pixel allowing information, etc.) may be a case where information occurs repeatedly. For example, when it is determined that the reference pixel distribution characteristics (for example, it is determined by an average value and variance of each reference pixel set; as an example, it may be determined by comparing a value obtained in the above process with a threshold <Threshold>; that is, if it is determined that the same or almost similar prediction block is generated no matter which reference pixel set is used, related information may be omitted; in this example, it may be limited to the comparison performed for the last selected prediction mode) of each reference pixel set are the same or similar, the reference pixel configuration information may be omitted. In this case, the reference pixels may be configured by a preset method (for example, the closest reference pixel set). In aspects of determining whether to receive reference pixel configuration information by receiving intra prediction information (for example, intra prediction mode information), a decoder may be the same as an encoder, and based on this determination, it may be determined whether to receive reference pixel configuration information.

Although the case where multiple reference pixel sets are configured as reference pixels is illustrated by the various examples, it is not limited thereto. There may be various transform examples, which may be combined with other additional configurations.

The reference pixel configuration section for intra prediction may include a reference pixel generation section, a reference pixel interpolation section, a reference pixel filtering section, etc., and may include all or a part of the above configurations.

The reference pixel configuration section may confirm the availability of reference pixels to classify available reference pixels and unavailable reference pixels. For example, if a block at a preset position (or a reference pixel candidate block) is available, the corresponding block may be used as a reference pixel, and if it is unavailable, the block cannot be used as a reference pixel.

When at least one of the following conditions is met, it is determined that the reference pixel is unavailable. For example, if any one of the cases where the reference pixel is outside a picture boundary, it does not belong to the same partition unit as the current block (for example, slice, tile, etc.), encoding/decoding is not completed, and the use is constrained according to the encoding/decoding is met, it is determined that the reference pixel is unavailable. That is, when none of the above conditions is met, it is determined that the reference pixel is available.

In addition, the use of reference pixels may be constrained by the encoding/decoding settings. For example, the use of reference pixels may be constrained according to whether to perform constrained intra prediction (for example, constrained_intra_pred_flag). When error-robust coding/decoding is to be performed on external factors such as a communication environment, if it is attempted to prohibit using blocks reconstructed by referring to other images as reference pixels, constrained intra prediction may be performed.

According to the availability of the reference pixel, reference pixel candidate blocks may be classified into a case where all reference pixel candidate blocks can be used, a case where some reference pixels can be used, and a case where all reference pixels are unavailable. Except for the case where all reference pixel candidate blocks can be used, in other cases, reference pixels that are unavailable at the position of the candidate block may be filled or generated.

When a reference pixel candidate block may be used, a pixel at a preset position of the block (in this example, it is assumed that the pixel is adjacent to the current block) may be included in a reference pixel memory of the current block.

When the reference pixel candidate block cannot be used, the pixels obtained through the reference pixel generation process may be included in the reference pixel memory of the current block.

In a word, when the reference pixel candidate block is in an available state, the reference pixel may be configured, and when the reference pixel candidate block is in an unavailable state, the reference pixel may be generated.

The reference pixel filtering section generally uses a low-pass filter (such as a 3-tap filter and a 5-tap filter, for example, [1, 2, 1]/4, and [2, 3, 6, 3, 2]/16) to perform smoothing as a main purpose, but may use other types of filters (such as a high-pass filter) according to an application purpose of the filters (for example, sharpening, etc.). It is emphasized in the disclosure that filtering is performed with the purpose of smoothing in order to reduce degradation in the encoding/decoding process.

It may be determined whether to perform reference pixel filtering according to the encoding/decoding settings. That is, filtering may or may not be applied to the reference pixels. However, such a unified filtering operation may have a disadvantage that the partial characteristics of an image cannot be reflected, and it may be beneficial to improve the coding performance by performing filtering based on information such as coding/decoding information reflecting the partial characteristics of the image.

The characteristics of the image may be determined not only according to an image type (I/PB), a color component (Y/Cb/Cr), a quantization parameter, coding/decoding information of a current block (for example, size, shape, partition information, prediction mode, etc.), but also according to coding/decoding information of adjacent blocks, a combination of the coding/decoding information of the current block and the adjacent blocks, etc. Also, determination (for example, whether a reference pixel region is a flat region or a discontinuous region, etc.) may be performed according to the reference pixel distribution characteristics (for example, dispersion, standard deviation, etc. of the reference pixel region). In this way, when the characteristic information of the image may be confirmed, it may be set in advance whether to apply the reference pixel filtering.

Alternatively, the reference pixel filtering may be explicitly set. For example, information about whether filtering is applied may be generated. In this instance, filter selection information is not generated when there is one filter, and may be generated when there are multiple filter candidate groups.

Although implicit and explicit settings for reference pixel filtering have been described by the above examples, there may also be combined cases, for example, explicit settings are determined to be used in some cases, and implicit settings are determined to be used in other cases. The implicit settings here mean that the decoder may derive information about the reference pixel filter (for example, whether filtering is applied, and filter category information).

The reference pixel interpolation section may generate reference pixels in a decimal unit through linear interpolation of the reference pixels. Although in the disclosure, a process as part of the reference pixel configuration section is described, it can be understood as a component configured to be included in the prediction block generation section and executed before the prediction block is generated.

In addition, although the reference pixel interpolation section is assumed as a separate component from the foregoing reference pixel filtering section, it may be configured to be integrated into one component. This may also be a configuration in which distortion is generated in the reference pixel when multiple filters are applied through the reference pixel interpolation section and the reference pixel filtering section.

In some prediction modes (for example, horizontal, vertical, some diagonal modes <modes forming an angle of 45 degrees, such as bottom right diagonal, bottom left diagonal, and top right diagonal>, non-directional modes, color modes, color copy modes, etc.; that is, a mode in which decimal interpolation is not required when the prediction block is generated), the reference pixel interpolation process is not performed, and it may be performed in other prediction modes (a mode in which decimal interpolation is required when the prediction block is generated).

The interpolation accuracy (for example, pixel units such as 1, ½, ¼, ⅛, 1/16, 1/32, and 1/64) may be determined according to the prediction mode (or prediction mode directivity). For example, in a prediction mode forming an angle of 45 degrees, no interpolation process is required, and in a prediction mode forming an angle of 22.5 degrees or 67.5 degrees, interpolation in units of ½ pixel is required. As described above, at least one interpolation accuracy and the maximum interpolation accuracy may be determined according to the prediction mode.

For reference pixel interpolation, a preset interpolation filter (for example, a 2-tap linear interpolation filter, that is, this interpolation filter is only used in any cases) may be used, and one of multiple interpolation filter candidate groups (for example, a 4-tap cubic filter, a 4-tap Gaussian filter, a 6-tap Wiener filter, and an 8-tap Kalman filter; that is, it is determined that an interpolation filter applied according to the encoding/decoding settings is used) may be used. In this instance, the interpolation filter may be distinguished by differences in the number of taps (i.e., the number of pixels to which filtering is applied), filter coefficients, etc.

Interpolation may include examples of execution in stages, such as in the order from low accuracy to high accuracy (for example, ½->¼-⅛), as well as examples of unified execution. In the former case, the interpolation refers to performing interpolation (i.e., meaning that not only integer units but also decimal units are used for interpolation) based on pixels of integer units and pixels of decimal units (referring to pixels previously performing interpolation based on a lower accuracy than the pixel currently to be interpolated in this example). In the latter case, the interpolation means that interpolation is performed based on pixels of integer units (i.e., meaning that only pixels of integer units are used for interpolation).

When one of multiple filter section candidate groups is used, filter selection information may be explicitly generated or implicitly determined, and may be determined according to the encoding/decoding settings (for example, interpolation accuracy, block size and shape, prediction mode, etc.). In this case, the explicitly generated unit corresponds to video, sequence, picture, slice, tile, block, etc.

The prediction block generation section may generate a prediction block according to at least one prediction mode, and may use the reference pixel based on the prediction mode. In this instance, the reference pixel may be used in methods (directional mode) such as extrapolation according to the prediction mode, and may be used in methods (non-directional mode) such as interpolation or average (DC) or copy.

In addition, the prediction block may be generated by copying reference pixels. When copying reference pixels, more than one prediction pixel may be generated by copying one reference pixel, or more than one prediction pixel may be generated by copying more than one reference pixel, and the number of copied reference pixels is equal to or less than the number of copied prediction pixels.

In addition, although the prediction block is generally composed of one prediction block obtained through a prediction block generation process, an example may also be included: a final prediction block is obtained by obtaining multiple prediction blocks and applying a weighted sum to the multiple prediction blocks or the like. Here, the multiple prediction blocks may refer to prediction blocks obtained from a reference pixel set, and may refer to the same prediction block in other cases.

The prediction mode determination section performs a process for selecting the optimal mode in multiple prediction mode candidate groups. In general, a block distortion (for example, distortion of the current block and the reconstructed block; SAD, SSD, etc.) technology and a rate-distortion technology for generating a bit amount of the corresponding mode may be considered to determine a mode with the optimal coding cost. The prediction block generated based on the prediction mode determined by the above process may be sent to a subtraction section and an addition section.

The prediction mode coding section may code the prediction mode selected by the prediction mode determination section. In the prediction mode candidate group, index information corresponding to the prediction mode may be encoded, or the prediction mode may be predicted to code information related thereto. That is, the former case represents a method of directly coding a prediction mode without performing prediction, and the latter case represents a method of predicting a prediction mode so as to code mode prediction information and information obtained based on prediction information. In addition, the former is an example that may be applied to a color difference component, and the latter is an example that may be applied to a luminance component. They are not limited thereto, and may also be applied in other cases.

In the case of performing predicting and coding on the prediction mode, the prediction value (or prediction information) of the prediction mode may be referred to as an MPM. In this instance, a preset prediction mode (for example, a DC mode, a planar mode, a vertical mode, a horizontal mode, a diagonal mode, etc.) or a prediction mode of a spatially adjacent block (for example, a left block, a top block, a top left block, a top right block, a bottom left block, etc.) may be configured as an MPM. In this example, the diagonal mode may represent diagonal up right, diagonal down right, and diagonal down left, which may correspond to mode 9, mode 34, and mode 66 in FIG. 9.

In addition, a mode derived from modes included in an MPM candidate group may be configured as the MPM candidate group. For example, in the case of a directional mode included in the MPM candidate group, a mode with a mode interval difference a (for example, a is a non-zero integer such as 1, −1, 2, or −2; in the case where mode 10 has been included in FIG. 9, the derived modes are mode 9, mode 11, mode 8, mode 12, etc.) is re-included (or additionally included) in the MPM candidate group.

The above example may correspond to a case where the MPM candidate group is configured in multiple modes, the MPM candidate group configuration (for example, the number of MPM candidate groups, and the configuration priority) may be determined according to the encoding/decoding settings (for example, a prediction mode candidate group, an image type, a block size, a block shape, etc.), and may be configured to include at least one mode.

The prediction mode for configuring the MPM candidate group may have priority. The order of prediction modes included in the MPM candidate group may be determined according to the priority, and the configuration of the MPM candidate group may be completed when the number of MPM candidate groups is filled out according to the priority. In this instance, the priority may be determined in the order of a prediction mode of a spatially adjacent block, a preset prediction mode, and a mode derived from the prediction mode first included in the MPM candidate group, but other modifications are possible.

For example, in spatially adjacent blocks, prediction modes of the blocks may be included in the candidate group in the order of left-top-bottom left-top right-top left block, etc. In the preset prediction modes, the prediction modes may be included in the candidate group in the order of DC-planar-vertical-horizontal mode, etc., and the prediction mode obtained by adding +1, −1 or the like to the included mode is included in the candidate group. Alternatively, the prediction modes may be included in the candidate group with a priority of left-top-DC-planar-bottom left-top right-top left-left+1-left−1-top+1, etc.

When the prediction mode coding of the current block is performed using the MPM, information about whether the prediction mode matches the MPM (for example, most_probable_mode_flag) may be generated.

If the prediction mode matches the MPM (for example, most_probable_mode_flag=1), MPM index information (for example, mpm_idx) may be additionally generated according to the configuration of the MPM. For example, if the MPM is configured as one prediction mode, no additional MPM index information is generated, and if the MPM is configured as multiple prediction modes, index information corresponding to the prediction mode of the current block may be generated at the MPM candidate group.

If the prediction mode does not match the MPM (for example, most_probable_mode_flag=0), non-MPM index information (for example, non_mpm_idx) corresponding to the prediction mode of the current mode may be generated in a remaining prediction mode candidate group (or non-MPM candidate group) other than the MPM candidate group in the prediction mode candidate groups, which may be an example of a case where non-MPM is configured as one group.

When the non-MPM candidate group is composed of multiple groups, information about which group the prediction mode of the current block belongs may be generated. For example, non-MPM is composed of groups A and B, if the prediction mode of the current block matches the prediction mode of group A (for example, non_mpm_A_flag=1), index information corresponding to the prediction mode of the current block may be generated in the candidate group A, and if no match (for example, non_mpm_A_flag=0), index information corresponding to the prediction mode of the current block may be generated in the remaining prediction mode candidate groups (or the candidate group B). As the above example, the non-MPM may be configured as at least one prediction mode candidate group (or set), and non-MPM configuration may be determined according to the prediction mode candidate group. For example, when there are at most 35 prediction mode candidate groups, there may be one non-MPM, and there are two or more non-MPMs in other cases.

In this case, group A may configure a mode, other than the MPM candidate group, having the highest probability of matching with the prediction mode of the current block as the candidate group. For example, a next sequential prediction mode that is not included in the MPM candidate group may be included in group A, or a prediction mode having directionality of a predetermined interval may be included in group A.

When the non-MPM is composed of multiple groups as in the above example, the number of prediction modes is large and the prediction mode is not predicted by the MPM, the non-MPM is supported in order to reduce the mode bit amount.

When prediction mode coding (or prediction mode decoding) of the current block is performed using the MPM, a binarization table applied to each prediction mode candidate group (for example, an MPM candidate group, a non-MPM candidate group, etc.) may be separately generated, and a binarization method applied to each candidate group may also be separately applied.

In the above example, terms such as an MPM candidate group and a non-MPM candidate group are only some terms used in the disclosure and are not limited thereto. Specifically, the terms represent information on a category to which a prediction mode belongs after the prediction modes in the current frame are divided into multiple categories, and mode information within the category. As other expressions, it may also be used for terms such as a main MPM candidate group and an auxiliary MPM candidate group.

The prediction-related information generated by the prediction mode coding section may be transmitted to the encoding section and included in a bit stream.

When more than one reference pixel set is configured as a reference pixel candidate group, a case where one reference pixel set is used and a case where more than two reference pixel sets are used may be divided below.

(1) Using One Reference Pixel Set

In this example, it is assumed that one reference pixel set (one of ref_0, ref_1, and ref_2 in FIG. 29) is selected for intra prediction when multiple reference pixel sets are configured as candidate groups.

When intra prediction is performed using one reference pixel set, the following may occur.

Prediction block P may be generated using ref* that is obtained using a reference pixel set ref and by a prediction pre-processing procedure such as reference pixel generation, reference pixel filtering, and reference pixel interpolation.

For example, 5-tap low-pass filtering is applied to pixels located in ref by the reference pixel filtering section, and 6-tap linear interpolation filtering is applied to pixels located in ref (i.e., pixels after reference pixel filtering) by the reference pixel interpolation section. Also, the prediction block may be generated using ref* obtained by the above process.

The prediction pre-processing procedure when using a single reference pixel set is described below.

For example, when the reference pixel set ref_2 in FIG. 29 is used, if the positions of Ref_TL and Ref_TR may be used as reference pixels and the position of Ref_T cannot be used as a reference pixel, pixels at positions P (0, −3) to P (n−1, −3) of Ref_T may be generated by adjacent pixels at positions P (−1, −3) and P (n, −3) in available reference pixels and configured as reference pixels.

After configuring the reference pixels by the above process, components such as a reference pixel filtering section and a reference pixel interpolation section may be performed before generating the prediction block.

In the case of the reference pixel filtering section, filtering may be applied in adjacent pixels centering on a target pixel, and generally, as the number of pixels applied to the filter increases, a more accurate filtering effect (for example, smoothing, sharpening, etc.) may be achieved.

In the case of the reference pixel interpolation section, filtering may be applied in adjacent pixels centering on pixels to be interpolated, and as the number of pixels applied to the filter increases, a more accurate filtering effect may also be generated.

Both steps serve as a process for performing filtering, and unnecessary filtering effects may be generated according to situations. That is, the desired effect when the filtering is applied in each step may also occur in the case of adverse effects when the filtering is applied in another step.

For example, in the reference pixel interpolation process, interpolation target decimal pixels may apply filtering in adjacent integer pixels, if it is assumed that the reference pixel filtering is applied in the previous step in this example (i.e., applied to integer unit pixels), the quantization error of each integer pixel can be reduced by the reference pixel filtering, or it is also possible to create a case where the quantization error is instead further included in the interpolated pixel by using the pixel in the reference pixel interpolation process.

(S1. Ref Smoothing)

$$m^* = v0xl' \pm v1xm' + v2xn'$$

$$m^* = m + k1$$

(m is an original pixel, m* is a filtered pixel, m' is a pixel before filtering, l' and n' are adjacent pixels before filtering is performed, v is a filter coefficient, and k1 is a quantization error)

(S2. Interpolation Process)

$$z^* = (w0xa' + w1xb' + w2xc' + w3xd' + w4xe' + w5xf')$$

$$z^* = z + k2$$

(z is an original pixel at the position, and z* is an interpolated pixel; a' to f' are adjacent pixels <no filtering is performed>, w is a filter coefficient, and k2 is a quantization error)

(S3. Ref Smoothing+Interpolation Process)

$$z^{**} = (w0xa^* + w1xb^* + w2xc^* + w3xd^* + w4xe^* + w5xf^*)$$

$$z^{**} = z + k3$$

(z is an original pixel at the position, and z** is an interpolated pixel; a* to f* are adjacent filtered pixels, w is a filter coefficient, and k3 is a quantization error)

In the above equations, an input pixel value in the reference pixel filtering process S1 is an adjacent pixel of an adjacent block that completes coding/decoding, and an output value obtained by the above process is a pixel having a high probability of being close to an original pixel for reducing a quantization error included during coding/decoding.

In addition, an input pixel value in the reference pixel interpolation process S2 is an adjacent pixel of an adjacent block that completes coding/decoding, and an output value obtained by the above process is a pixel having a high probability of being close to an original pixel value at the pixel position. Through this process, a weighted sum is applied to the adjacent pixels of adjacent blocks including the quantization error to obtain interpolated pixels (i.e., assuming that filtering is not applied for reducing the quantization error, the quantization error may also be reduced by the process), and thus it is possible to obtain pixels that reduce the quantization error and are close to the original pixel. That is, not only decimal unit pixels may be generated, but also the effect of a low-pass filtering section may exist.

On the other hand, in the case S3 where the processes are performed in sequence, it is necessary to consider whether the effect desired to be obtained in the processes may be maintained. That is, this is because whether filtering is performed (performing only one or two filters, etc.), the type of a filter (using a better filter or a slightly better filter; that is, even if a good effect is generated in the process, the effect is not achieved in other processes, or a bad result is derived instead), the addition of a filter tap, etc. cannot necessarily guarantee a good filtering effect.

(2) Using More Reference Pixel Sets

In this example, more than two reference pixel sets (more than two of ref_1, ref_2, and ref_3 in FIG. 29) are selected for intra prediction when multiple reference pixel sets are configured as candidate groups.

When intra prediction is performed using multiple reference pixel sets, the following may occur.

Figure 33:
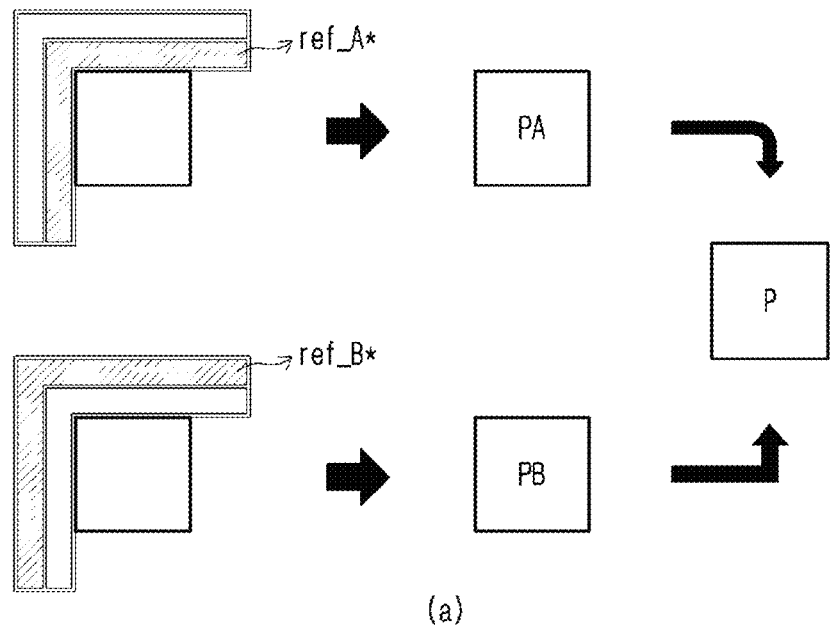
Figure 33:
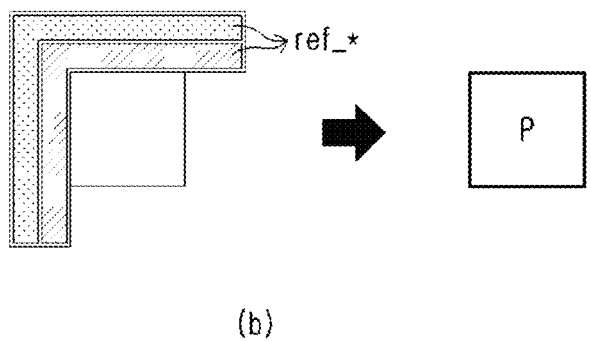

<1> As illustrated in a of FIG. 33, the first prediction block may be generated by the reference pixel set ref_A. That is, a prediction block PA may be generated using ref_A* obtained using ref_A and by a prediction pre-processing procedure such as reference pixel generation, reference pixel filtering, and reference pixel interpolation. Also, a prediction block PB may be generated using ref_B* obtained by the prediction pre-processing procedure of ref_B.

A final prediction block P may be generated by the obtained multiple prediction blocks.

For example, 3-tap low-pass filtering is applied to pixels in ref_A by the reference pixel filtering section, and 4-tap Cubic filtering may be applied to pixels in ref_A' (i.e., pixels after reference pixel filtering) by the reference pixels. In addition, 5-tap low-pass filtering is applied to pixels located in ref_B, and 6-tap linear interpolation filtering may be applied to pixels located in ref_B' (i.e., pixels after reference pixel filtering).

Also, each prediction block is generated using ref_A* and ref_B* obtained by the above process, and then the prediction block is generated by applying a weighted average (for example, applying a high weighted value, such as 3:1, to the prediction block adjacent to the current block), etc.

<2> As illustrated in b of FIG. 33, a prediction block may be generated by reference pixel sets ref_A and ref_B. In this instance, a prediction block P may be generated using ref_A* obtained using ref_A and ref_B and by a prediction pre-processing procedure such as reference pixel generation, reference pixel filtering, and reference pixel interpolation.

For example, 3-tap low-pass filtering may be applied to pixels located in ref_A by the reference pixel filtering section, and 4-tap cubic filtering may be applied to pixels located in ref_A' by the reference pixel interpolation section. In addition, 5-tap low-pass filtering may be applied to pixels located in ref_B, and 2-tap linear interpolation filtering may be applied to pixels located in ref_B'.

Also, a prediction block may be generated after obtaining ref* using ref_A* and ref_B* obtained by the above process. That is, after pixel values corresponding to directionality of an intra prediction mode in each reference pixel set (for example, pa in ref_A* and pb in ref_B*) are obtained according to the prediction mode, a weighted average (for example, pa×A+pb×B) may be applied to generate a prediction block.

More than two pixel sets may be used to generate the prediction block through methods <1> and <2> (<1> is a method of applying a weighted average between prediction blocks after generating the prediction blocks in each reference pixel set, <2> is a method of applying a weighted average between pixels in the process of generating a prediction block; that is, the same or similar results are obtained, but may differ in the process).

The prediction pre-processing procedure when using more than two reference pixel sets is described below.

For example, when reference pixel sets ref_1 and ref_2 in FIG. 29 are used, if the positions of Ref_TL and Ref_TR may be used as reference pixels and the position of Ref_T cannot be used as reference pixels, pixels from P (0, −1) to P (n−1, −1) at the position of Ref_T are generated in ref_1 through adjacent pixels at P (−1, −1) and P (n, −1) in available reference pixels of the reference pixel set ref_1, and pixels from P (0, −2) to P (n−1, −2) at the position of Ref_T may be generated in ref_2 through adjacent pixels at P (−1, −2) and P (n, −2) in available reference pixels of the reference pixel set ref_2.

Alternatively, the prediction block may be generated using the available pixels of ref_1 and ref_2 at unavailable pixel positions in ref_1, and the prediction block may also be generated using the available pixels of ref_2 and ref_1 as described above at unavailable pixel positions in ref_2.

In the case of the reference pixel filtering section, filtering may be applied to adjacent pixels centering on a target pixel, and in the case of the reference pixel interpolation section, filtering may be applied to adjacent pixels centering on a pixel to be interpolated.

In this example, also as mentioned in the case of using one reference pixel set in (1) to generate a prediction block, adverse effects are produced in filtering applications.

Following the procedure in (1), further description is performed assuming <1> in (2).

(S4 Intra Prediction Process)

$$P=v0 \times P1+v1+P2$$

The above formula represents a process of obtaining a final prediction block by performing a weighted sum on prediction blocks obtained using each reference pixel set. That is, it is necessary to consider a part regarding obtaining prediction blocks using values obtained by the process S3 in each reference pixel set and applying a weighted sum of the prediction blocks, so that it is possible to improve the accuracy of the prediction block.

For problems that need to be considered by (1) and (2), a method may be a solution that explicitly selects one of multiple candidate groups (for example, selecting one of <no filtering or 3-tap filtering or 5-tap filtering> as a candidate group related to a reference pixel filter, selecting one of <4-tap filtering or 6-tap filtering> as a candidate group related to reference pixel interpolation), and the optimal method for implicit determination is described below.

An intra prediction process when a prediction block is generated using one reference pixel set or using more than two reference pixel sets is described by the following embodiments.

(3) Prediction Pre-Processing Procedure when Using One Reference Pixel Set

Figure 34:
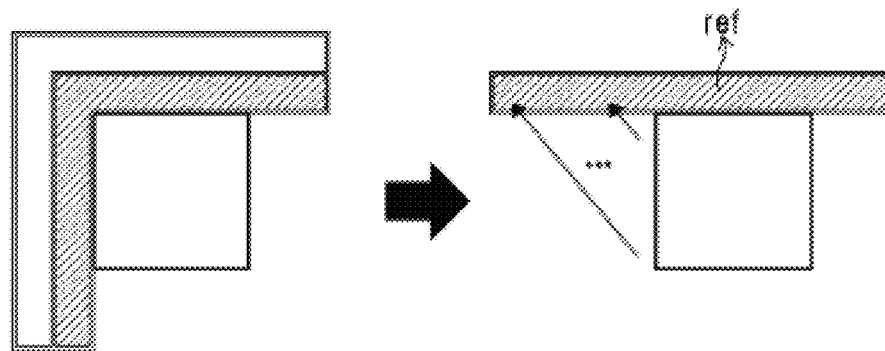
Figure 34:
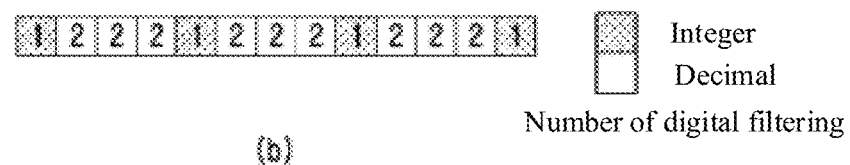
Figure 34:
Figure 34:

As illustrated in a of FIG. 34, a temporary memory for the predicted reference pixel may be required and may have a main array or an auxiliary array. In this example, it is assumed that the reference pixels are configured by the main array as illustrated in the figure.

As illustrated in a of FIG. 34, ref may be filled with pixels in the reference pixel set used for prediction. In this instance, the reference pixels may pass through the reference pixel filtering section after the reference pixels are configured or generated by such as the reference pixel generating section to configure ref. The reference pixels obtained by the reference pixel filtering section is represented as ref'. Thereafter, reference pixels obtained by performing a reference pixel interpolation process on ref' are represented as ref*, and a prediction block may be generated using ref*.

*Integer unit pixel: composed of ref, decimal unit pixel: composed of ref' obtained by performing interpolation on ref (b in FIG. 12)

As described in the above example, for ref* (the integer unit pixel of ref' is the same as ref), the reference pixel filtering process and the reference pixel interpolation process are sequentially performed, so that when the integer unit pixel obtained by the processes is applied to the decimal unit pixel interpolation, a reference pixel with lower accuracy due to repeated filtering may be obtained. Therefore, it is necessary to separately perform the reference pixel filtering process and the reference pixel interpolation process.

For example, reference pixel filtering may be omitted, and only reference pixel interpolation may be performed. In this case, the integer unit pixel used for prediction may be an existing adjacent pixel to which reference pixel filtering is not applied, and the decimal unit pixel may be a pixel obtained by applying interpolation to the existing adjacent integer unit pixels.

*Integer unit pixel: composed of ref, decimal unit pixel: composed of ref* obtained by performing interpolation using ref (c in FIG. 34)

Alternatively, when interpolation is performed on decimal unit pixels, ref may be used as a reference pixel instead of ref'. In this case, the integer unit pixel used for prediction may be a pixel to which reference pixel filtering is applied, and the decimal unit pixel may be a pixel to which interpolation is applied by using the existing adjacent pixels as pixels before performing reference pixel filtering.

*Integer unit pixel: composed of ref', decimal unit pixel: composed of ref* obtained by performing interpolation using ref (d in FIG. 34).

The number of filtering applied to the pixels at each position in ref is illustrated by b to d in FIG. 34. c and d in FIG. 34 illustrate examples of configuring the reference pixel by applying at most one filtering.

(4) Prediction Pre-Processing Procedure when Using More than Two Reference Pixel Sets For ease of description, assuming for the case <2> in (2) of the foregoing example, two reference pixel sets are used to generate a prediction block.

After configuring ref_A, ref_A' may be obtained through a reference pixel filtering section, and ref_A* may be obtained after performing a reference pixel interpolation process on ref_A'. Also in the case of ref_B, ref_B* may be obtained through ref_B', and ref_A* and ref_B* (i.e., ref* in b of FIG. 34) are used to generate a prediction block. In this instance, the prediction block may be generated using integer unit pixels or decimal unit pixels in ref_A* and ref_B* according to the prediction mode.

As described above, for ref_A* and ref_B*, the reference pixel filtering process and the reference pixel interpolation process are sequentially performed, so that when the integer unit pixel obtained by the processes is applied to the decimal unit pixel interpolation, a reference pixel with lower accuracy due to repeated filtering may be obtained. In addition, since pixels located in more than two reference pixel sets may further be filter in a weighted sum form or the like, it is possible to perform filtering too many times on pixels for final prediction.

Various combinations of reference pixels for prediction pixels are illustrated below. For example, prediction pixels may be generated using two integer unit pixels in ref_A and ref_B according to the directionality of the prediction mode (for example, a vertical mode, a horizontal mode, etc.), prediction pixels may be generated using one integer unit pixel and one decimal unit pixel (for example, a directional mode, etc.), and prediction pixels may be generated using two decimal unit pixels (for example, a directional mode, etc.). This may be confirmed by b to d in FIG. 35.

Figure 35:
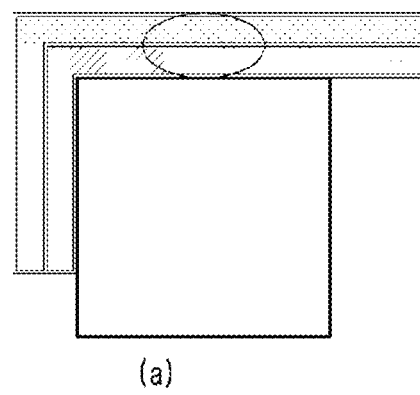
Figure 35:
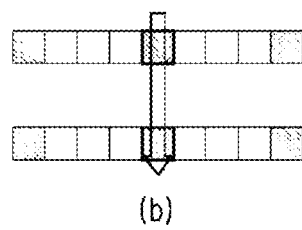
Figure 35:
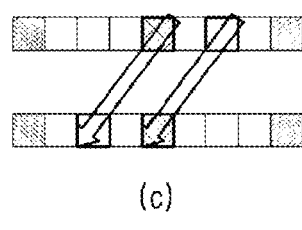
Figure 35:
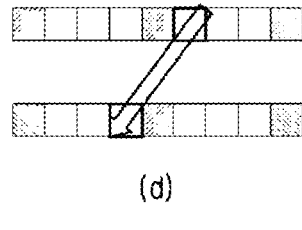

In the above case, as illustrated in b of FIG. 34, assuming that applying the filtering to a single reference pixel set is regarded as the case where a weighted average value with other reference pixel sets is applied, the number of filtering applied to b in FIG. 35 may be 2, the number of filtering applied to c in FIG. 35 may be 3, and the number of filtering applied to d in FIG. 35 may be 4.

For the above case, the following example may be applied.

For example, reference pixel filtering may be omitted in each reference pixel set, and only the reference pixel interpolation process may be performed. In this instance, the integer unit used for prediction may be an existing adjacent pixel to which reference pixel filtering is not applied, and the decimal unit pixel may be a pixel obtained by applying interpolation to the existing adjacent integer unit pixels.

Specifically, in the case of reference pixel filtering, applying filtering to pixels similar to the target pixel may reduce the quantization error more effectively. In this example, the prediction is performed using more than two reference pixel sets, meaning that directionality of the current block also exists at the boundary of the block including the reference pixel (that is, more than two reference pixel sets adjacent to the current block). Therefore, as in the past, filtering is performed using only the closest pixel regardless of directionality of the prediction mode of the current block, which is the same as filtering potentially different pixels based on target pixel and original pixel values.

Alternatively, the reference pixel filtering and reference pixel interpolation processes may be performed for each reference pixel set. However, as illustrated in b of FIG. 35, when the weighted average value is applied only to integer unit pixels, pixels to which reference pixel filtering is applied may be used, and as illustrated in c of FIG. 35, when the weighted average value is applied to the integer unit pixels and the decimal unit pixels, the used integer unit pixels may use pixels to which reference pixel filtering is not applied.

By way of the above examples, a prediction pre-processing procedure is illustrated for the case where one reference pixel set is used and for the case where more than two reference pixel sets are used.

In the above examples, although some cases are described in a case where it is assumed that adverse effects occur due to repeated use of a filter, it cannot define only one characteristic of an image, and other variations may exist.

For example, for cases (3) and (4), it may be used either fixedly (for example, regardless of the state such as the size and shape of the current block and the prediction mode) or adaptively (for example, determined according to the state of the current block).

In the case of adaptive use of (3) and (4), the settings in (3) and (4) may be applied in whole or in part, and in some cases, the opposite example may also be modified or applied.

As an example, a 5-tap low-pass filtering may be performed in some modes (for example, vertical, horizontal, diagonal modes with angles of 45 degrees, 135 degrees, etc.) of case (3). In this example, since no interpolation process in decimal units is required, accurate filtering (assuming that filtering is more accurate with more taps in this example) may be performed to reduce the quantization error.

Alternatively, in some modes (for example, a directional mode, etc.) in (3), 3-tap low-pass filtering may be performed and 6-tap Gaussian interpolation filtering may be performed. In this example, the decimal unit interpolation process is required, and simple filtering may be performed by applying filtering to integer unit pixels (for example, assuming that the filtering is simpler in the following cases, that is, the filter types are different, the number of pixels to which the filter is applied is reduced, and the number of taps is small) to reduce the quantization errors of multiple filtering (in this example, reference pixel filtering is applied to integer unit pixels, and filtering is applied when these pixels are used to interpolate decimal unit pixels). That is, it may be a case as b in FIG. 34 (although described as the existing case when describing b in FIG. 12, it is described in this example that case b may be applied instead of cases c and d in FIG. 34).

As an example, in (3), in the case of a block (e.g., 32×32) more than a predetermined size, 5-tap low-pass filtering may be performed, and 4-tap cubic interpolation filtering may be performed, but pixels applied to interpolation may have pixels before low-pass filtering (i.e., integer unit pixels) as input pixels. Also, in the case of a block smaller than a predetermined size, the same reference pixel filtering and reference pixel interpolation processes identical to the above process are performed, but the pixels applied to interpolation may have pixels after low-pass filtering as input pixels.

As an example, in some modes (e.g., vertical, horizontal, etc.) in (4), 5-tap low-pass filtering may be performed on each reference pixel set (i.e., using a more accurate filter than using a 3-tap filter in other directional modes, or using different types of filters, even though they have the same number of taps). In this example, since no interpolation is required, filtering may be performed to reduce the quantization error. Alternatively, 5-tap low-pass filtering may be performed on a reference pixel set adjacent to the current block, and 3-tap low-pass filtering may be performed on the next adjacent reference pixel set. In this example, accurate filtering may be performed on a reference pixel set (in this example, it is assumed that weighted values are added to pixels close to the current block). The reference pixel set allocates higher weighted values to more than two reference pixel sets. Alternatively, 5-tap low-pass filtering is performed on a reference pixel set adjacent to the current block, and low-pass filtering is not performed on the next adjacent reference pixel set. In this example, it can be understood that by centering on pixels of a reference pixel set having a higher weighted value, low-pass filtering is applied to pixels adjacent to the reference pixel set to which the pixel belongs, and to pixels adjacent to the pixel in other reference pixel sets (i.e., if one-dimensional filtering is the case in the conventional art, it can be understood as a two-dimensional filtering in this example).

Also, in some modes (for example, a directional mode, etc.) in (4), 3-tap low-pass filtering is performed on each reference pixel set, 8-tap cubic interpolation filtering is performed on the reference pixel set adjacent to the current block, and 2-tap linear interpolation filtering may be performed on the next adjacent reference pixel set. Alternatively, instead of performing low-pass filtering on each reference pixel set, 6-tap Gaussian interpolation filtering is performed on the reference pixel set adjacent to the current block and 4-tap Gaussian interpolation filtering may be performed on the next adjacent reference pixel set. Alternatively, 5-tap low-pass filtering may be performed on a reference pixel set adjacent to the current block, 3-tap low-pass filtering may be performed on the next adjacent reference pixel set, and 4-tap cubic interpolation filtering may be performed on each reference pixel set. Alternatively, 3-tap low-pass filtering is performed on a reference pixel set A adjacent to the current block, low-pass filtering is not performed on a next adjacent reference pixel set B, 8-tap Gaussian interpolation filtering is performed on the reference pixel set A adjacent to the current block, and 4-tap cubic interpolation filtering is performed on the next adjacent reference pixel set B.

As an example, in (4), in the case of a block having a predetermined size or more (e.g., 64×64), 4-tap cubic interpolation filtering may be performed without performing low-pass filtering on each reference pixel set. Also, in a block less than a preset size and greater than the preset size or more (e.g., 16×16 to 64×64), 3-tap low-pass filtering as well as 4-tap Gaussian interpolation filtering is performed on each reference pixel set, but when pixels for weighted averaging are composed of only an integer unit pixel set, pixels after low-pass filtering are used, and when pixels for weighted averaging are composed of a combination of integer units and decimal units, integer unit pixels may use pixels before low-pass filtering. In addition, in a block less than a preset size (16×16), 5-tap low-pass filtering as well as 6-tap cubic interpolation filtering is performed for each reference pixel set, and pixels for weighted averaging, no matter whether integer units or decimal units, may use pixels after low-pass filtering.

According to the above example, various cases are illustrated where one reference pixel set is used and more than two reference pixel sets are used, etc.

Explicit processing about the prediction pre-processing procedure may be performed. That is, it is possible to generate one kind of selection information regarding use of one reference pixel set or use of more reference pixels, it is also possible to generate another kind of selection information regarding that for the settings of reference pixel filtering, no filtering is performed or filtering is performed using filter A or filter B, and it is possible to generate yet another kind of selection information regarding using filter A or filter B for the settings of reference pixel interpolation.

Alternatively, implicit processing about the prediction pre-processing procedure may be performed. That is, the number of reference pixel sets, reference pixel filtering settings, and reference pixel interpolation settings described above may be implicitly determined according to coding information (states), such as block size, shape, and prediction mode. In this instance, when the number of reference pixel sets is determined to be two or more, it may be implicitly determined that the same reference pixel filtering or reference pixel interpolation setting or other setting is performed on multiple reference pixel sets.

Alternatively, mixed processing about the prediction pre-processing procedure may be performed. That is, implicit processing may be performed in some cases, and explicit processing may be performed in other cases. In this instance, the reference of mixed processing may be determined according to the coding information. That is, implicit processing or explicit processing may be determined according to a combination of at least one or more of a certain block size or shape or prediction mode.

In the disclosure, the case about implicit processing or mixed processing will be described. For both processes, the intra prediction setting may be configured based on the coding information (for example, pre-prediction processing, etc., described above as having an adaptive configuration only in the pre-prediction processing, but also having an adaptive configuration in other processes of intra prediction <an intra prediction mode candidate group is configured in the following content, that is, determined from coding information such as the number of intra prediction modes and the prediction direction>).

The content is arranged as follows.

(Encoder)

<1> The size and shape of a current block are confirmed

Intra-prediction mode candidate group setting (i.e. determining the number of modes, angles, etc., which may be omitted if there is one candidate group)

<2> The size, shape and prediction mode of the current block are confirmed (at this time, the prediction mode is defined by the intra prediction mode candidate group determined in the above process).

Reference pixel set setting (i.e. using one or more than two)

Reference pixel filtering setting (filtering setting may be determined in each reference pixel set if there are more than two reference pixel sets)

Reference pixel interpolation setting (likewise, if there are more than two reference pixel sets, interpolation settings may be determined in each set)

<3> Coding of intra prediction related information (if selection information is generated due to the presence of multiple candidate groups in the prediction mode and the settings of the above process, the information is also included in the intra prediction information).

(Decoder)

<1> The size and shape of a current block are confirmed (in the previous step, block information is analyzed by a block partition section and related information is confirmed)

Intra prediction mode candidate group setting (prediction mode information is analyzed and reconstructed according to the candidate group)

<2> The size, shape and prediction mode of a current block are confirmed

Reference pixel setting

Reference pixel filtering setting

Reference pixel interpolation setting

<3> Decoding of intra prediction related information (prediction mode and other optional information; it may be considered that analysis of this information is performed at this step).

In an encoder, the intra prediction mode candidate group may be confirmed according to the state of the current block. That is, it is determined which candidate group is used, and the determined candidate group has a specific number of modes and specific mode configurations. The confirmation is trivial if all conditions of the intra prediction mode candidate groups are the same, but the confirmation is required if more than two intra prediction mode candidate groups are used. That is, it is possible to know which candidate group to be used according to the state of the current block, or it is possible to explicitly know which candidate group to be used through information.

The prediction mode numbers and the like are allocated according to the process, but if the prediction mode candidate groups are different, the directions or angles and the like of each prediction mode are different according to the candidate groups, and therefore the process of unifying the candidate groups may be required. That is, No. 50 when the prediction mode in FIG. 9 is used may be a vertical mode, but No. 50 in another prediction mode candidate group is not necessarily the vertical mode, so the confirmation is required.

Therefore, it is described in the disclosure that operations, settings, etc. change depending on the type of the prediction mode.

For example, when a conditional sentence if (intramode==Vertical) is used to determine whether to perform intra prediction processing (for example, reference pixel interpolation, reference pixel filtering, etc.), if intramode is No. 50 and a prediction mode candidate group is used, it can be directly determined to perform intra prediction processing, but because it is necessary to know the type of the mode in the intra prediction mode candidate group (directional mode or non-directional mode; if it is the directional mode, it is determined whether it belongs to vertical or horizontal mode, and if it is not the directional mode, it is determined whether it is a directional mode of generating the prediction block only using integer pixels, etc.), it may be input into the conditional sentence after confirming a direction of the above mode in the prediction mode candidate group. That is, if (intramode<x>== Vertical), it should be changed to the process of whether mode x is vertical in the intra prediction mode candidate group of x.

In addition, the state of the current block needs to be confirmed to confirm the intra prediction settings. In this case, the state of the current block may be defined according to at least one or more of the size, shape, prediction mode, etc. of the current block. The reference pixel set, reference pixel filtering, reference pixel interpolation, etc. are set according to the state of the current block. That is, it is possible to determine the number of reference pixel sets, which reference pixel set to use, whether to apply reference pixel filtering, and which filter to use. If the related information is determined explicitly, a flag may be generated. If the related information is determined implicitly, it may be determined according to coding information (the above state of the current block, or a current image type <I/P/B>, a current image <Y/Cb/Cr>, etc., which may affect infra prediction settings).

Although the disclosure has been described centering on the reference pixel set, reference pixel filtering and reference pixel interpolation, other settings related to intra prediction may also be included. For example, in the prediction process, as in the past, it may also be determined according to the coding information that a prediction block is generated using (extrapolated, averaged, and interpolated) reference pixels according to the prediction mode, or other reference pixels other than the reference pixels used according to the existing directionality (for example, in order to correct the corresponding prediction pixels according to a prediction pixel position, a correction value is generated by additionally using other reference pixels and then added to the existing prediction value, etc.) are used to generate a prediction block, etc. In this case, when the related information is explicitly determined, it may also be known through the related information which prediction method is used, otherwise, in the case of implicitly determining the related information, it may also be determined through the state of the current block or the like which prediction method is used.

In the decoder, the related description may be derived in reverse from the content of the coder. For the explicit part, the related information is analyzed. For the implicit part, the related information is determined according to the coding information, etc.

In the above, the reference pixel filtering setting and the reference pixel interpolation setting may be determined by considering the content of changing the setting with the number of the reference pixel sets used in the disclosure.

INDUSTRIAL APPLICABILITY

The disclosure may be used to encode/decode an image signal.

The invention claimed is:

1. An intra prediction method, comprising:
deriving an intra prediction mode of a current block;
determining a pixel line for intra prediction of the current block among a plurality of pixel lines, wherein the pixel line is a reference pixel line, and wherein the pixel line is determined based on a size and shape of the current block;
performing filtering on a first reference pixel of the determined pixel line;
performing the intra prediction of the current block based on the intra prediction mode and the determined pixel line; and
performing correction on a prediction pixel of the current block according to the intra prediction mode;
wherein the filtering is selectively performed based on a first flag indicating whether the first reference pixel for intra prediction is filtered;
wherein the first flag is derived from a decoding apparatus based on a coding parameter of the current block, and wherein the coding parameter comprises whether intra prediction in units of sub-blocks is applied.

2. The intra prediction method according to claim 1, wherein:
the correction is performed in consideration of a position of the pixel line of the current block.

3. The intra prediction method according to claim 2, wherein the operation of performing correction further comprises:
determining at least one of a second reference pixel or a weighted value for the correction based on a position of the prediction pixel of the current block.

4. The intra prediction method according to claim 3, wherein
the correction is selectively performed in consideration of at least one of a position of the pixel line of the current block, the intra prediction mode of the current block, or whether intra prediction in units of sub-blocks of the current block is performed.

5. The intra prediction method according to claim 1, wherein
the intra prediction is performed in units of sub-blocks of the current block, and
the sub-blocks are determined based on at least one of a second flag indicating whether to perform partitioning, partition direction information, or partition number information.

6. The intra prediction method according to claim 1, further comprising:
deriving the intra prediction mode based on a predetermined default mode or a plurality of Most Probable Mode (MPM) candidates.

* * * * *